US006931795B1

(12) United States Patent
Baloga et al.

(10) Patent No.: US 6,931,795 B1
(45) Date of Patent: Aug. 23, 2005

(54) UTILITY DISTRIBUTION SYSTEM

(75) Inventors: Mark A. Baloga, East Grand Rapids, MI (US); Carl V. Forslund, III, East Grand Rapids, MI (US); Thomas G. Feldpausch, Hastings, MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 10/026,964

(22) Filed: Dec. 21, 2001

Related U.S. Application Data

(62) Division of application No. 09/887,519, filed on Jun. 22, 2001, and a division of application No. 09/183,023, filed on Oct. 30, 1998, now Pat. No. 6,374,547.

(51) Int. Cl.[7] .............................................. E04H 1/00
(52) U.S. Cl. ......................... 52/36.1; 52/64; 52/220.7
(58) Field of Search ..................... 52/36.1, 64, 220.7, 52/36.2, 220.1, 239, 243.1, 481.2; 160/239; 362/257

(56) References Cited

U.S. PATENT DOCUMENTS

| 119,054 A | 9/1871 | Shryock |
| 241,600 A | 5/1881 | Bray |
| 241,925 A | 5/1881 | Cadwell |
| 249,198 A | 11/1881 | Moon |
| 253,538 A | 2/1882 | McLane |
| 454,844 A | 6/1891 | Brewerton et al. |
| 475,126 A | 5/1892 | Lorenz |
| 549,347 A | 11/1895 | Clark |
| 605,148 A | 6/1898 | Sylvester |
| 621,835 A | 3/1899 | MacDonald |
| 627,396 A | 6/1899 | Daly |
| 713,417 A | 11/1902 | Feldmann et al. |
| 821,144 A | 5/1906 | Walsh |
| 943,821 A | 12/1909 | Feldmann, Jr. |
| 950,006 A | 2/1910 | McCarty |
| 955,586 A | 4/1910 | Emerich |
| 997,866 A | 7/1911 | Smith |
| 1,086,236 A | 2/1914 | Staples |
| 1,116,484 A | 11/1914 | Ralph |
| 1,122,926 A | 12/1914 | Hick |

(Continued)

FOREIGN PATENT DOCUMENTS

| AU | 164466 | 4/1949 |
| GB | 124334 | 4/1949 |
| JP | 4222787 | 8/1992 |
| WO | WO 95/24031 | 9/1995 |

OTHER PUBLICATIONS

M.A. Baloga, C.V. Forslund III, et al., Compilation Titled "Bluespace" (Internal document proprietary to Steelcase Inc.), bearing a designation of "Aug. 29, 2000", (color copy with protective sheets).

(Continued)

Primary Examiner—Naoko Slack
(74) Attorney, Agent, or Firm—Foley & Lardner LLP

(57) ABSTRACT

A work environment providing a work area and a workstation including the information display system are also disclosed. A utility distribution system is also disclosed. An information display system is further disclosed. The work environment may provide a work space that can be arranged or divided to include at least one work area within the available floor space. The utility distribution system includes a utility threshold may be adapted for movement along a predefined path about the work area to selectively deliver utilities to at least one portion of the work area. The utility distribution system may be selectively positioned for use in a variety of locations relative to a track system. The information display system may include a track system adapted to attach to a mounting structure and a plurality of display panels coupled to the track system for movement with respect to the mounting structure.

30 Claims, 50 Drawing Sheets

U.S. PATENT DOCUMENTS

| | | |
|---|---|---|
| 1,141,404 A | 6/1915 | Moseley |
| 1,203,659 A | 11/1916 | Smith |
| 1,254,036 A | 1/1918 | Grant |
| 1,326,832 A | 12/1919 | Baily |
| 1,457,990 A | 6/1923 | Morgan |
| 1,599,888 A | 9/1926 | Haskell |
| 1,616,897 A | 2/1927 | Hayes |
| 1,688,456 A | 10/1928 | Dolph |
| 1,770,755 A | 7/1930 | Kleinpell |
| 1,826,469 A | 10/1931 | Hunt et al. |
| 1,881,636 A | 10/1932 | Johnson et al. |
| 1,887,539 A | 11/1932 | Brown |
| 1,943,629 A | 1/1934 | Schwartz |
| 1,958,579 A | 5/1934 | Johnson et al. |
| 1,997,829 A | 4/1935 | McKee |
| 2,070,408 A | 2/1937 | Leidgen |
| 2,144,083 A | 1/1939 | Rentfrow, Sr. |
| 2,348,414 A | 5/1944 | Pierce |
| 2,691,238 A | 10/1954 | Svatos |
| 2,812,067 A | 11/1957 | Gussack |
| 2,870,459 A | 1/1959 | Zabielski |
| 2,886,182 A | 5/1959 | Dauman |
| 2,914,873 A | 12/1959 | Brennan |
| 2,928,555 A | 3/1960 | Childs et al. |
| 2,963,332 A | 12/1960 | Breuning |
| 3,017,999 A | 1/1962 | Cano |
| 3,042,978 A | 7/1962 | Eames et al. |
| 3,060,521 A | 10/1962 | Greco |
| 3,078,133 A | 2/1963 | Schauer |
| 3,141,207 A | 7/1964 | Kahler |
| 3,181,274 A | 5/1965 | Izenour |
| 3,251,477 A | 5/1966 | Parstorfer |
| 3,286,382 A | 11/1966 | Newman |
| 3,351,211 A | 11/1967 | Best |
| 3,391,796 A | 7/1968 | Gross |
| 3,412,868 A | 11/1968 | Carter |
| 3,425,568 A | 2/1969 | Albright |
| 3,514,883 A | 6/1970 | Albright |
| 3,557,499 A | 1/1971 | Dickie et al. |
| 3,581,423 A | 6/1971 | Mascolo |
| 3,683,100 A | 8/1972 | Deal et al. |
| 3,732,633 A | 5/1973 | Margolis et al. |
| 3,760,952 A | 9/1973 | White |
| 3,777,896 A | 12/1973 | Ehrlich |
| 3,797,146 A | 3/1974 | Holes |
| 3,857,731 A | 12/1974 | Merrill, Jr. et al. |
| 3,883,972 A | 5/1975 | Propst et al. |
| 3,921,320 A | 11/1975 | McWilliams |
| 3,924,749 A | 12/1975 | Weston |
| 3,952,133 A | 4/1976 | Amos et al. |
| 3,975,837 A | 8/1976 | Baars |
| 3,984,930 A | 10/1976 | Booland |
| 4,033,058 A | 7/1977 | Lyman |
| 4,135,775 A | 1/1979 | Driscoll |
| 4,166,332 A | 9/1979 | Donovan |
| 4,180,298 A * | 12/1979 | Borgerson, Jr. ............. 312/242 |
| 4,194,313 A | 3/1980 | Downing |
| 4,239,170 A | 12/1980 | Planebo |
| 4,270,290 A | 6/1981 | Eckert |
| 4,310,978 A | 1/1982 | Stern |
| 4,360,240 A | 11/1982 | Koncelik et al. |
| 4,360,991 A | 11/1982 | West |
| 4,428,136 A | 1/1984 | Franklin |
| 4,447,973 A | 5/1984 | Wihlke |
| 4,457,436 A | 7/1984 | Kelley |
| 4,478,467 A | 10/1984 | Tyndall |
| 4,569,448 A | 2/1986 | Graham |
| 4,588,190 A | 5/1986 | Stewart et al. |
| 4,606,394 A | 8/1986 | Bannister |
| 4,620,635 A | 11/1986 | Morand |
| 4,635,417 A * | 1/1987 | Larouche ..................... 52/239 |
| 4,652,239 A | 3/1987 | Brimberg |
| 4,658,966 A | 4/1987 | Broek |
| 4,715,154 A | 12/1987 | Baloga |
| 4,716,698 A * | 1/1988 | Wilson et al. ................ 52/239 |
| 4,723,665 A | 2/1988 | Benedict et al. |
| 4,723,821 A | 2/1988 | Montgomery |
| 4,750,305 A | 6/1988 | Bastian |
| 4,757,901 A | 7/1988 | Woods |
| 4,771,557 A | 9/1988 | Bowman |
| 4,793,495 A | 12/1988 | Preu |
| 4,805,331 A | 2/1989 | Boggess et al. |
| 4,902,229 A | 2/1990 | Pedersen et al. |
| 4,913,297 A | 4/1990 | Wells |
| 4,928,465 A | 5/1990 | Del Castillo Von Haucke |
| 4,932,172 A | 6/1990 | Maas |
| 4,954,382 A | 9/1990 | Riefler et al. |
| 4,979,785 A | 12/1990 | Richards |
| 4,996,110 A | 2/1991 | Tanuma et al. |
| 5,016,373 A | 5/1991 | Theno |
| 5,025,603 A * | 6/1991 | Johnson ..................... 52/220.7 |
| 5,090,171 A | 2/1992 | Kano et al. |
| 5,105,952 A | 4/1992 | Krattiger |
| 5,109,994 A | 5/1992 | Kidd et al. |
| 5,112,020 A | 5/1992 | Ginsberg |
| 5,125,202 A | 6/1992 | Kissinger |
| 5,139,155 A | 8/1992 | Laxson |
| 5,148,925 A | 9/1992 | Althoff et al. |
| 5,160,050 A | 11/1992 | Russo |
| 5,160,189 A | 11/1992 | Johnston et al. |
| 5,161,321 A | 11/1992 | Kuhnke |
| 5,181,334 A | 1/1993 | Mima |
| 5,186,499 A | 2/1993 | Mason |
| 5,214,885 A | 6/1993 | Maas et al. |
| 5,226,548 A | 7/1993 | Koeppel |
| 5,241,796 A * | 9/1993 | Hellwig et al. .............. 52/36.4 |
| 5,248,536 A | 9/1993 | Du Katz |
| 5,277,007 A * | 1/1994 | Hellwig et al. ............ 52/220.7 |
| 5,282,341 A | 2/1994 | Baloga et al. |
| 5,289,926 A | 3/1994 | Lewis et al. |
| 5,290,002 A | 3/1994 | Cohen |
| 5,301,477 A | 4/1994 | Rellinger et al. |
| 5,309,686 A | 5/1994 | Underwood et al. |
| 5,321,579 A | 6/1994 | Brown et al. |
| 5,342,665 A | 8/1994 | Krawitz |
| 5,368,486 A | 11/1994 | Kurzman |
| 5,375,802 A | 12/1994 | Branham, II |
| 5,384,999 A | 1/1995 | Roche et al. |
| 5,392,934 A | 2/1995 | Fox |
| 5,394,631 A | 3/1995 | Bosio |
| 5,406,761 A | 4/1995 | Hobbiebrunken et al. |
| 5,422,155 A | 6/1995 | Spence, Jr. |
| 5,428,928 A | 7/1995 | Hellwig et al. |
| 5,486,391 A | 1/1996 | Tyner |
| 5,495,953 A | 3/1996 | Bearth |
| 5,503,278 A | 4/1996 | Ishmael |
| 5,511,348 A | 4/1996 | Cornell et al. |
| 5,513,574 A | 5/1996 | Collins |
| 5,534,963 A * | 7/1996 | Adolphi et al. ................ 396/5 |
| 5,536,080 A | 7/1996 | Madimenos et al. |
| 5,537,290 A | 7/1996 | Brown et al. |
| 5,549,267 A | 8/1996 | Armbruster et al. |
| 5,558,418 A | 9/1996 | Lambright et al. |
| 5,569,503 A | 10/1996 | Piotroski |
| 5,584,546 A | 12/1996 | Gurin et al. |
| 5,588,659 A | 12/1996 | Boes et al. |
| 5,590,940 A | 1/1997 | Richard |
| 5,607,214 A | 3/1997 | Pierce et al. |
| 5,609,112 A | 3/1997 | Meyer et al. |
| 5,617,660 A | 4/1997 | Pollack |
| 5,635,265 A | 6/1997 | Potokar |

| | | | |
|---|---|---|---|
| 5,647,172 A | | 7/1997 | Rokicki |
| 5,649,631 A | | 7/1997 | Loflin |
| 5,651,219 A | * | 7/1997 | Baloga et al. ............... 52/32 |
| 5,655,323 A | | 8/1997 | Lassoff |
| 5,655,672 A | | 8/1997 | Stuchlik, III |
| 5,658,635 A | | 8/1997 | Davis et al. |
| 5,675,946 A | * | 10/1997 | Verbeek et al. ............. 52/205 |
| 5,687,499 A | | 11/1997 | Brnjac |
| 5,687,513 A | | 11/1997 | Baloga et al. |
| 5,688,579 A | | 11/1997 | Konsti et al. |
| 5,694,881 A | | 12/1997 | Creech |
| 5,695,264 A | | 12/1997 | Koch |
| 5,697,589 A | | 12/1997 | Garfinkle |
| 5,711,121 A | | 1/1998 | Garver |
| D390,967 S | * | 2/1998 | Beuster et al. ............ D24/232 |
| 5,724,778 A | | 3/1998 | Cornell et al. |
| 5,743,193 A | | 4/1998 | Kakuta et al. |
| 5,746,330 A | | 5/1998 | DiBetta |
| 5,765,315 A | | 6/1998 | Nagamitsu et al. |
| 5,771,954 A | | 6/1998 | Benner et al. |
| 5,794,392 A | | 8/1998 | Forslund, III et al. |
| 5,826,385 A | | 10/1998 | Dykstra et al. |
| 5,826,639 A | | 10/1998 | Miller |
| 5,829,202 A | | 11/1998 | Canton Gongora et al. |
| 5,831,211 A | | 11/1998 | Gartung et al. |
| 5,848,698 A | | 12/1998 | Stompe |
| 5,873,205 A | | 2/1999 | Hanlon et al. |
| 5,901,513 A | | 5/1999 | Mollenkopf et al. |
| 5,913,787 A | | 6/1999 | Edwards |
| 5,931,429 A | | 8/1999 | Hellwig et al. |
| 5,941,713 A | | 8/1999 | Wayner et al. |
| 5,966,879 A | * | 10/1999 | Verbeek et al. ............. 52/205 |
| 5,984,441 A | | 11/1999 | Stokhuijzen |
| 6,048,044 A | | 4/2000 | Biggel et al. |
| 6,076,317 A | * | 6/2000 | Hellwig et al. ............. 52/239 |
| 6,076,903 A | * | 6/2000 | Vander Park ............. 312/196 |
| 6,249,999 B1 | | 6/2001 | Borge et al. |
| 6,250,019 B1 | * | 6/2001 | Simons et al. ............ 52/36.1 |
| 6,253,509 B1 | * | 7/2001 | Hellwig et al. ............. 52/239 |
| 6,344,610 B1 | * | 2/2002 | Berndt ...................... 174/48 |
| 6,374,547 B1 | * | 4/2002 | Baloga et al. ............. 52/36.1 |
| 6,374,548 B1 | * | 4/2002 | Ruedinger et al. ......... 52/36.1 |
| 6,449,909 B1 | * | 9/2002 | Baloga et al. ............. 52/36.1 |
| 6,463,701 B1 | * | 10/2002 | Baloga et al. ............... 52/29 |
| 2002/0191400 A1 | * | 12/2002 | Jilk et al. .................. 362/257 |

OTHER PUBLICATIONS

M.A. Baloga, C.V. Forslund III, et al., Compilation Titled "Bluespace" (Internal document proprietary to Steelcase Inc.), bearing a designation of "Aug. 29, 2000", (black and white duplicate copy).

U.S. Patent Application titled Workstation, U.S. Appl. No. 09/183,023 filed on Oct. 30, 1998; 106 pages, Figures 1–33 listing inventors Mark A. Baloga and Carl V. Forslund III.

* cited by examiner

FIG. 7
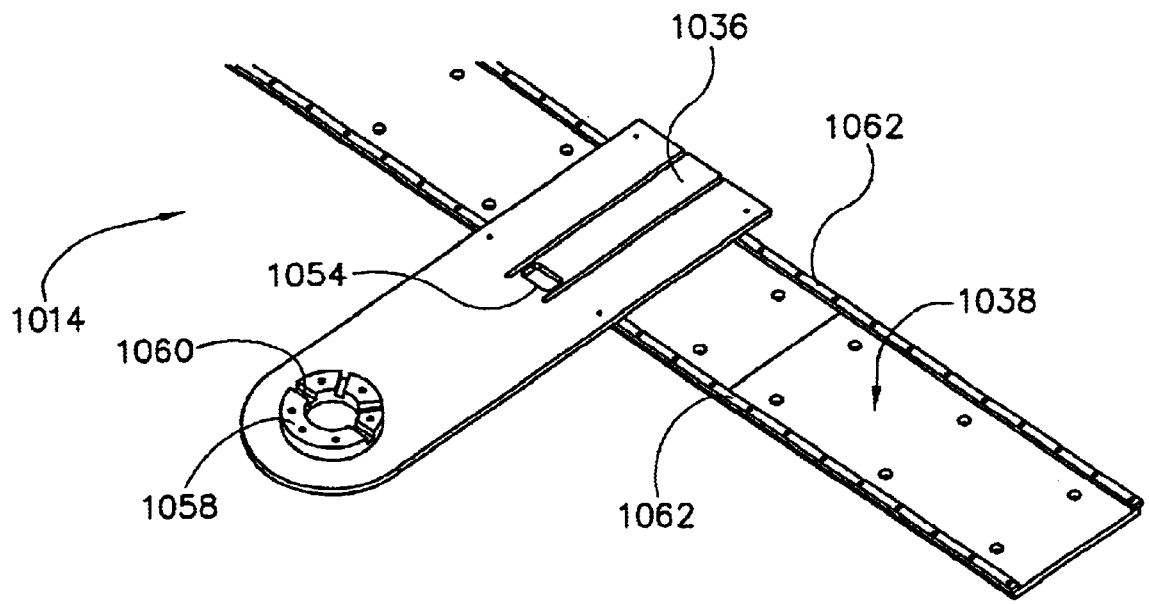
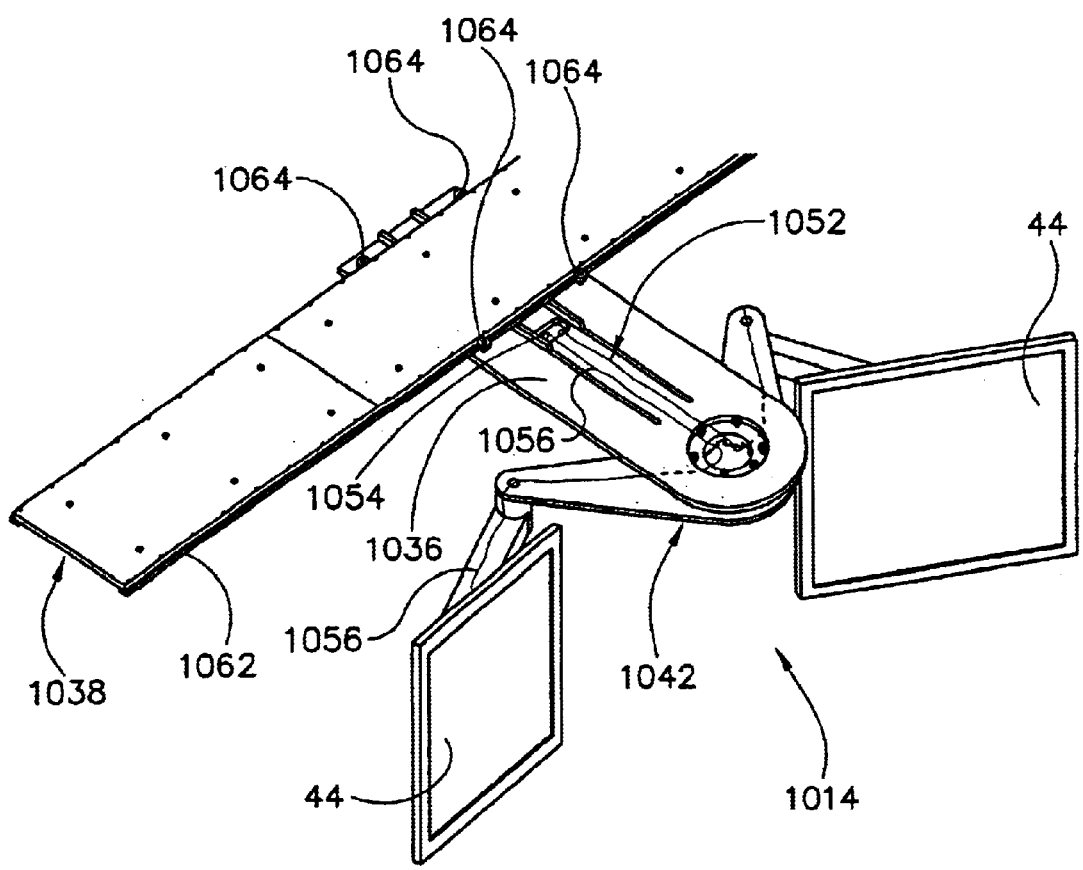
FIG. 8

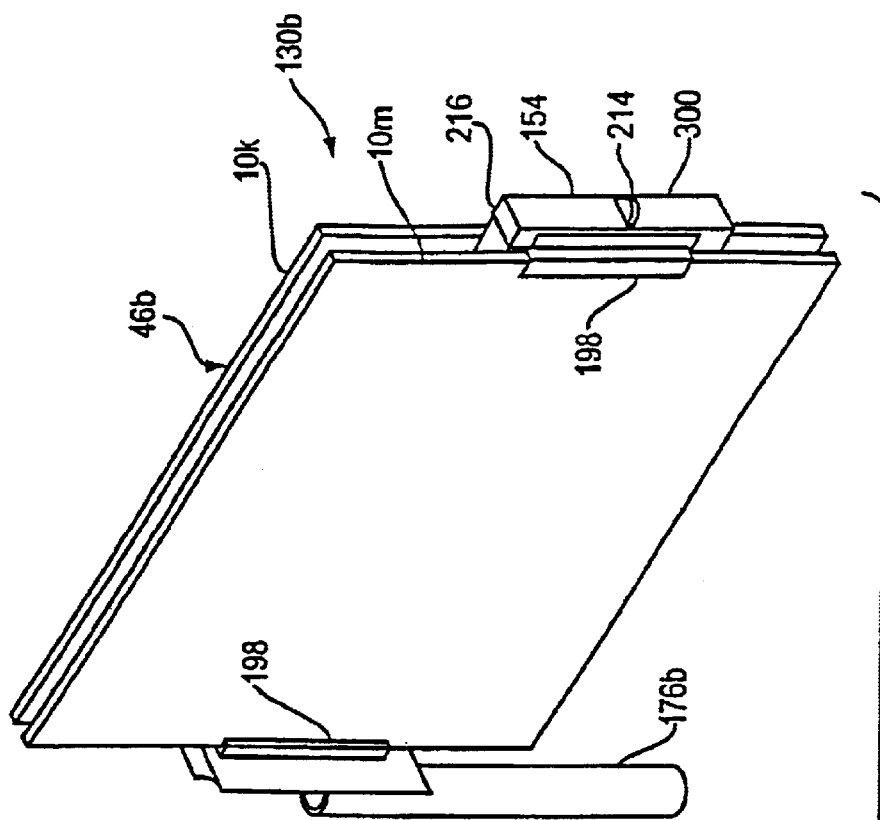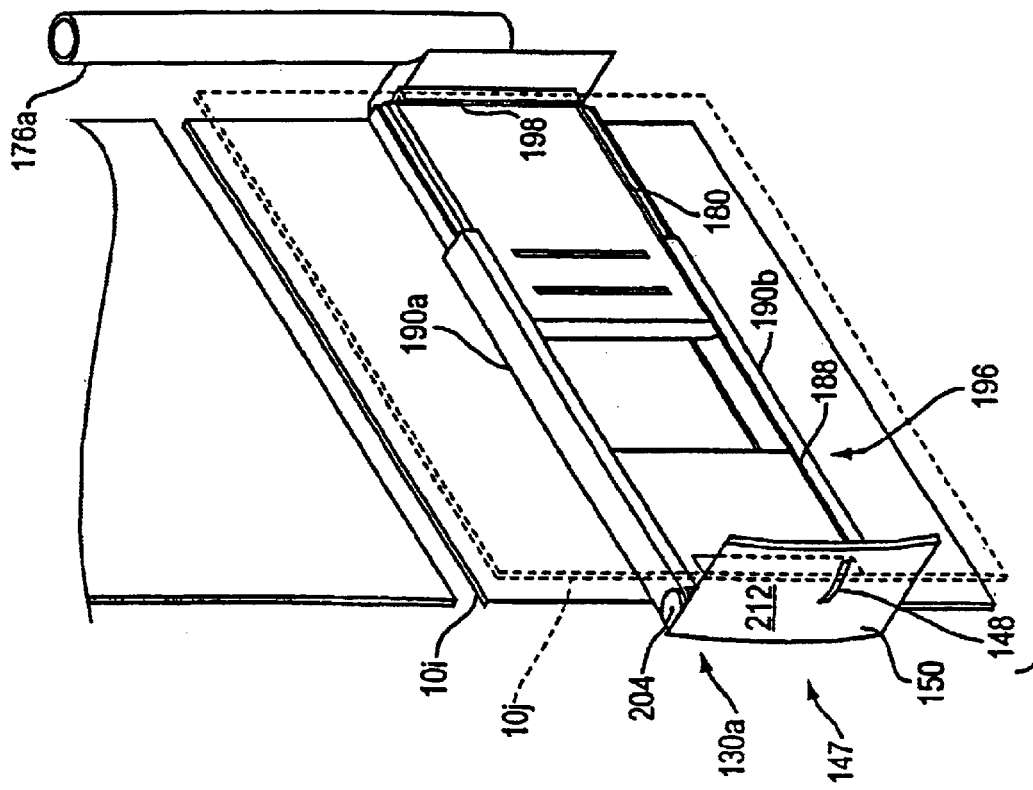
FIG. 49

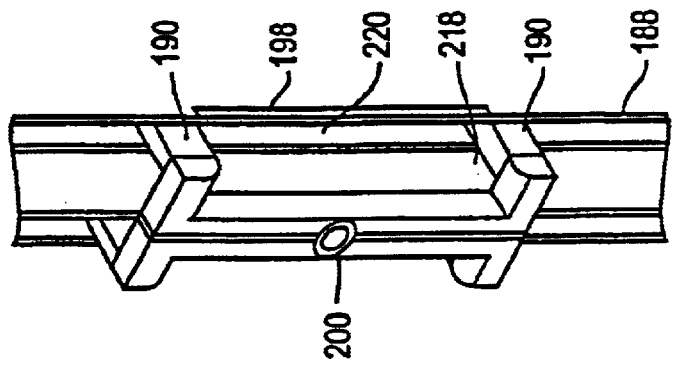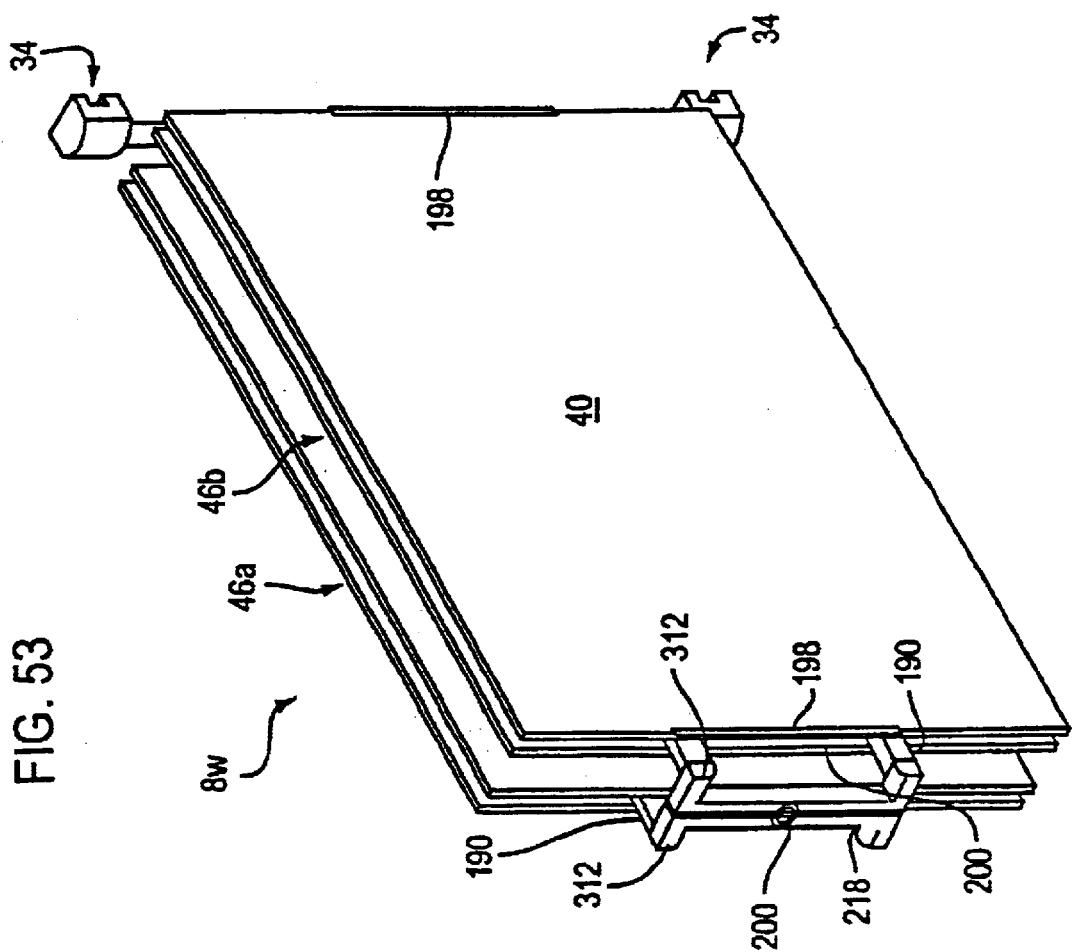

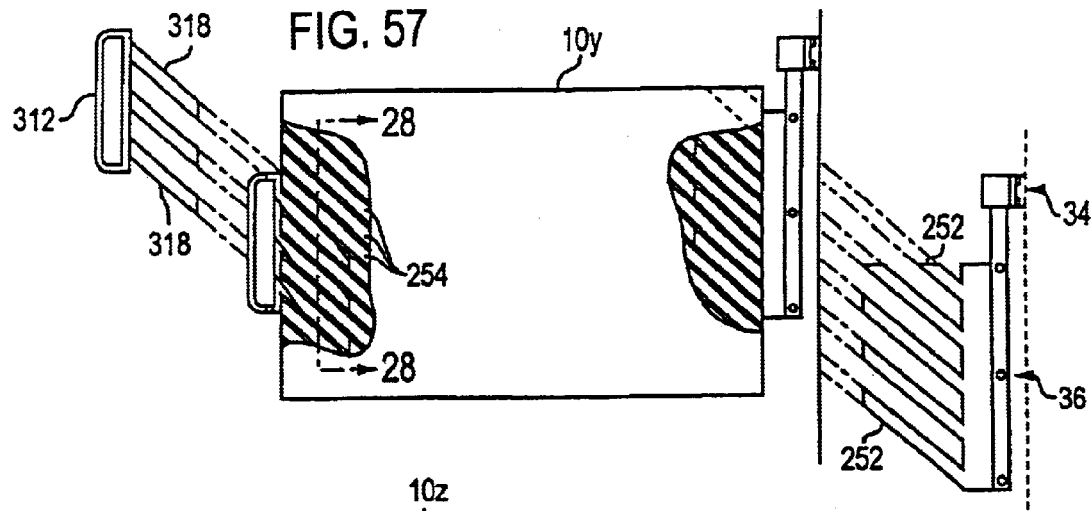
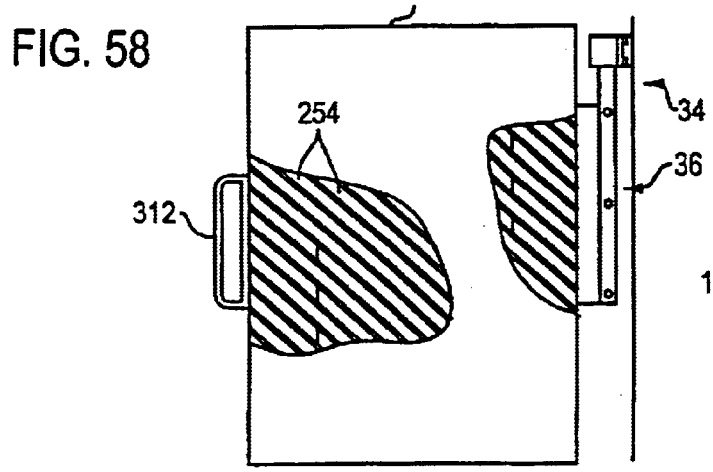
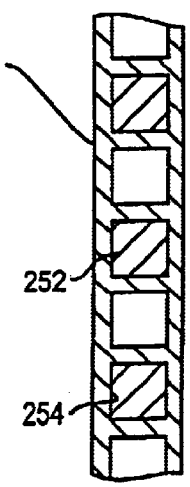
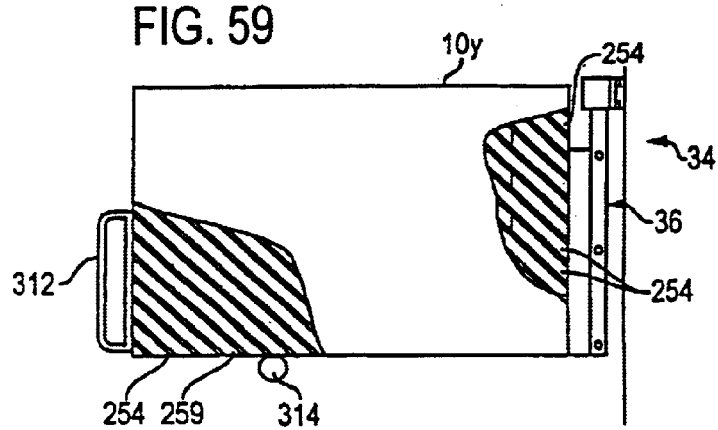

UTILITY DISTRIBUTION SYSTEM

CROSS-REFERENCE TO RELATED APPLICATIONS

The present invention is a division of and claims priority under 35 U.S.C. § 120 from U.S. patent application Ser. No. 09/183,023 titled "WORKSTATION" filed Oct. 30, 1998, now U.S. Pat. No. 6,374,547, the full and entire disclosure of which is hereby incorporated herein by reference, and is a division of copending U.S. patent application Ser. No. 09/887,519 titled "MOVABLE DISPLAY SUPPORT SYSTEM" filed Jun. 22, 2001, the full and entire disclosure of which is hereby incorporated herein by reference.

The following U.S. patent applications are cited by reference and hereby incorporated herein by reference: (a) Ser. No. 09/182,998 titled "INFORMATION DISPLAY SYSTEM" filed Oct. 30, 1998; (b) Ser. No. 09/183,021, titled 'WORK ENVIRONMENT' and filed on Oct. 30, 1998; (c) Ser. No. 09/182,997 titled "DISPLAY BOARD SYSTEM" filed Oct. 30, 1998; (d) Ser. No. 09/182,999 titled "DISPLAY BOARD SYSTEM" filed Oct. 30, 1998; (e) U.S. patent application Ser. No. 09/888,069 titled "Movable Office Support System" filed Jun. 22, 2001.

FIELD OF THE INVENTION

The present invention relates to an utility distribution system adapted for use within a work environment providing one or more workstations. The present invention further relates to a support system for a utility distribution system which is movable within a work space to support one or more workers in a wide variety of use conditions.

BACKGROUND OF THE INVENTION

It is well known in a large work environment to define a group work space that may be divided or otherwise arranged to create one or more work areas for use by individual workers or small groups of workers. Work areas are commonly configured to form one or more workstations, by arrangement of one or more articles of furniture, such as panel walls, worksurfaces, storage units, chairs or seating products, etc., typically in a manner intended to support workers in a wide variety of individual and group activities. Typically, such known arrangements are not optimally suited for use in a dynamic work environment, where individual and team spaces are ideally capable of rapid configuration and reconfiguration by the workers themselves in a highly efficient manner, as needed for varied sets of individual or group activities. Recently, these dynamic work environments characterized by the need for flexibility, reconfigurable work areas, and the ability to support a wide variety of activities of both individual workers and project teams of varying sizes, have become prevalent and typically include more mobile forms of such articles of furniture.

All of these work spaces typically are required to accommodate a flow of information, often presented in the form of documents, that is created, used or shared by the workers. Indeed, in known work environments, it is well known to provide for the display of information to support the individual or collaborative activities of one or more workers. A fundamental purpose of any system for the display of information is to facilitate "information persistence"—to provide an organizational framework for the presentation of information that freely enables the collection of information, the presentation of information, and the retention of information as it becomes meaningful or useful to an individual or group. This purpose is best served by a system that allows current information to be prominently displayed and readily accessible. However, known arrangement for the display of information in any work environment, which typically utilize both vertical surfaces and horizontal surfaces provided within the work environment, do not fully achieve this or other purposes that are desirable. This is particularly true in a dynamic work environment.

In some typical work environments it is very common to display information on "fixed" or "static" vertical surfaces, such as full-height walls, partial-height panel walls, or the like. Fixed walls typically provide for the territorial division of the work space, and incidentally provide a stable vertical surface for the prominent display of information (e.g. space for "tiling" of information). However, because the amount of vertical wall surfaces available for use to display information is limited, the volume of information that can be displayed is limited. Moreover, fixed walls are not readily reconfigurable to form work areas since reconfiguration of the work space is generally a time-consuming and labor-intensive process beyond the capability of the workers themselves and requiring a substantial amount of advance planning and the use of tools and other equipment. Because fixed walls are effectively immobile and are not typically positioned for the display of information, their efficiency is further limited. In addition, the commonly known methods of presenting information on fixed walls of such known arrangements, for example, do not provide an organizational framework well suited to achieve an optimal degree of information persistence. In many instances, according to commonly known arrangements, the visual effect or "scenery" provided in the work environment by information displayed on vertical walls and surfaces tends to be static and constantly "on display," rarely being refreshed or interchanged for example, when placing charts in relatively inaccessible locations. In other instances, manner in which the information displayed on the vertical surface renders it fleeting and easily defaced, for example when information is written on a white board. That is, fixed walls are not able to adequately achieve optimum "information persistence" attributes, or to support the reconfigurability necessary in a dynamic work environment.

Accordingly, it would be advantageous to provide for a utility distribution system for use in a work environment that facilitates the efficient use, display and storage of information in the work environment. It would also be advantageous to provide for an information display system that more effectively facilitates "information persistence"—the collection and retention of information meaningful to an individual or group—so that information is readily available and can be "revealed" when needed and yet can be "concealed" and conveniently stowed away securely when not needed. It would further be advantageous to provide for a workstation using the information display system and associated structures (such as a utility distribution system) in order to create work areas that can be readily configured and reconfigured for use by individual workers, small groups or workers and large groups or workers. It would further be advantageous to provide for a work environment including the information display system (and the utility distribution system) so that workstations and work areas can dynamically be configured and reconfigured. It would further be advantageous to have an information display system for use in a work environment that allows the efficient and complete transformation of the visual context of a work space or workstation during transitions between projects, tasks and personal respites in the course of a work day or work week.

It would be desirable to provide for a utility distribution system having one or more of these or other advantageous features.

SUMMARY OF THE INVENTION

The present invention relates to a system for distributing utilities away from furniture elements carrying the utilities. The system includes an overhead utility beam moveably attached proximate one end to the furniture. The system also includes a utility access extension connected to the beam proximate the other end, the extension having a utility delivery zone thereon, the beam and the extension being configured to supply utilities to the utility delivery zone so that users may gain access to utilities routed through the furniture at a point away from the furniture.

The present invention also relates to floor supported system for distributing utilities away from furniture elements carrying the utilities. The system includes a utility delivery zone, an overhead utility beam, and a light fixture mounted on the beam. The overhead utility beam is moveably attached proximate one end to the furniture configured to supply utilities to the utility delivery zone so that users may gain access to utilities routed through the furniture at a point away from the furniture; and The present invention further relates to a wall supported system for distributing utilities away from furniture elements carrying the utilities. The system includes a utility delivery zone, an overhead utility beam, and a light fixture mounted on the beam. The overhead utility beam is moveably attached proximate one end to the furniture configured to supply utilities to the utility delivery zone so that users may gain access to utilities routed through the furniture at a point away from the furniture; and

DESCRIPTION OF THE FIGURES

FIG. 7 is a top perspective view of the support system.

FIG. 8 is a bottom perspective view of the support system display.

FIG. 49 is a fragmentary exploded perspective view of the container of the information display system of FIG. 41.

FIG. 53 is a perspective view of the container of the information display system of FIG. 50 showing the installation of display boards.

FIG. 54 is a fragmentary perspective view of the container of FIGS. 50 and 53.

FIG. 57 is a schematic side elevation view of the container of FIG. 56.

FIG. 58 is a schematic side elevation view of the container of FIG. 56.

FIG. 59 is a schematic side elevation view of the container of FIG. 56.

FIG. 62 is a fragmentary sectional view of a display board associated with the container of the information display system of FIGS. 57 through 59.

DETAILED DESCRIPTION OF PREFERRED AND OTHER EXEMPLARY EMBODIMENTS

Figure 1:
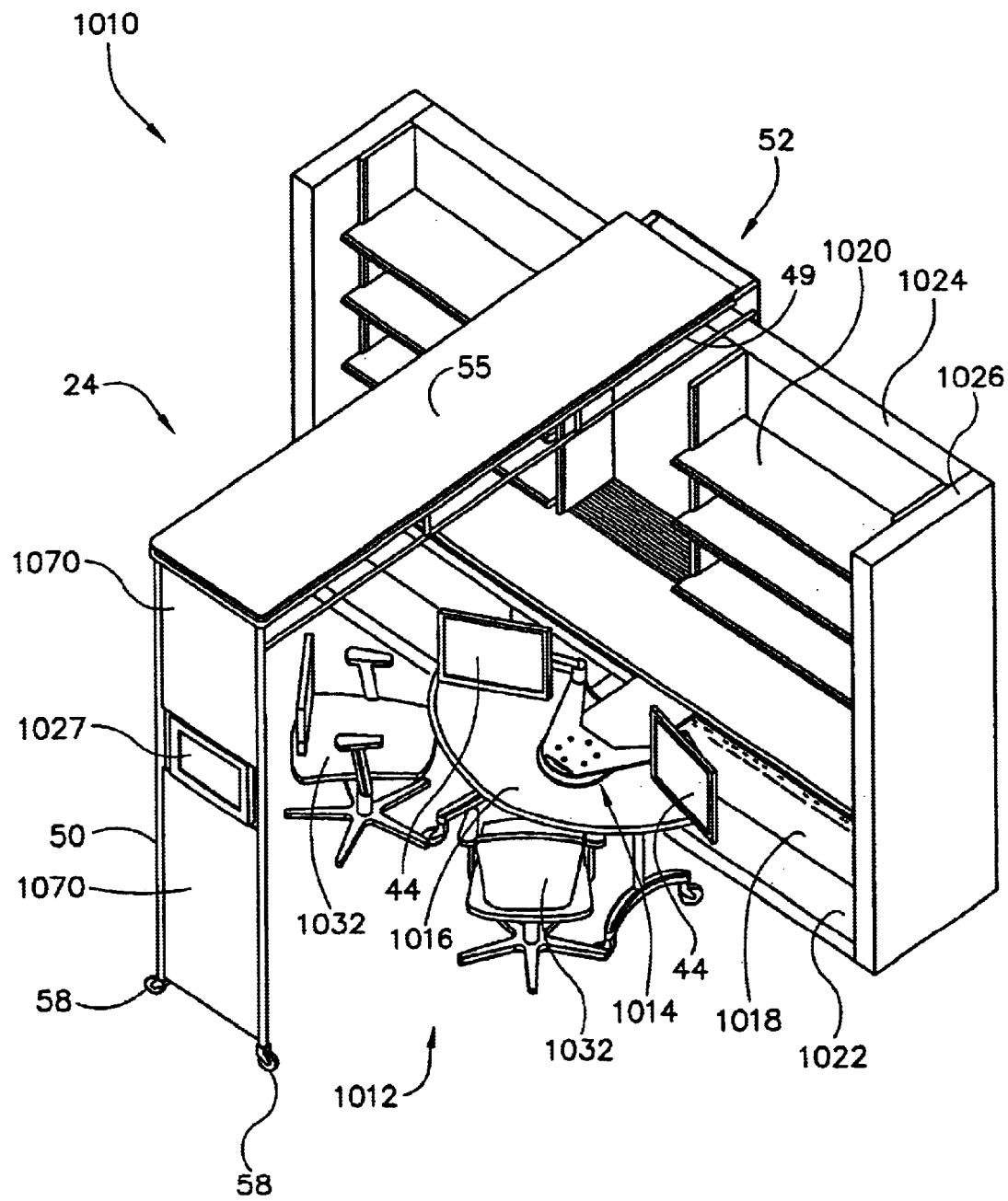
FIG. 1 is a perspective view of work space providing a utility distribution system according to an exemplary embodiment.

Referring to FIG. 1, a work space 1010 is shown including a workstation 1012 configurable for use by one or a plurality of workers or other persons. Workstation 1012 includes a movable display support system 1014 along with other articles of furniture shown as an associated mobile worksurface or table 1016, a fixed worksurface 1018, storage units shown as shelving units 1020 and lateral files 1022. Work space 1010 also provides walls shown as partial height partition walls including a base wall 1024 and side walls 1026 as well as a utility distribution system shown as a utility threshold 24 movable on a track 31 (not visible in FIG. 1). According to any preferred embodiment, the utility threshold is of a type disclosed in U.S. patent application Ser. No. 09/887,519 titled "MOVABLE DISPLAY SUPPORT SYSTEM" filed Jun. 22, 2001 (the full and entire disclosure of which is hereby incorporated herein by reference), U.S. patent application Ser. No. 09/183,023, titled "Workstation" and filed on Oct. 30, 1998 (the full and entire disclosure of which is hereby incorporated herein by reference), and in U.S. patent application Ser. No. 09/183,021, titled "Work Environment" and also filed on Oct. 30, 1998 (the full and entire disclosure of which is hereby incorporated herein by reference), providing functionality and features such as power, voice and data connections, display devices or information display panels (e.g. shown as display device 1027 in FIG. 1), lighting, privacy screens, etc. Also shown in work space 1010 are chairs 1032 (which can be of any conventional type, preferably mobile chairs). As shown, movable display support system 1014 includes two display devices shown as display panels 44.

Figure 2:
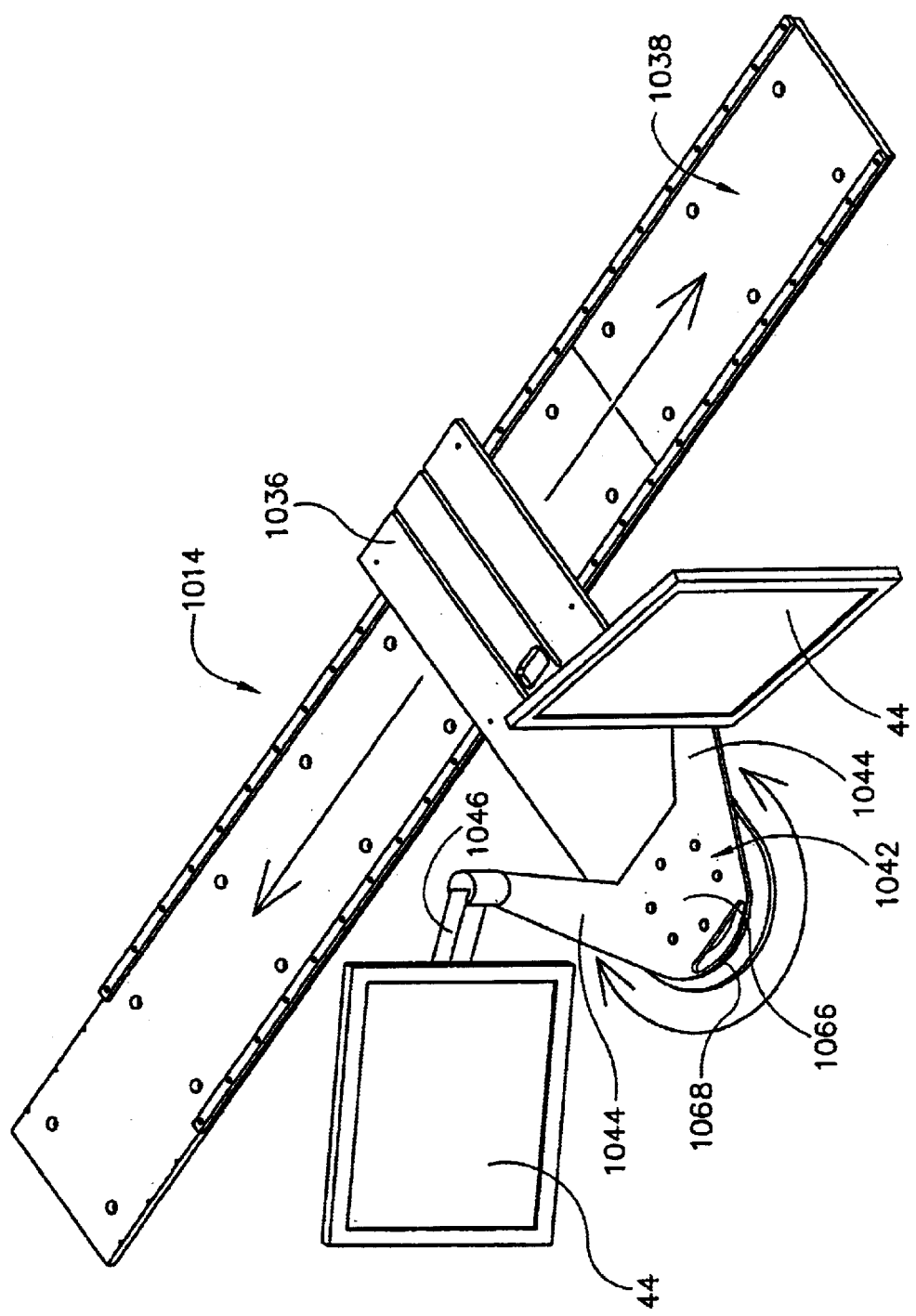
FIG. 2 is a front perspective view of a display support system according to an exemplary embodiment.
Figures 3, 4:
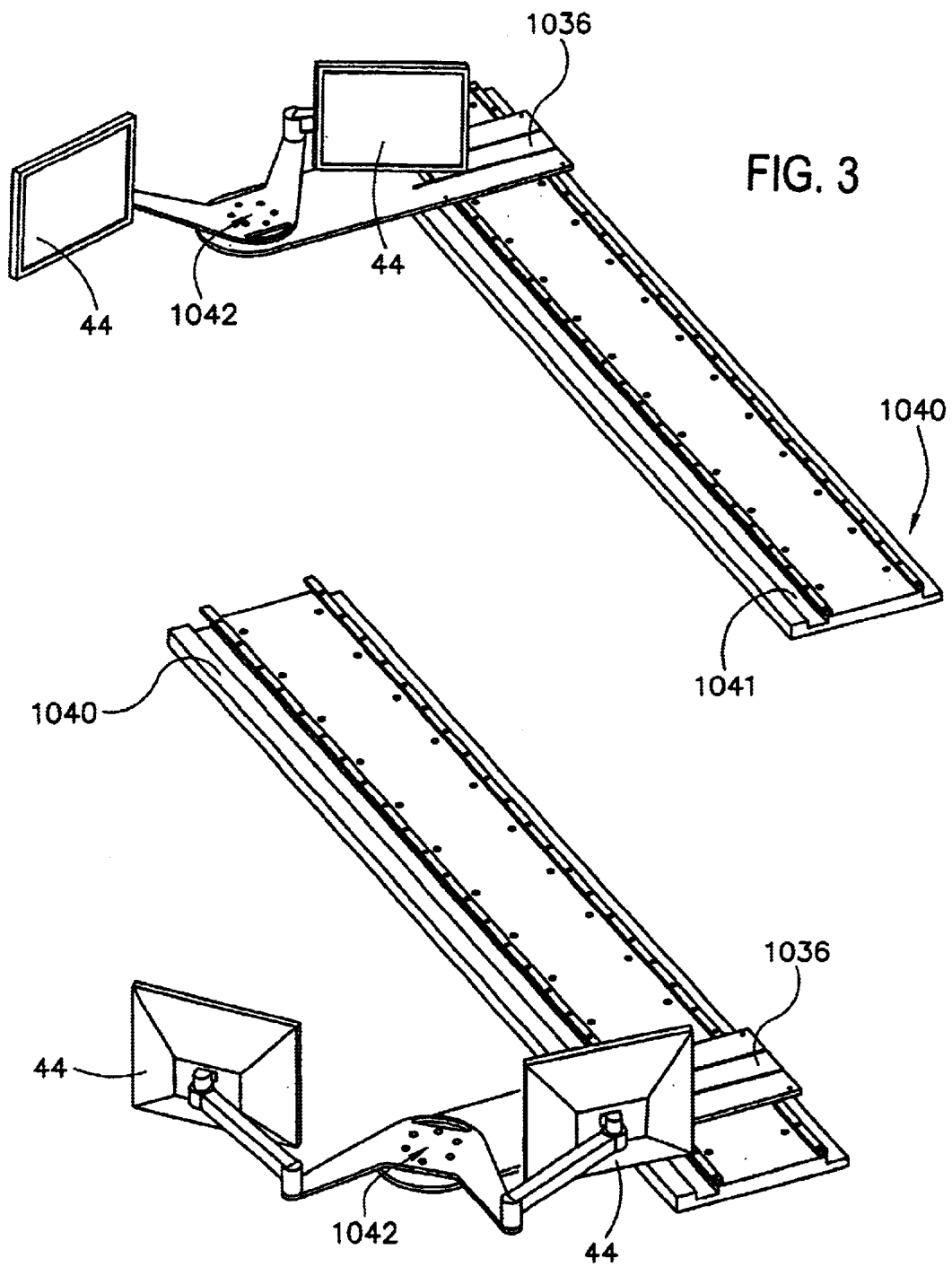
FIGS. 3 and 4 are top perspective views of the support system.

Referring to FIG. 2, movable display support system 1014 is shown. Support system 1014 includes a base 1036 mounted to a track system 1038 for translating movement (e.g. linear or curved or other) along a path of travel. Track system 1038 is installed upon a mounting structure shown as a panel 1040 (shown in FIG. 3). A passage in panel 1040 shown as groove 1041 can be used for routing various cables to base 1036. Support system 1014 also includes a display support assembly 1042 movably coupled to the base 1036. Support assembly 1042 includes flanges 1044 configured for attachment of a fixture or structure shown as an articulable arm 1046 used to support an information display device shown as a display panel 44 (or any other structure such as a base or fixture of any conventional type providing one or more points or "joints" for movement of a mounted display device). According to an exemplary embodiment, support assembly 1042 is pivotably coupled to base 1036 and each articulable arm 1046 is movably coupled to flange 1044 to allow suitably positioning and/or orientation of display panel 44 in any of a variety of directions (e.g., up, down, laterally, pivotably) at each point or joint allowing articulation (e.g. translation, extension, retraction, rotation, etc.). As shown in FIGS. 3 and 4, the selective movement of base 1036 with respect to the mounting structure shown as panel 1040 (e.g. along track system 1038) and/or of support assembly 1042 with respect to base 1036 provides for the positioning and orientation of one or more of display panels 44 within a substantial range of motion in work space 1010; selective movement of display panel 44 with respect to support assembly 1042 provides for additional range of motion within work space 1010.

Figure 5:
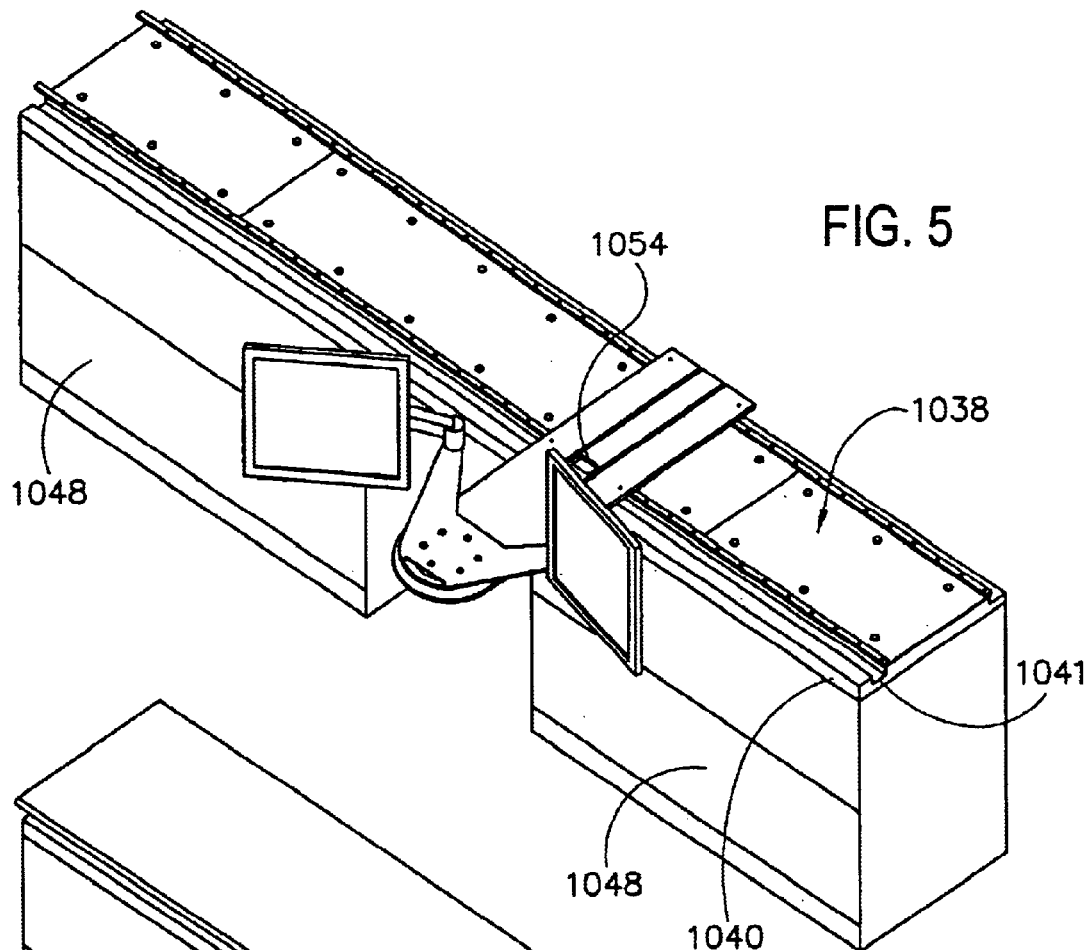
FIGS. 5 and 6 are top perspective views of the display support system within in a work station providing an article of furniture according to an exemplary embodiment.
Figure 6:
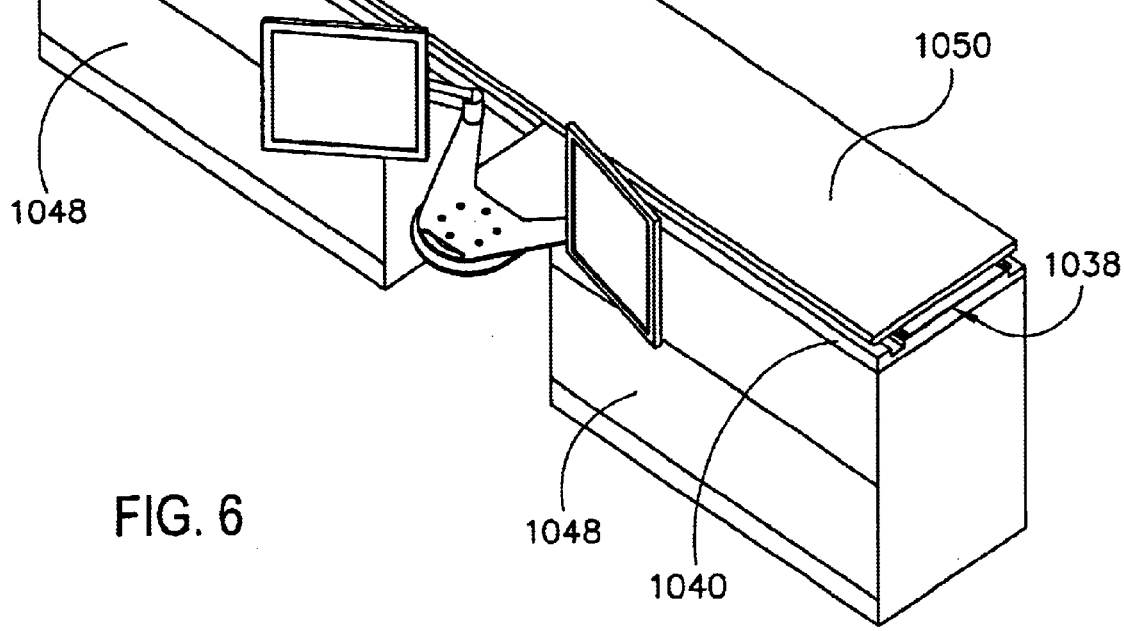

According to an exemplary embodiment shown in FIGS. 5 and 6, panel 1040 for track system 1638 is installed horizontally between two storage units 1048; a worksurface 1050 may be installed within work space 1010 over track system 1038. According to any preferred embodiment, the system may be integrated with or within articles of furniture in the work space.

Referring to FIGS. 7 and 8, movable display support system 1014 is shown in a reverse view so that the underside of base 1036 is visible. Base 1036 includes a set of passages 1052 and an aperture 1054 for routing of cables 1056 (for utilities such as power, communication and/or data, which may be routed to base 1036 through passage or groove 1041 of panel 1040) to each of display panels 44. Base 1036 also includes a hub 1058 providing paths or slots 1060 for maintaining or retaining cables 1056 below the coupling of display support assembly 1042. As shown in FIG. 7, track system 1038 includes a set of tracks or rails 1062 providing for guided and bounded motion of base 1036. As shown in FIG. 8, a set of roller guides 1064 on base 1036 engage rails 1062 of track system 1038. According to a particularly preferred embodiment, hub 1058 is rotatable within base 1036 and display support assembly 1042 is mounted to hub 1058 to allow for rotation of display panels 44. Display support assembly 1042 may provide a worksurface 1066 as well as a handle 1068 (both shown in FIG. 2) to facilitate movement of the display devices.

According to any preferred embodiment, the system will provide for a wide range of motion for one or more display devices, including one or more of the following arrangements or combinations of arrangements for positioning and repositioning: (a) translating movement of the base along the track system, e.g. from one part of the work space to another for open use or stowing (see FIGS. 3 and 4); (b) rotation of the display support assembly within a range of motion, e.g. to allow open viewing or privacy or stowing of the display device (see FIGS. 2 and 3 and 4); (c) articulation of the structure or arm, e.g. further to optimize the viewing angle/position (such as to remove glare or enhance visibility) of the display screen or further to enhance sharing/revealing or privacy/concealment of information. According to any preferred embodiment, the wide range of motion provided by the system will enhance the ability of workers or other persons to work collaboratively or to maintain privacy with information or to open or stow the display device (or display devices) conveniently relatively quickly and easily—and without requiring significant concern for management of cables.

According to alternative embodiments, the movable display support system may be configured for one information display device or two or more information display devices; the information display devices may be of any type, including flat display panels or other types of video monitors (e.g. CRT) or any other type of data or information display device or appliance. The information display device may be associated with any type of appliance or device, such as a computing device or a television or network, etc.

In a conventional arrangement for associating a display device within a work space, where the display device is positioned on a fixed worksurface, constraints are typically imposed upon the orientation of a user or users relative to the entrance of the work space or adjacent aisles or opportunities for potential shared zones for viewing the display device with others. For example, if the display device is positioned on a worksurface to the back (or in one side or back corner) of the work space, the user of the work space may be constrained to work with her or his back to the entrance of the work space and information on the display device may be visible to those who enter the work space or walk along the adjacent aisle; if the display device is positioned on a worksurface near the center or front of the work space, the user of the work space may be constrained to "work around" the display device and may be less able to share information on the display device with those who enter the work space.

According to any preferred embodiment, the support system will provide enhanced functionality in comparison with such conventional arrangements, and allow the display device (or display devices) to be positioned selectively to enhance privacy or openness, or generally to facilitate the work to be performed in the work space; the support system is intended to allow the repositioning (including physical placement and orientation) of the display device to suit the needs of the worker. That is, according to any preferred embodiment of the support system, the user or users (without having to adapt or adjust their own posture and/or position) will be able to adapt the positioning and orientation of the display device or devices for various use conditions.

According to other exemplary embodiments, the display devices may be associated with other articles of furniture and/or physical structures (such as panels, partitions, or walls) (e.g. a utility threshold 24 shown with display device 1027, and wall panels 1070 in FIG. 1). It is important to note that the term "article of furniture" is intended to be a broad term and not a term of limitation. The term "article of furniture," as used in this disclosure, may include, without limitation: systems furniture (e.g., partition wall systems, architectural walls, space frames, work stations, etc.), casegoods (e.g., file cabinets, storage bins, containers, closets, etc.), seating products (e.g., chairs, stools, lounges, etc.), work surfaces (e.g., tables, desk systems, credenzas, etc.), lighting systems, and other accessories.

Additional Exemplary Embodiments

Referring to the Figures, an information display system is shown for use in association with a work environment that may include one or more workstations according to preferred and other exemplary embodiments of the present invention. For purposes of any exemplary or alternative embodiments of the present invention, the work environment may be of any type generally providing a work space for one or more workers. The work space may be divided or otherwise arranged to provide one or more work areas for use by the workers, who may be engaged in any of a wide variety of individual activities or group activities, for example, as may be performed by members of a project team or department. Workstations may be configured within the work environment by including one or more articles of furniture within the work areas in support of the workers and their activities. As indicated in Figures, the information display system may be adapted for use within the work environment or included workstations in wide variety of arrangements, each intended to support individual or collaborative activities of one or more workers, for example, by facilitating the efficient creation, use and storage of information or the configuration and reconfiguration of work areas for the activities.

According to a particularly preferred embodiment, the work environment will be defined at least partially by architectural walls and/or a system of panel walls, such as partial height partitions, any of which may provide a mounting structure for the information display system. As will be shown with reference to exemplary embodiments, the work environment and associated workstations may be arranged to include any of a wide variety of articles of furniture and other associated elements, including additional panel walls configured in any of a wide variety of orientations, chairs or other seating products, storage or casegoods products, tables and other worksurfaces, lighting products or systems, as well as other accessories, electronic or computing equipment and other systems (with associated connectivity such as cabling) known and used in the work environment. According to alternative embodiments, any one or more articles of furniture may provide a mounting structure for the information display system.

Figure 9:
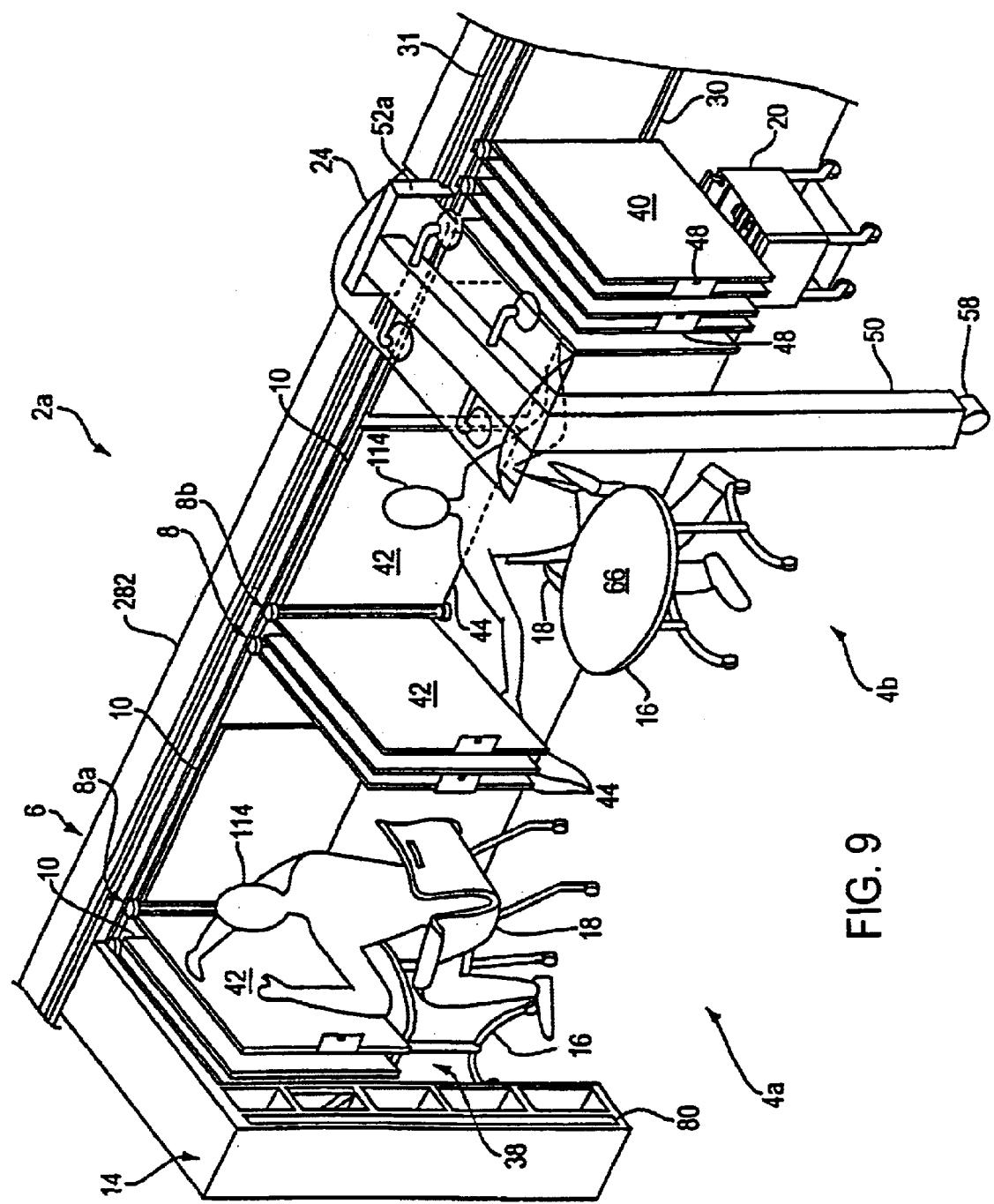
FIG. 9 is a perspective view of a work environment according to an exemplary embodiment of the present invention.

Referring to FIG. 9, a work environment 2a defining a work space is shown according to an exemplary embodiment of the present invention. Work areas including workstations 4a and 4b are provided within the work space defined by work environment 2a. Workstations 4a and 4b, formed along a vertical panel wall 282 standing on a floor 118, can be configured for use by one or more workers 114 (two workers are shown working independently in separate work areas) and to include one or more articles of furniture. Workstation 4a includes a shelving unit 14, a mobile table 16 and a chair 18; workstation 4b includes a mobile file cart 20, mobile table 16 and chair 18. Work environment 2a also includes an information display system 6 and a utility threshold 24 that can be associated with either of workstations 4a and 4b.

Information display system 6 includes a plurality of information-containing structures shown as containers 8. Each container 8 provides two lateral panels shown as a right display panel 44 and a left display panel 44; each display panel 44 provides one exterior surface 40 and one interior surface 42; each container 8 thus provides two exterior surfaces 40 and two interior surfaces 42 for the display or presentation of information. Each container 8 is coupled to a track system shown as a set of horizontal rails 30 mounted to a mounting structure shown as panel wall 282 through a mounting assembly. According to a particularly preferred embodiment, as shown in FIG. 9, the mounting assembly includes a slide mechanism configured to allow for translating movement of the container along the track system and a pivot mechanism configured to allow for pivotal movement of each display panel about a vertical axis with respect to the mounting structure. According to any preferred embodiment, each display panel of the container is coupled to the pivot mechanism so that either display panel can be pivoted with respect to the other display panel. A docking area 38 shown as associated with shelving unit 14 provides a defined and partially covered space or envelope for convenient stowing of one or more containers 8 (as well as other articles of furniture, such as mobile table 16) within workstation 4a.

Utility threshold 24 is coupled to a track system shown as a horizontal rail 31 mounted on the side of panel wall 282. Utility threshold 24 is formed of an "L"-shaped frame with a horizontal frame member shown as a horizontal beam 49 and a vertical frame member shown as post 50. Utility threshold 24 includes a mounting assembly 52a having a slide mechanism 54 (including one or more glide blocks) engaging horizontal rail 31, and a canopy 55 associated with light fixtures 56 attached to beam 49; utility threshold 24 also includes a floor wheel assembly (e.g. shown as a caster 58 or the like) at the base of post 50. As shown, utility threshold 24 is configured for sliding movement along panel wall 282 on horizontal rail 31 and rolling movement along floor 118 on wheel assembly. According to any particularly preferred embodiment, the utility threshold is configured to supply utilities (i.e., voice, power, data, etc.) or connectivity to utilities for use in the work area, see FIGS. 35 and 36.

It should be noted that according to any preferred embodiment, the information display system and its associated elements can be readily and easily be arranged to configure or reconfigure one or more workstations or work areas of varying sizes within the work space given in a work environment, for example by selective arrangement of the containers and/or display panels of the information display system, the utility threshold, and the docking area and other associated articles of furniture, to support one or more workers in individual or group activities. According to alternative embodiments, the docking area may be provided by any of a wide variety of structures or articles of furniture, alone or in combination, that have been arranged to provide a space where containers and/or display panels and articles of furniture can be stowed. In the exemplary embodiment of FIG. 9, two workstations 4a and 4b have been formed, each configured to support individual workers 114 engaged in independent work using information presented on display panels provided by the information display system.

As shown in FIG. 9 and other Figures, information contained on display panels may selectively be revealed or concealed, for example, by selective arrangement of the relative positions of the containers with respect to other containers or associated articles of furniture or by selective arrangement of the pivotal condition of the display panels associated with the containers. When the display panels are oriented so that the interior surface of one display panel of the container is drawn adjacent to and in parallel alignment with respect to the other display panel of the container, the container is said to be in a "closed" condition and information contained on either of the interior surfaces is said to be "concealed." When one display panel of the container is pivoted about the vertical axis out of parallel alignment with respect to the other display panel of the container, the container is said to be in an "open" condition and information contained on both of the interior surfaces is said to be "revealed" (if not otherwise obstructed or concealed from view). Each display panel of the container may independently be pivoted 90 degrees from the closed condition; when each display panel has been pivoted 90 degrees so that the display panels are 180 degrees opposed, the container is in a "fully open" condition and information on both interior surfaces is "revealed", while information on both exterior surfaces is "concealed". Referring to FIG. 9, containers 8 are closed and containers 8a and 8b are partially open (with one display panel pivoted 90 degrees with respect to the other display panel); no containers are shown fully open. As can be seen any number of combined orientations of display panels can cause information to be "revealed" or "concealed" depending on whether a given surface is visible. As will be shown, a display panel may include or be made up of one or more display boards, typically selectively removable boards or sheets that contain information intended for display or to which information may be applied.

Figure 10:
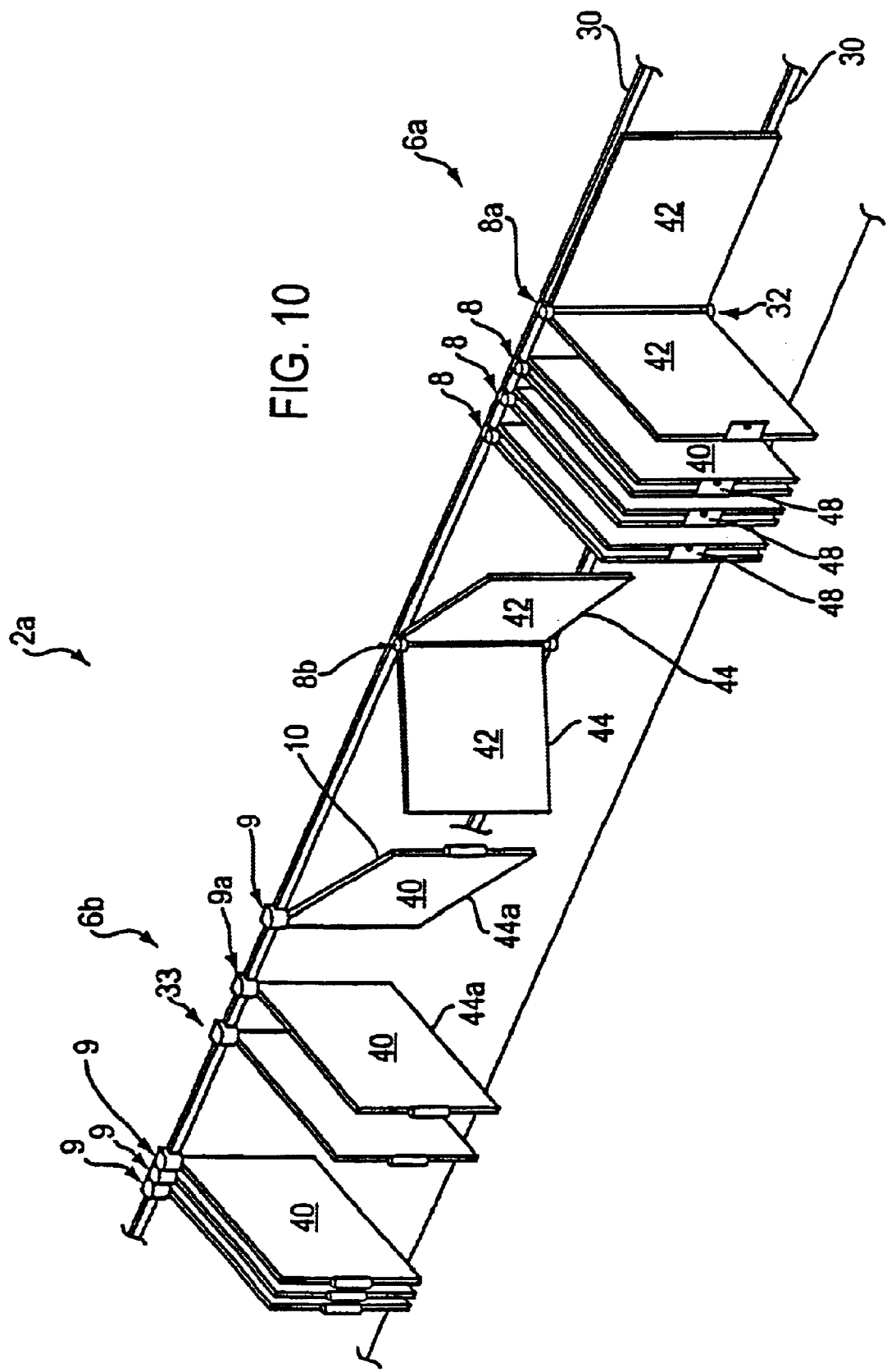
FIG. 10 is a perspective view of an information display system according to an exemplary embodiment of the present invention.

FIG. 10 shows the basic elements of information display systems 6a and 6b according to a first exemplary embodiment and a second exemplary embodiment. According to the first exemplary embodiment, information display system 6a includes containers 8 having a mounting assembly 32 configured for attachment to horizontal rails 30. According to the second exemplary embodiment, information display system 6b includes containers 9 having a mounting assembly 33 configured for attachment to a track system including a single horizontal rail 30. As shown, both mounting assembly 32 and mounting assembly 33 also allow for pivotal movement of associated containers 8 and 9, respectively, with respect to the respective mounting structure. According to the first exemplary embodiment, each container 8a provides two pivotally coupled display panels 44 (i.e. as shown in FIG. 9). According to the second exemplary embodiment, each container 9 includes a single display panel 44a that provides two exterior surfaces 40 (but no interior surfaces). Single display panel 44a is coupled to mounting assembly 33 to allow for pivotal movement with respect to the mounting structure. As is evident, according to either exemplary embodiment, information contained on an exterior surface of a display panel of a container is ordinarily revealed and visible but may be concealed when that container is positioned closely adjacent to another container (or when positioned in a suitable docking area or closely adjacent to a wall or other article of furniture). According to any preferred embodiment, regardless of the number of display panels, the information display system will include containers that selectively allow information presented on the display panels to be revealed and concealed.

Figure 11:
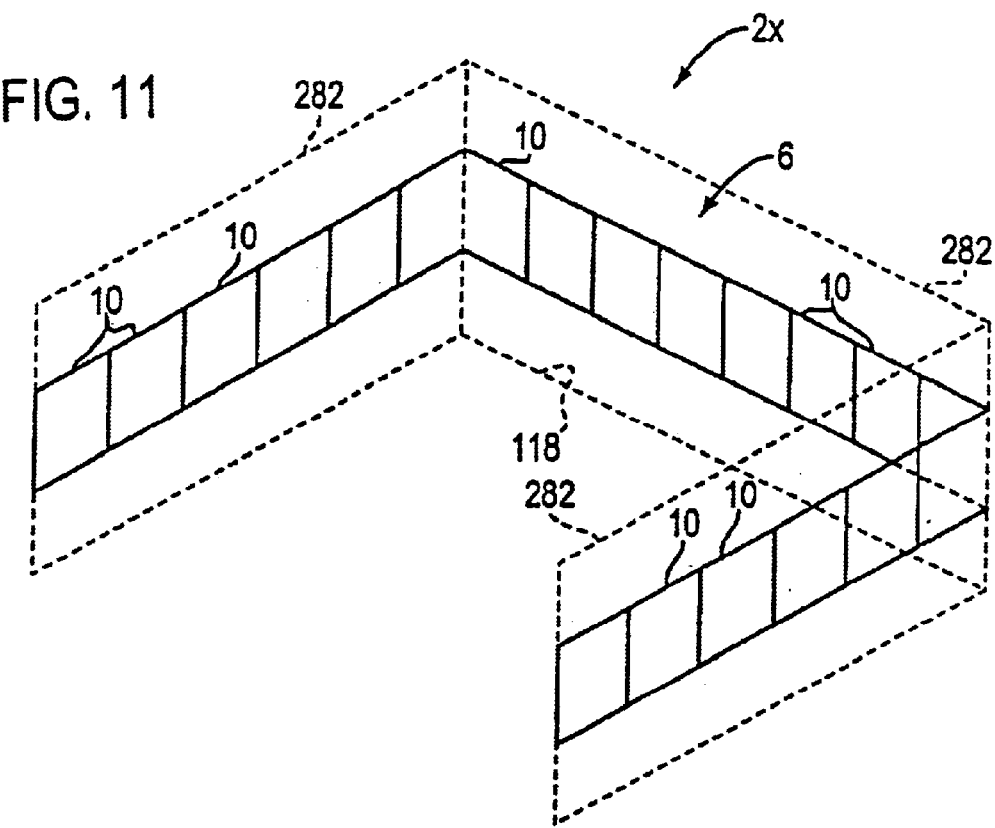
FIG. 11 is a perspective view of a work space provided in a conventional work environment.
Figure 12:
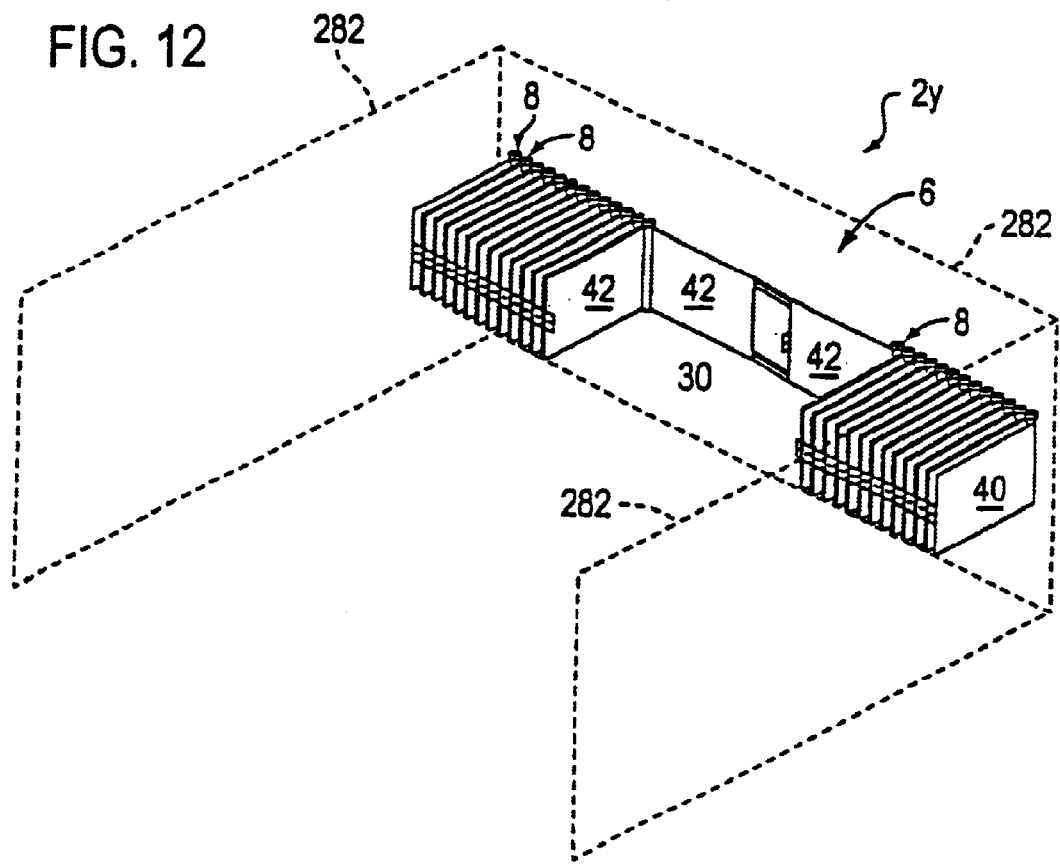
FIG. 12 is a perspective view of a work space provided in a work environment including an information display system according to an exemplary embodiment of the present invention.

As shown in FIGS. 10 and 12, containers 8 of information display system 6 provide for the display of information in a space-efficient, vertical orientation. As a result, by use of the information display system, the total vertically-oriented and prominent space available for display of information within a work environment can be increased in comparison to conventional work environments that do not include the information display system. Referring to FIG. 11, a conventional work environment 2x is shown as a room (i.e. for purposes of example, a room of 18 feet by 21 feet in dimension). Conventional work environment 2x includes four vertical walls (visible are three walls 282) and floor 118; conventional work environment 2x has a fixed amount of vertical wall display area and a fixed amount of work space or floor space. As shown, with each of three walls 282 in use, conventional work environment 2x may contain a fixed number of display boards 10 (e.g. shown to be 19 display boards), which may be mounted to the walls, hung along the walls, or in a sliding mounting interface, etc. (in any event each display board is parallel to the wall on which it is mounted). (For purposes of example, each display board is 3 feet by 4 feet in dimension.) Referring to FIG. 12, a work environment 2y is shown as a room including an information display system 6 according to an exemplary embodiment of the present invention. Although work environment 2y is otherwise identical in size to conventional work environment 2x, and therefore has the same amount of vertical wall display area and floor space, installation of information display system 6 on a single wall 282 has substantially increased the number of display boards 10 that may be contained in work environment 2y. As shown in the exemplary embodiment, information display system 6 presents a total number of 112 display boards 10 (four associated with corresponding display panels of each of 28 containers) on single wall 282; in conventional work environment 2x, single wall 282 presented only seven display boards 10 (while use of all three visible walls presented only a total of 19 display boards). As shown in comparison of FIGS. 11 and 12, and according to any preferred embodiment, the information display system increases the amount of information that can be presented for display within a work environment giving an otherwise fixed amount of wall space or vertical surface area. As shown in FIG. 12 and other FIGURES, the information display system also facilitates the management of a comparatively large volume of information for access, display and storage in a given work environment.

Figure 17:
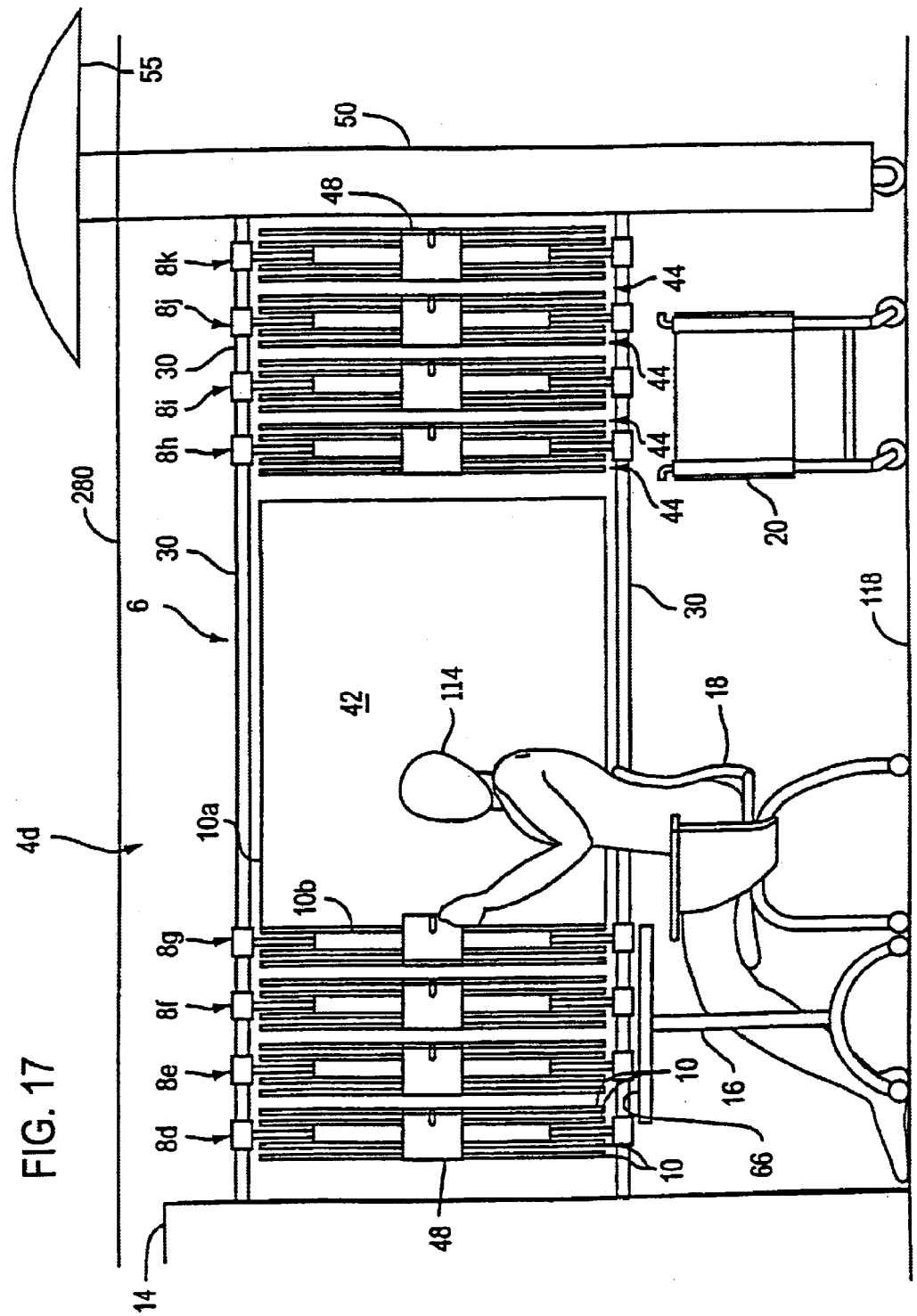
FIG. 17 is a front elevation view of a workstation according to an exemplary embodiment of the present invention.
Figure 18:
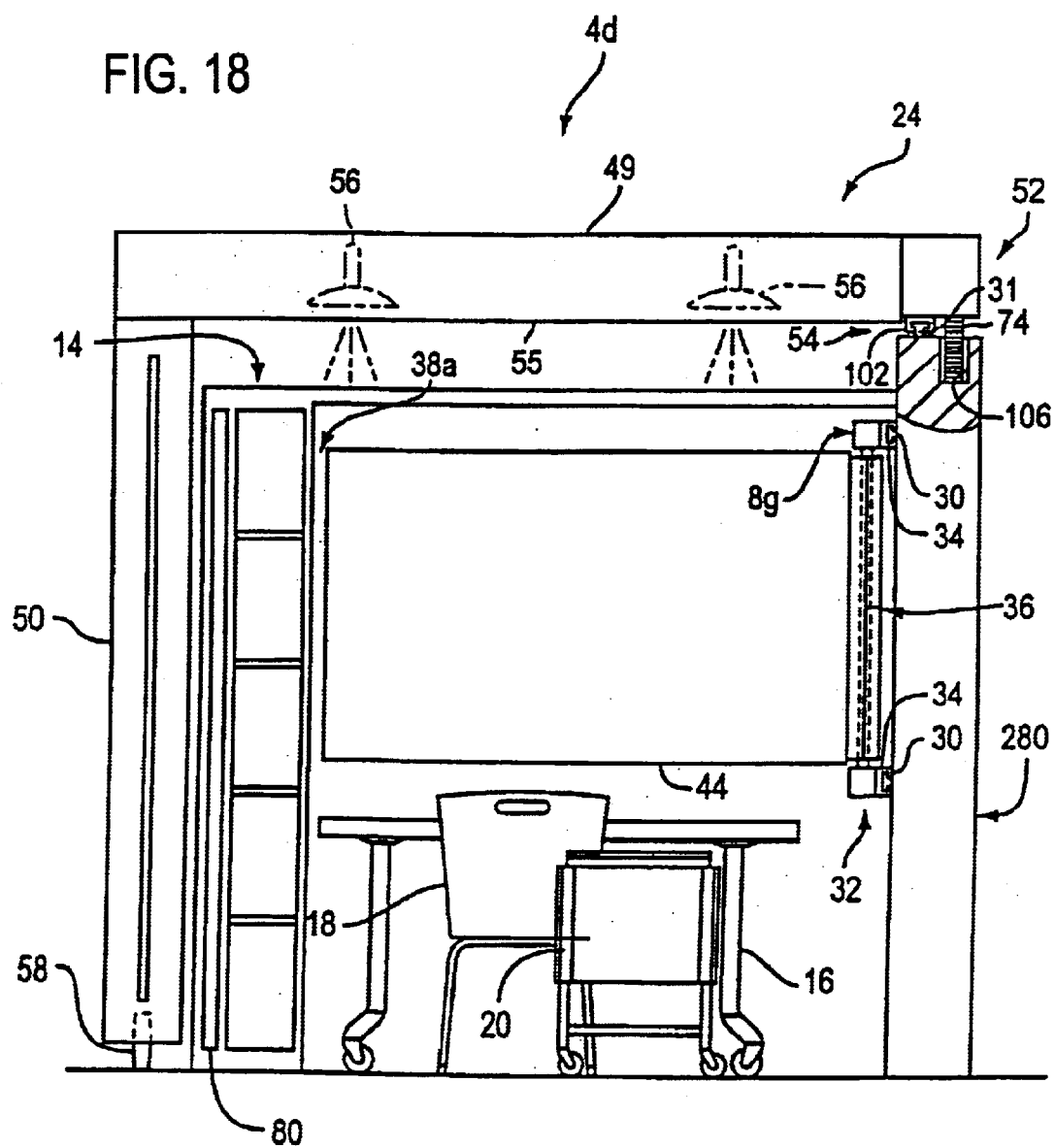
FIG. 18 is a side elevation view of the workstation of FIG. 17.

Referring to FIGS. 17 and 18, an exemplary embodiment of a workstation 4d including an information display system 6 is shown. Information display system 6 has containers 8d, 8e, 8f, 8g, 8h, 8i, 8j, and 8k attached for movement along set of rails 30 mounted on a base panel wall 280. FIGS. 17 and 18 illustrate the spatial relationship between the containers, utility threshold 24, shelving unit 14 providing a docking area 38a, as well as worker 114 and other articles of furniture, including panel wall 280, a table 16, chair 18, and a mobile file cart 20, in workstation 4d. As shown in FIG. 17, worker 114 is seated in chair 18 at table 16 which provides a horizontal worksurface 66 directly beneath open container 8g, so that worker 114 is "immersed" in the information presented at display boards 10a and 10b much like a worker would be in relation to information posted on the relatively fixed walls of a conventional workstation. According to a particularly preferred embodiment, as shown in FIGS. 17 and 18, the containers are configured and installed to allow for free movement along the track system within the workstation above the height of horizontal worksurfaces and other articles of furniture within the work area, yet below the associated utility thresholds or other structures.

As shown in FIG. 18, container 8g includes mounting assembly 32 configured to allow for translating movement along set of rails 30 mounted on the side of panel wall 280. Mounting assembly 32 includes a set of slide mechanisms 34 (each shown as including a glide block) that engage corresponding set of rails 30. Mounting assembly 32 also includes a pivot mechanism 36 allowing independent pivotal movement of each display panel 44 of container 8g with respect to panel wall 280 (see, e.g., FIGS. 38 through 40 and 42 through 46) from the closed condition to the fully open condition. Container 8 may include a locking mechanism 48 that can be engaged to hold container 8 in the closed condition; locking mechanism 48 has elements associated with each display panel of the container that must be disengaged to allow container 8 to be opened (see, e.g., FIG. 49).

Also as shown in FIG. 18, utility threshold 24 includes a mounting assembly 52 configured to allow for translating movement along a track system shown as rail 31 mounted on the top of panel wall 280. Mounting assembly 52 includes slide mechanism 54 shown as including a glide block 102 that engages rail 31. Mounting assembly 52 also includes a utility infeed shown as a flexible conduit 74 within a trough or recess 106 in the top of panel wall 280 to allow utilities (e.g. voice, power, data, etc.) to be supplied from panel wall 280 by or through utility threshold 24 into workstation 4d (see also FIGS. 35 and 36). Horizontal beam 49 of utility threshold 24 is shown positioned at an elevation above the other articles of furniture within workstation 4d; horizontal beam 49 also includes canopy 55 and lighting fixtures 56 for illuminating workstation 4d. Vertical post 50 of utility threshold 24 is shown positioned at a lateral distance outboard of the other articles of furniture within workstation 4d; vertical post 50 also includes caster 58 for rolling on floor 118 to facilitate movement of utility threshold 24 along track 31; vertical post 50 may also provide one or more connections for voice, power and data for use within workstation 4d (see, e.g., FIGS. 35 and 36). Utility threshold 24 is free to move along track 31 without interference from either the containers (e.g. containers 8d, 8e, 8f, 8g, 8h, 8i, 8j, and 8k) or shelving unit 14 (which provides docking area 38a for the containers). Utility threshold 24 itself may be considered to be "docked" when positioned over shelving unit 14. According to alternative embodiments, the utility threshold may be "docked" within a docking area provided by a structure that is larger that the utility threshold or that otherwise is wholly or partially capable of containment of the utility threshold (as well as containers).

Referring to FIGS. 13 through 16, a workstation 4c with an associated information display system 6 is shown in a work environment according to an exemplary embodiment of the present invention. Workstation 4c includes base panel wall 280 and docking area 38a shown as two panel wall sections 62 and 64 (e.g. partial height walls forming a covering "panel wrap") for containers 8d, 8e, 8f, 8g, 8h, 8i, 8j, and 8k of information display system 6. Workstation 4c also includes a mobile table 16 and a mobile storage unit 260. A decorative surface or functional surface treatment (e.g. shown as a dry-erase "white" board 288) may be installed on base panel wall 280 between rails 30, to provide an additional vertical surface within workstation 4c adapted for the display of information.

FIGS. 13 through 16 illustrate the ability of the information display system 6 to effect an efficient and complete transformation of the visual context or "scenery" of a work area shown as including workstation 4c, for example between projects, tasks and personal respites in the course of a work day or work week, etc. Both the territorial appearance (e.g. space allocation or division or orientation of workers) and the contextual appearance (e.g. the nature and purpose of the information, whether functional or decorative) of the workstation may be altered using the information display system, depending upon the information and content and association of each container with other containers and with articles of furniture within the workstation. According to any preferred embodiment, the information display system facilitates both "physical"/territorial reconfiguration and "visual"/contextual reconfiguration within the work environment or the workstation in several ways, including the following: by physical movement of the containers (not only to divide the work space into work areas of varying sizes but also to reveal or conceal information presented on the interior surfaces or exterior surfaces of the containers); by opening and closing the containers to reveal or conceal information presented on the interior surfaces or exterior surfaces of the containers; by changing the display boards associated with the containers; or by revising or modifying the information presented on the display boards. According to any preferred embodiment, the information display system will include display panels that are capable of arrangement, as well as that are sized and proportioned, to evoke a spatial sensation of envelopment and immersiveness for individual workers or groups of workers viewing the information presented. As evident in FIGS. 13 through 16, it is not necessary to move panel walls and other articles of furniture that are generally considered "fixed" once installed in the work environment (or are not otherwise readily repositioned).

Figure 13:
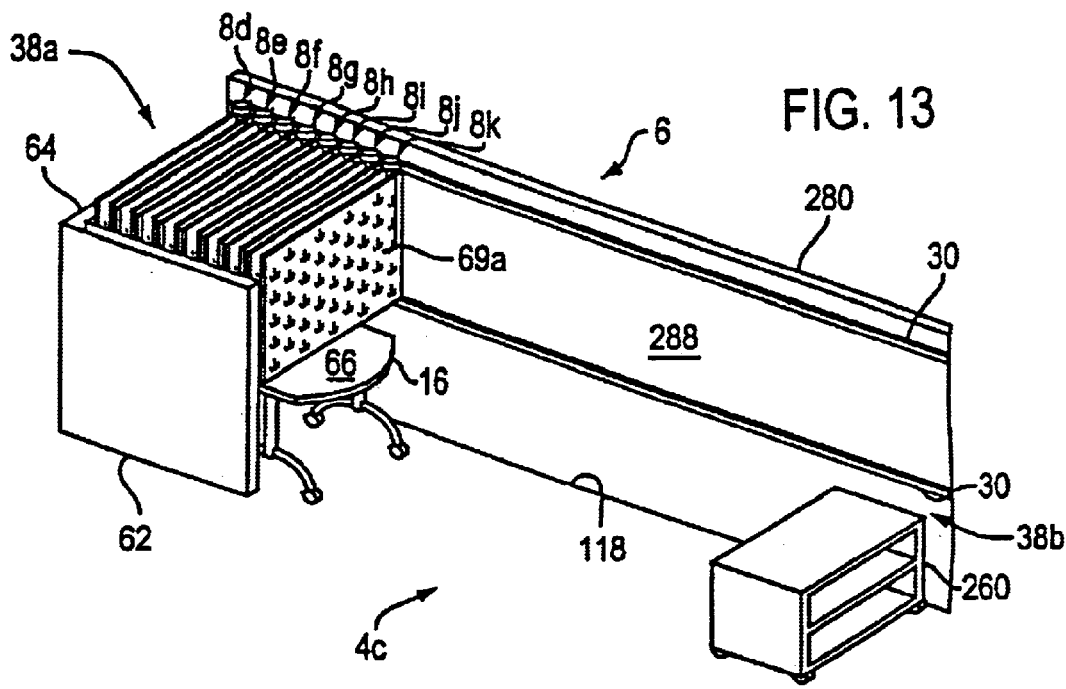
FIG. 13 is a perspective view of a workstation according to an exemplary embodiment of the present invention.
Figure 14:
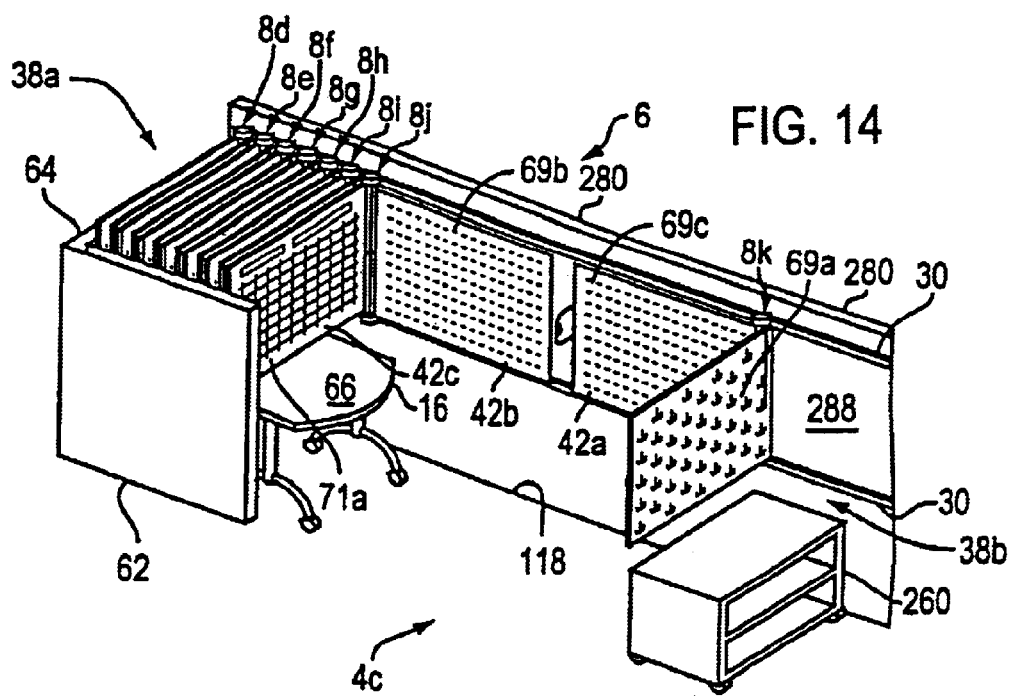
FIG. 14 is a perspective view of a workstation according to an exemplary embodiment of the present invention.
Figure 15:
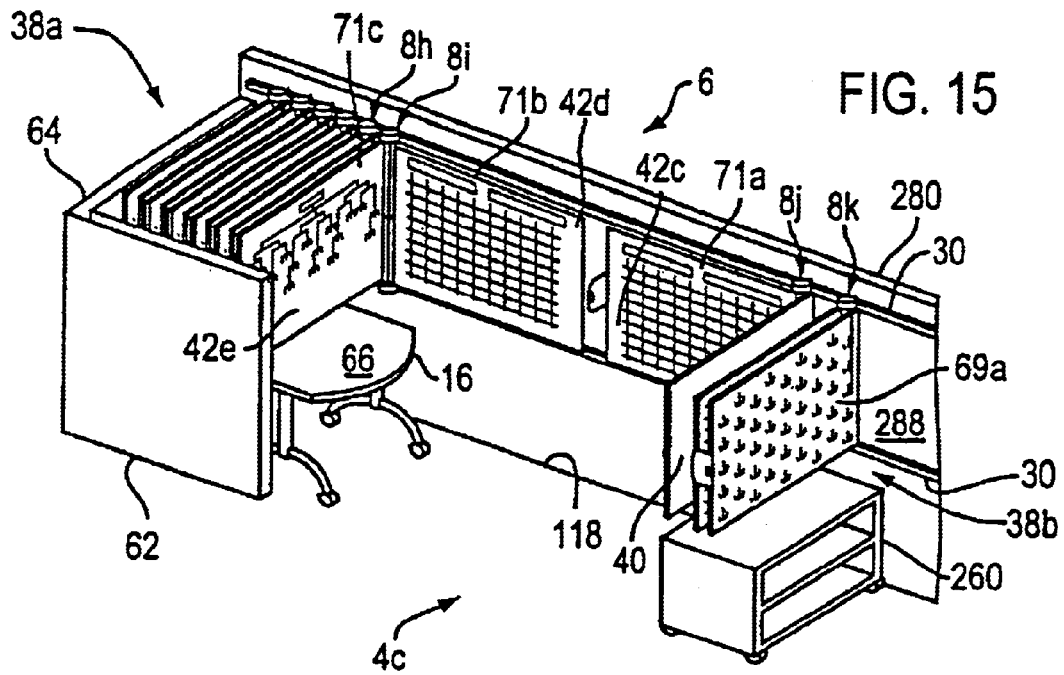
FIG. 15 is a perspective view of a workstation according to an exemplary embodiment of the present invention.
Figure 16:
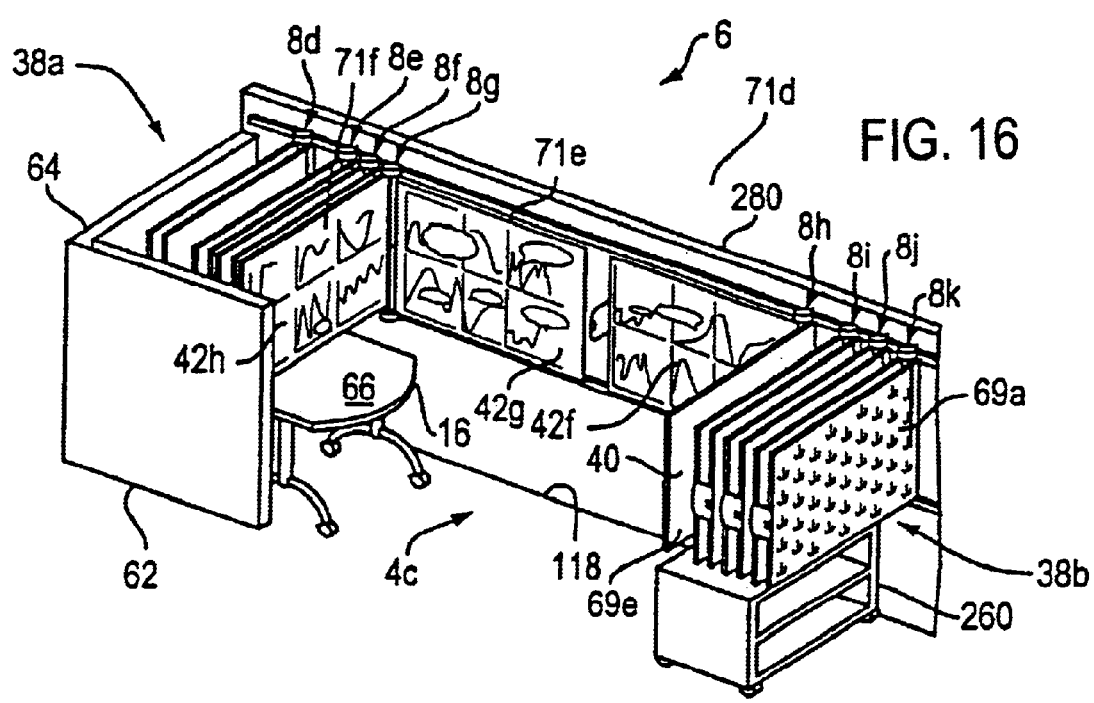
FIG. 16 is a perspective view of a workstation according to an exemplary embodiment of the present invention.

As shown in FIGS. 13 through 16, the "scenery" presented within workstation 4c by information display system 6 including eight containers is readily reconfigurable. In FIG. 13, all eight containers are stowed within docking area 38a so that only one exterior surface 40 of one container 8k is visible; exterior surface 40 bears a decorative image 69a. In FIG. 14, one container 8k has been moved from docking area 38a to a docking area 38b (an uncovered but identifiable space above a mobile storage unit 21); two containers 8j and 8k are open so that four interior surfaces 42a, 42b and 42c are visible within workstation 4c (although only three interior surfaces are visible in FIG. 14), along with one exterior surface 40; one functional image 71a and three decorative images 69a, 69b and 69c are shown. In FIG. 15, two containers 8k and 8j have been moved from docking area 38a to docking area 38b; two containers 8j and 8i are open so that four interior surfaces 42c, 42d and 42e are visible within workstation 4c (although only three interior surfaces are visible in FIG. 15), along with one exterior surface 40; three functional images 71a, 71b, and 71c and one decorative image 69d are shown. In FIG. 16, four containers 8k, 8j, 8h, and 8i have been moved from docking area 38a to docking area 38b; two containers 8h and 8g are open so that four interior surfaces 42f, 42g and 42h are visible within workstation 4c (although only three interior surfaces are visible in FIG. 16), along with one exterior surface 40; three functional images 71d, 71e, and 71f and one decorative image 69e are shown.

It should be noted that the information, images and arrangements shown in FIGS. 13 through 16 are only exemplary (and essentially schematic). According to any preferred embodiment, the interior surfaces and exterior surfaces of the display panels associated with the containers may be provided with any of a wide variety of information and images, functional and/or decorative, in whole or in part, intended to provide one or more workers with an atmosphere that facilitates project work, instruction, rest and rejuvenation, etc. The workstation may itself include a greater or lesser number of containers and/or display panels, capable of movement and association in any of a wide variety of arrangements.

Referring to FIGS. 19 through 34, exemplary embodiments of work environments and workstations including the information display system are shown. As shown in the Figures, both the territorial appearance (i.e. arrangement) and contextual appearance of the work environment and associated workstations can be readily and easily be configured and reconfigured by arrangement of basic elements of the information display system, the utility threshold and other mobile articles of furniture. Space division, or "territorial" reconfiguration of work spaces and work areas, will not require rearrangement of any "fixed" elements, such as panel walls and other articles of furniture that are generally considered to be "fixed" once installed in the work environment insofar as substantial effort (e.g. disassembly, lifting, etc.) or tools are required for movement. Additionally, territorial reconfiguration will not require individual display panels to be detached from the information display system and be independently rearranged. Visual modification, or "contextual" reconfiguration of work spaces and work areas of varying sizes can likewise be effected without rearrangement of any "fixed" elements within the work environment or needing to independently handle detached display panels. According to any preferred embodiment, following initial installation of the "fixed" articles of furniture and information display system and associated elements within the work environment, the individual worker or workers may selectively configure or reconfigure the work space into one or more work areas and workstations, or may selectively arrange the containers to reveal or conceal information presented on the associated display panels, as needed to support their activity or activities. As a result, and as shown in FIGS. 19 through 34, the work environment is capable of flexible and dynamic configuration and reconfiguration to support a wide variety of workers engaged in a wide variety of tasks and activities that may require creation, use and storage of even a large volume of information.

FIGS. 19 through 25 show a work environment 2c in the form of an individual or small group work space. Work environment 2c includes base panel wall 280 and two end panel walls 290 and 292, with shelving unit 14 at each lateral end (and each considered to be "fixed" structures), defining two generally symmetrical work spaces 3a and 3b (one work space on each side of base panel wall 280), which, for purposes of example, can be considered to provide a fixed amount of floor space (e.g. 6 feet by 16 feet in dimension). Work space 3a includes an information display system 6a including a plurality of containers 8d, 8e, 8f, 8g, 8h, 8i, 8j, and 8k. Work space 3a also provides docking areas 38a and 38b for the containers defined by end panel walls 290 and 292 and associated shelving units 14. Work space 3a further includes mobile table 16 and one or more chairs 18. Using FIGS. 19 through 25, work space 3a of work environment 2c will illustrate features provided by information display system 6a according to an exemplary embodiment of the present invention, including the configuration of work areas and workstations for use by one or more workers, and arrangements of containers for revealing and concealing information presented on display panels (i.e. interior surfaces and exterior surfaces) associated with the containers.

Figure 19:
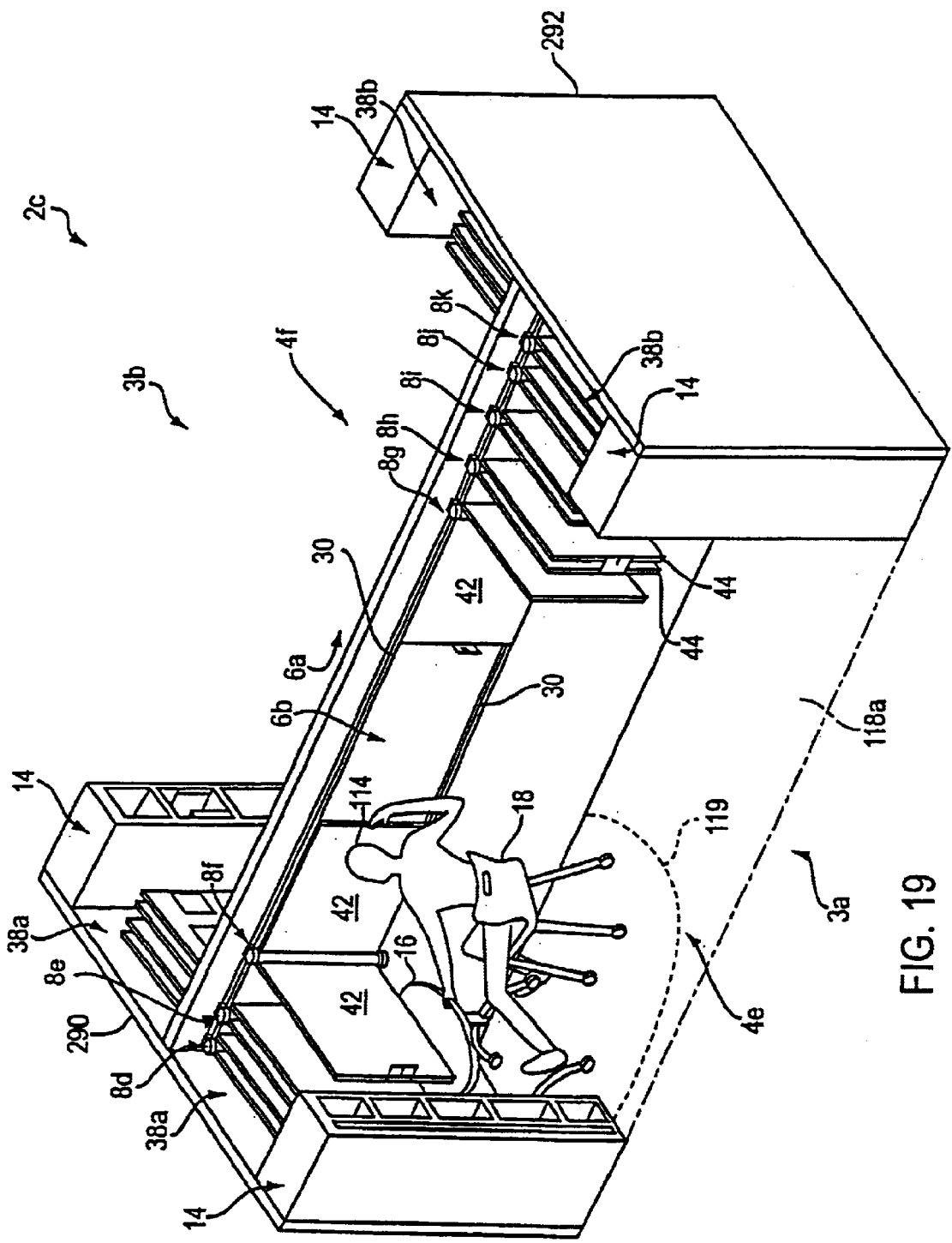
FIG. 19 is a perspective view of a work environment according to an exemplary embodiment of the present invention providing a workstation configured for use by an individual worker.
Figure 20:
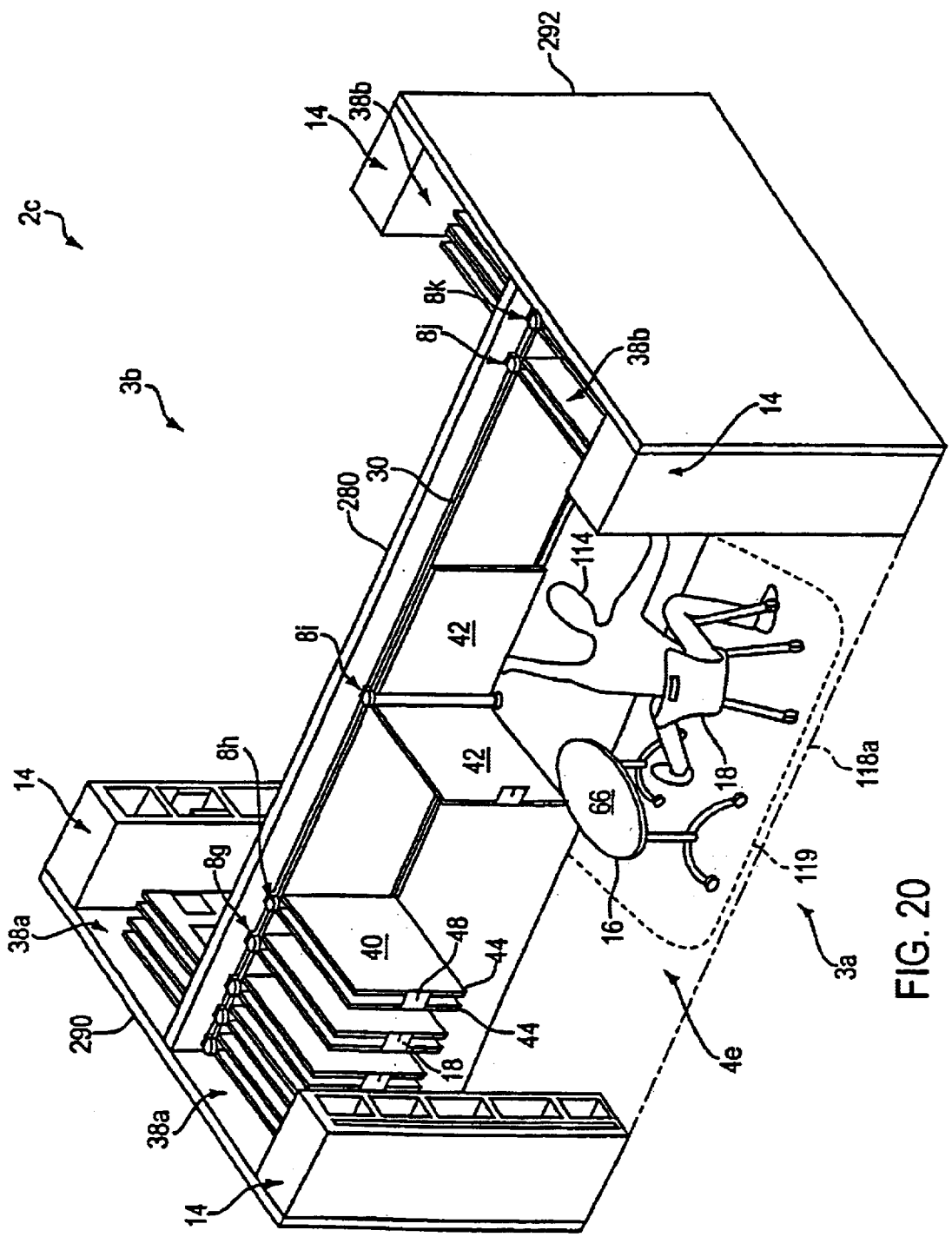
FIG. 20 is a perspective view of the work environment of FIG. 19 wherein the workstation has been configured for use by the individual worker.

Referring to FIG. 19, work space 3a is configured to provide a work area with a single workstation 4e in use by a single worker 114, seated on chair 18 at table 16 near docking area 38a. Worker 114 has opened containers 8f and 8g while other containers are closed; two containers are stowed in each docking area 38a and 38b. Worker 114 has available use of a floor space section 118a (shown in phantom lines) corresponding to the entire amount of fixed floor space provided in work space 3a; however a working portion 119 (shown in phantom lines) of the work space in actual use by worker 114 is a fraction of the floor space section 118a. As shown in FIG. 20, worker 114 has reconfigured workstation 4e but still has use of floor space section 118a. Worker 114 is working at open containers 8i and 8j and has moved with table 16 and chair 18 to the center of work space, closer to docking area 38b. Five containers 8d, 8e, 8f, 8g, and 8h are closed and have been moved near docking area 38a (with three containers "docked"); two containers 8j and 8k are closed and have been "docked" in docking area 38b. Working portion 119 of the work area in actual use by worker 114 is slightly larger than in FIG. 19 (and has been shifted to the opposite end of workstation 4e).

Figure 21:
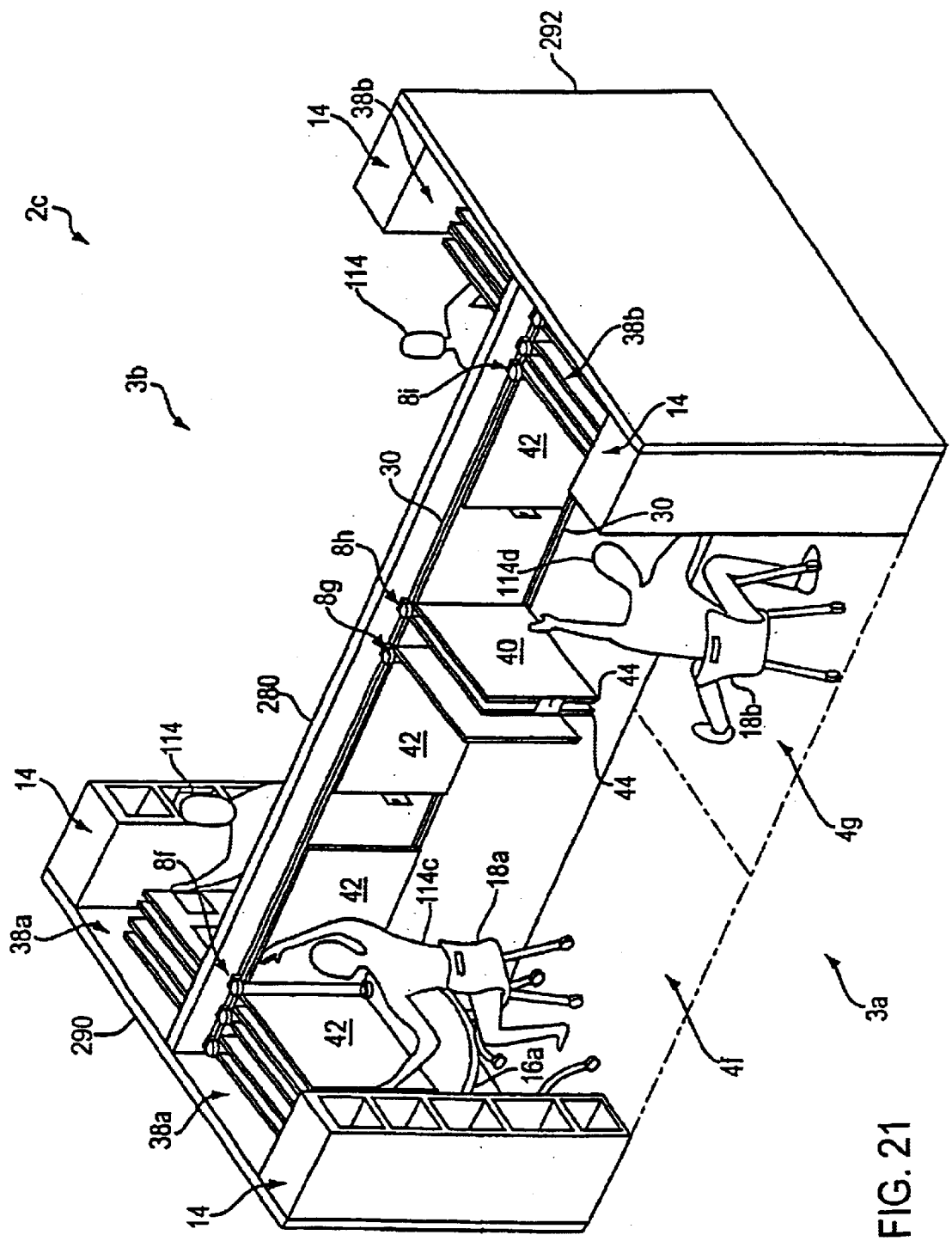
FIG. 21 is a perspective view of the work environment of FIG. 19 providing workstations configured for use by two workers working independently.
Figure 22:
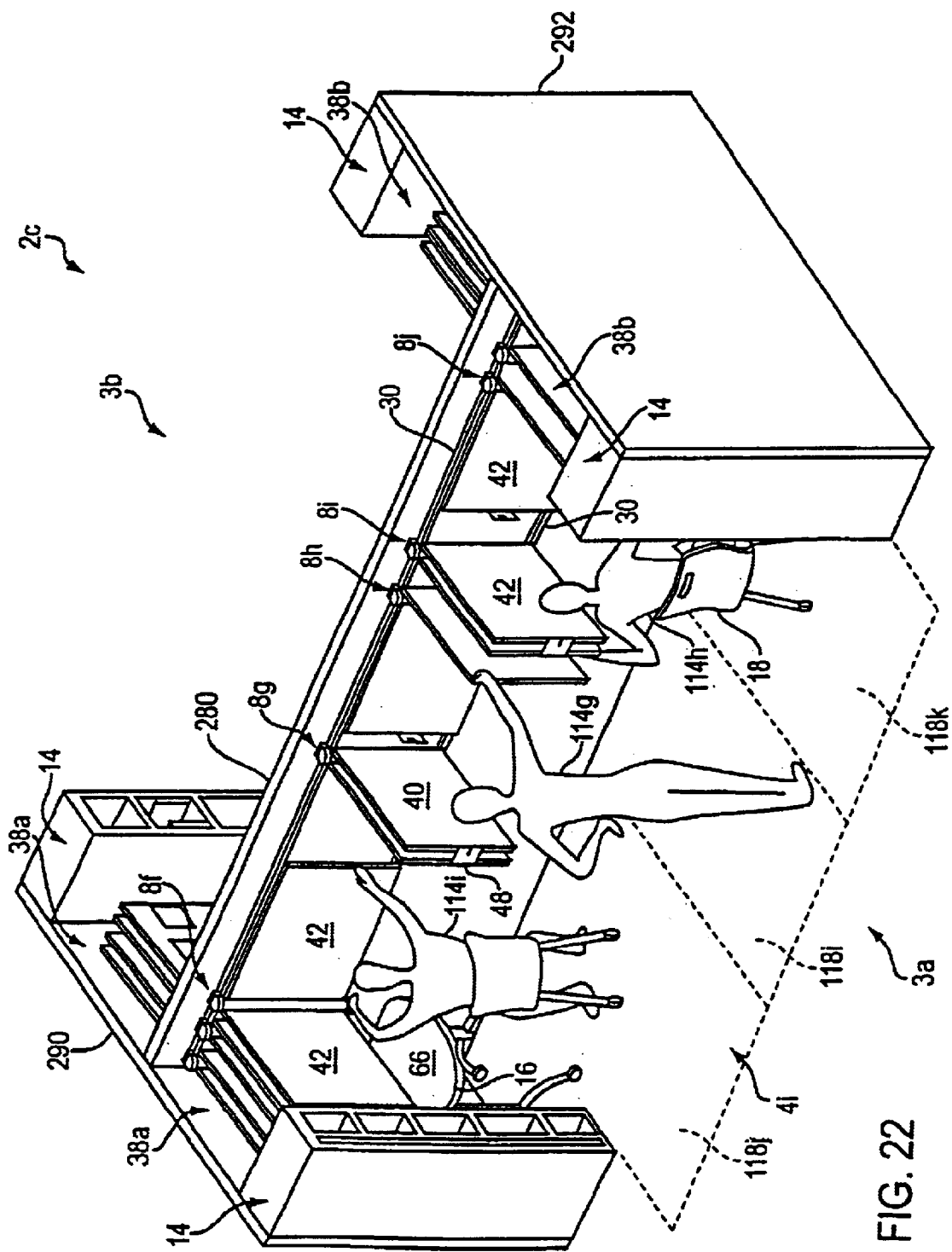
FIG. 22 is a perspective view of the work environment of FIG. 19 providing workstations configured for use by three workers working independently.

Referring to FIG. 21, work space 3a is configured to provide two work areas and two workstations 4f and 4g for two workers 114c and 114d shown sharing the fixed floor space but working independently. Open container 8g and closed container 8h form a "boundary" between workstations 4f and 4g. Worker 114c seated in chair 18a at table 16a and working at open container 8f has use of one floor space section 118b (shown in phantom lines); worker 114d seated in chair 18b and in the process of moving container 8h has use of another floor space section 18c (shown in phantom lines). Each worker 114c and 114d has three containers within docking areas 38a and 38b, respectively. Referring to FIG. 22, work space 3a is configured for independent use by three workers 114g, 114h and 114i in three work areas. Worker 114g (standing) occupies floor space section 118i (shown in phantom lines) at the center of work space 3a and is working at open container 8h and closed container 8g. Workers 114h and 114i are seated and are working at display boards near docking areas 38b and 38a, respectively, in floor space sections 118k and 118j (shown in phantom lines), respectively.

Figure 23:
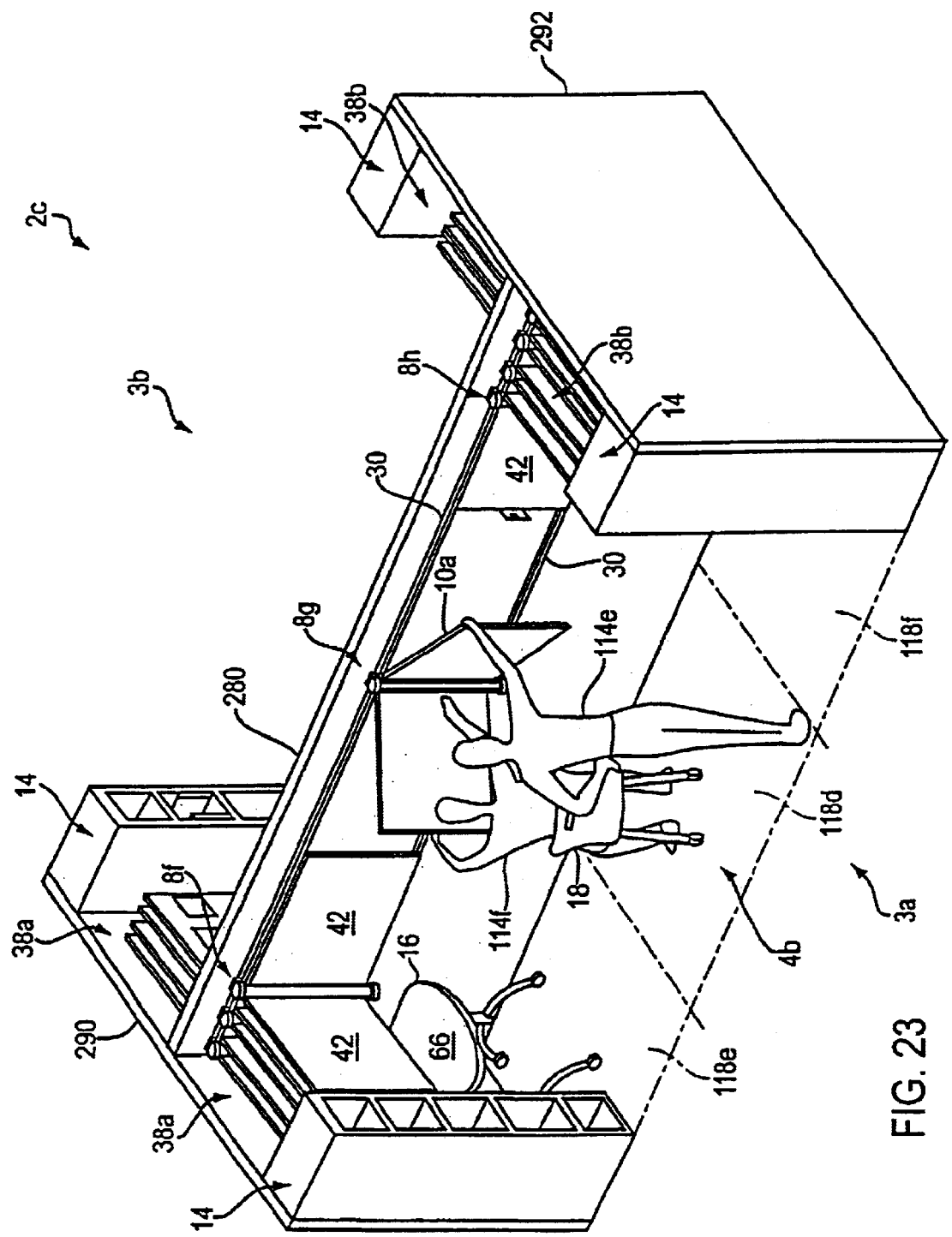
FIG. 23 is a perspective view of the work environment of FIG. 19 providing a workstation that has been configured for use by a group of two workers working collaboratively.
Figure 24:
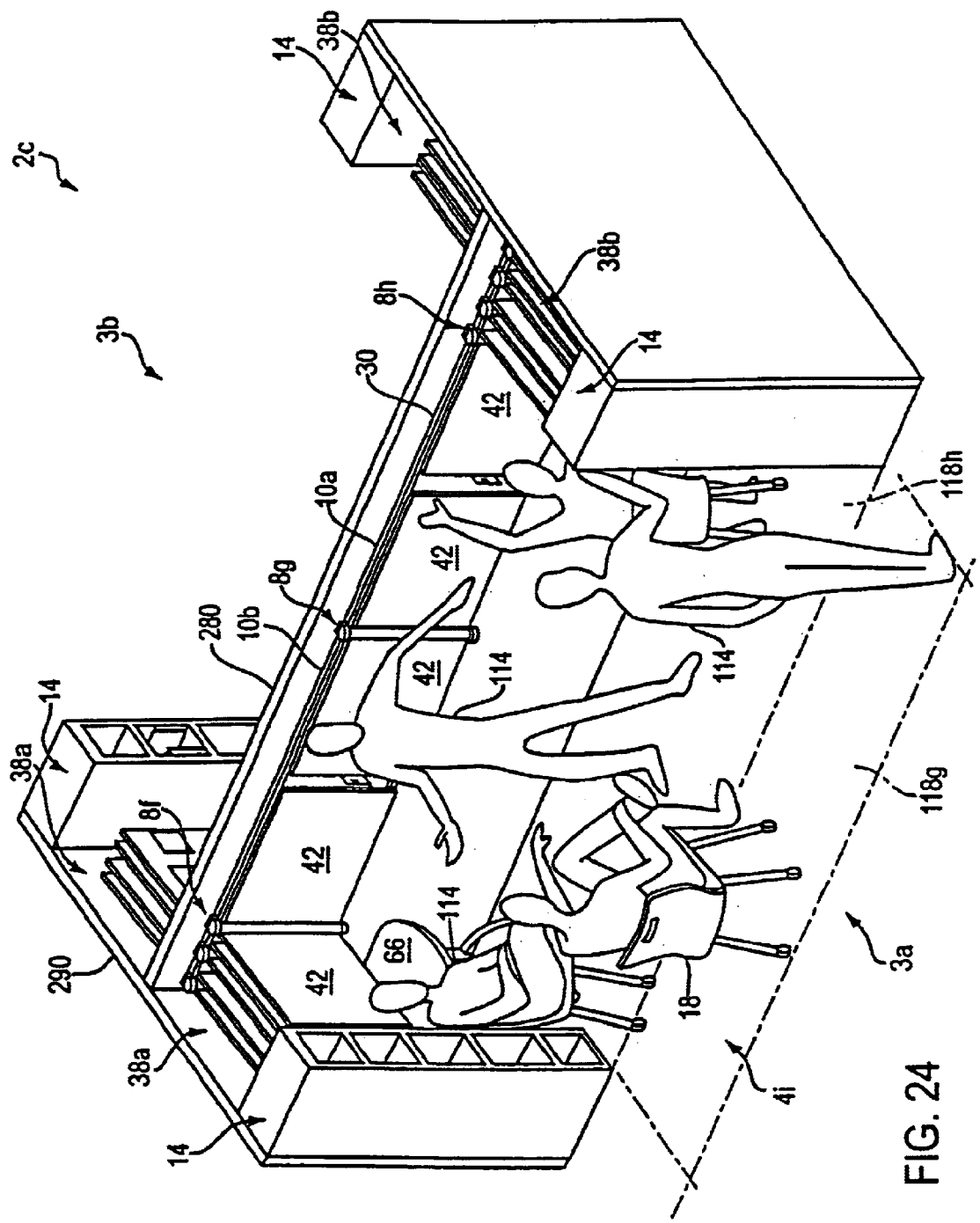
FIG. 24 is a perspective view of the work environment of FIG. 19 wherein the workstation is configured for use by a group of five workers working collaboratively.

Referring to FIG. 23, work space 3a has been configured to provide a workstation 4h used by a small group of two workers 114e (standing) and 114f (seated) working collaboratively in a dyad at an open container 8g (partially opened at a 45 degree angle) and sharing information presented on display boards 10a and 10b (i.e. interior surfaces). Open container 8g defines a central floor space section 118d (shown in phantom lines). At either side of open container 8g are defined floor space sections 118e and 118f not in use by workers 114e and 114f, but within which are located other containers. Referring to FIG. 24, work space 3a is configured to provide a single workstation 4i in use by a large group of workers 114 (e.g. a project team conducting a meeting). As shown, a floor space section 118g (shown in phantom lines) used by a group of workers 114 has extended outside of the fixed floor space provided within work space 3a. Attention of workers 114 is directed to a fully open container 8g presenting information of shared interest on display boards 10a and 10b (i.e. interior surfaces) at the center of work space 3a; open containers 8f and 8h are also in use directly adjacent to fully open container 8g; remaining containers are stowed in docking areas 38a and 38b.

Figure 25:
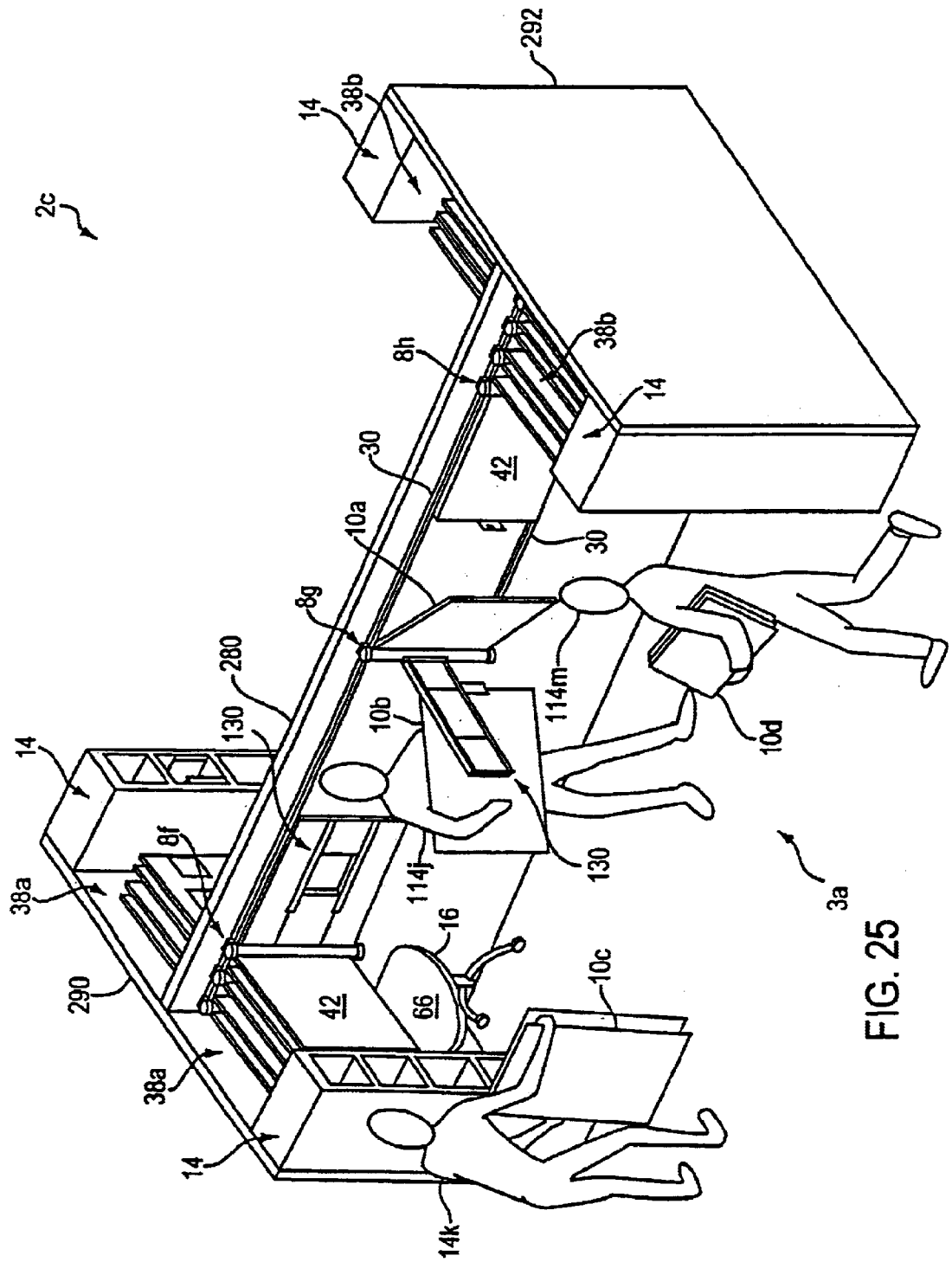
FIG. 25 is a perspective view of the work environment of FIG. 19 wherein the workstation is being reconfigured by the rearrangement of display boards.

Referring to FIG. 25, work space 3a is shown in a transition or reconfiguration state with a display board 10b being removed from container 8g by a worker 114j. Another worker 114k is removing display boards 10c for alternative use or storage. Another worker 114m is bringing replacement display boards 10d (of a smaller size) for installation on containers 8g and 8f. As shown in FIGS. 19 through 25 collectively, and according to any preferred embodiment, the information display system 6a allows for several "methods" of selective transformation of physical space and visual effect within a work space: division of physical space and/or alteration of visual effect by movement of containers (e.g. in association with other containers and/or articles of furniture); division of physical space and/or alteration of visual effect by opening or closing containers to reveal and conceal information; alteration of visual effect by removal and replacement, for example interchange, of display boards associated with a container; and alteration of visual effect by revising the content of information (e.g. rewriting, erasing, posting) on display boards associated with a container.

Figure 26:
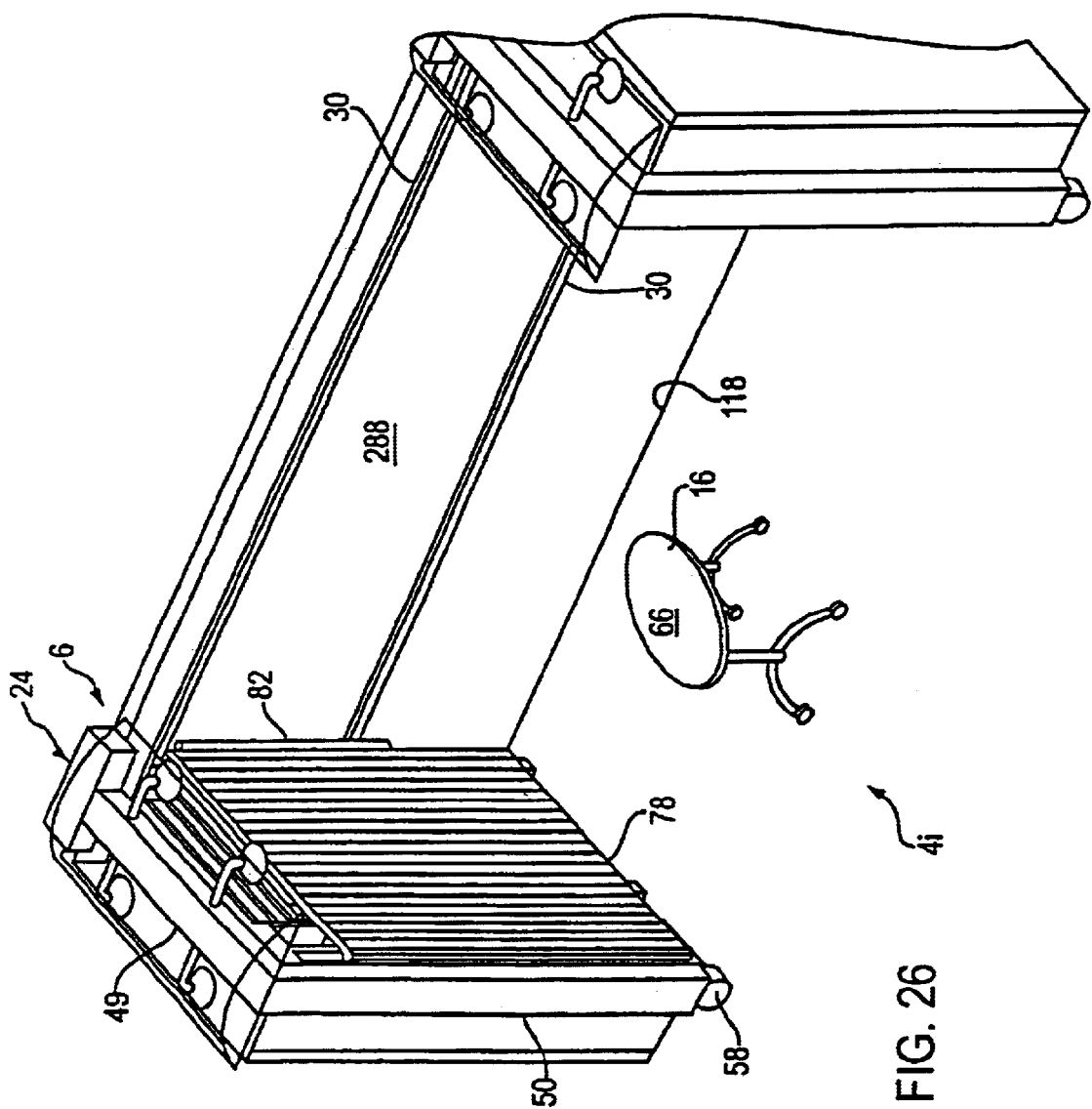
FIG. 26 is a fragmentary perspective view of a workstation according to an exemplary embodiment in a secure condition.
Figure 27:
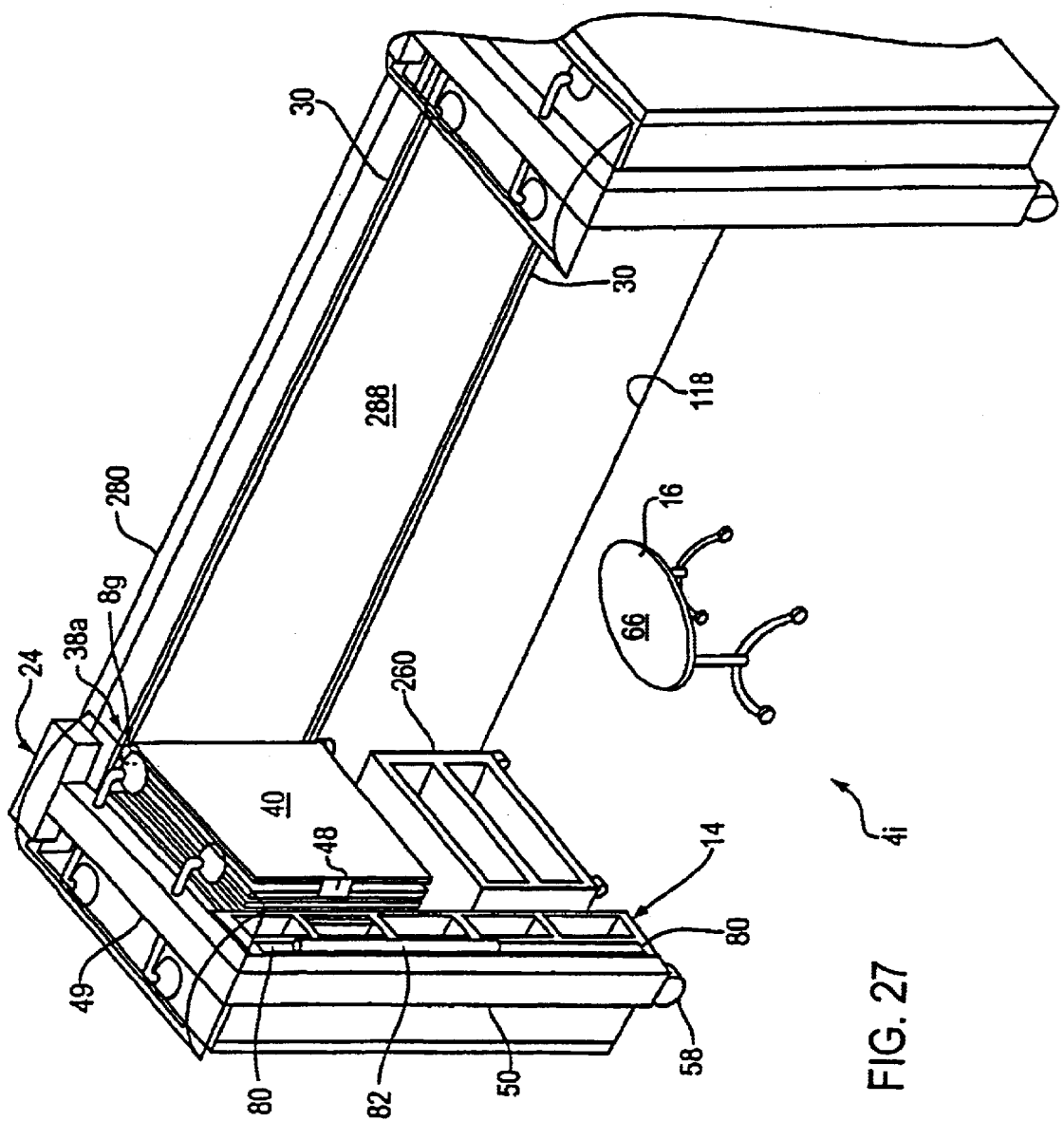
FIG. 27 is a fragmentary perspective view of the workstation of FIG. 26 in an open condition.
Figure 28:
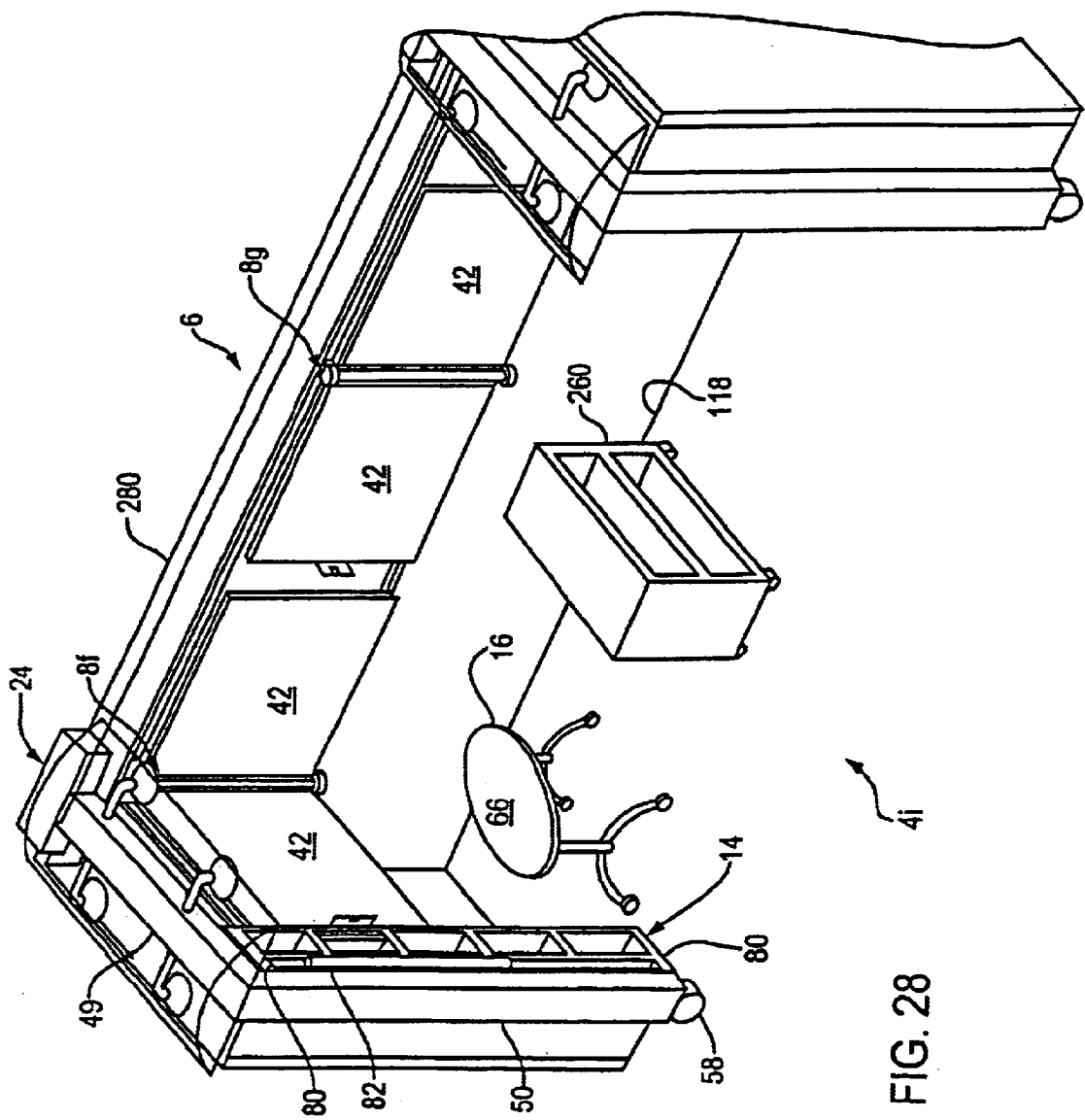
FIG. 28 is a fragmentary perspective view of the workstation of FIG. 26 in an open condition.
Figure 29:
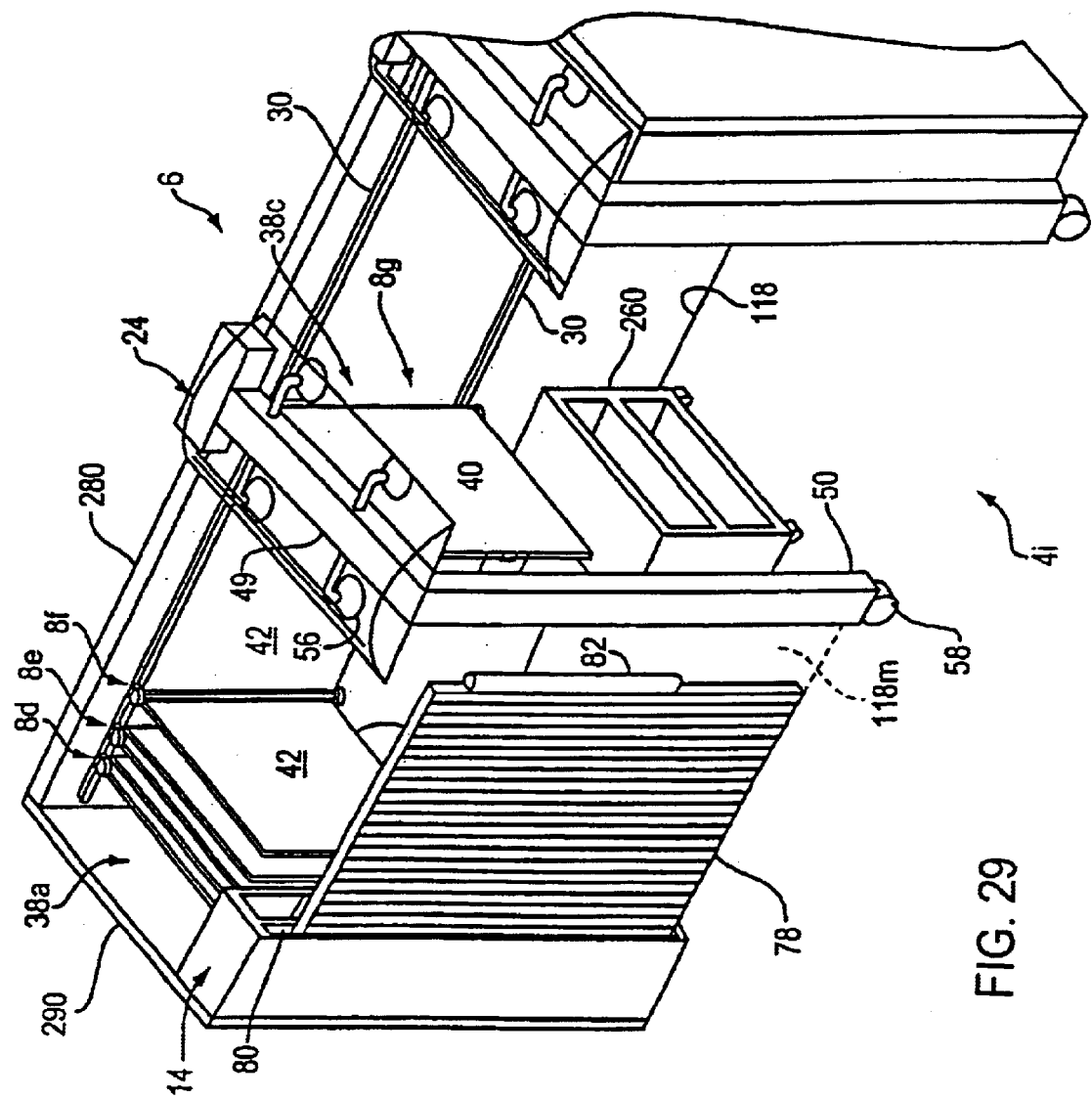
FIG. 29 is a fragmentary perspective view of the workstation of FIG. 26 in a substantially private condition.

FIGS. 26 through 29 show in a work environment workstation 4i of a type similar to that shown in FIGS. 19 and 20 configured for a single worker (not shown) according to an exemplary embodiment of the present invention. Workstation 4i includes base panel wall 280, shelving unit 14 providing docking area 38a for containers 8d, 8e, 8f, 8g, 8h, 8i, 8j, and 8k of information display system 6, and mobile table 16. Workstation 4i also includes utility threshold 24 coupled to the top of panel wall 280 on track 30 for sliding movement. As shown in FIGS. 26 and 29, workstation 4i also includes a retractable partition shown as a privacy screen 78 (e.g. of a type similar to a tambour door according to the exemplary embodiment, but of any type of screen material according to various alternative embodiments). Privacy screen 78 is installed within a vertical recess 80 in shelving unit 14 and can selectively be withdrawn from recess 80 (as shown in FIGS. 26 and 29) or retracted into recess 80 (as shown in FIGS. 27 and 28) by a handle 82 (which may include a locking element such as a hook or clasp to retain privacy screen 78 in engagement with a coacting locking element associated with the panel wall or utility threshold or other structure). As shown in FIG. 26, with containers 8d, 8e, 8f, 8g, 8h, 8i, 8j, and 8k stowed in docking area 38a and utility threshold 24 stowed over docking area 38a, privacy screen 78 can be withdrawn (e.g. drawn across the entry to docking area) to conceal and secure the containers and any articles of furniture within docking area 38a. Workstation 4i is therefore in a secured condition (for example, secured compactly within a 3 feet by 7 feet dimensional footprint). In FIG. 27, privacy screen 78 (not visible) has been retracted into vertical recess 80 so that the contents of docking area 38a, containers 8d, 8e, 8f, 8g, 8h, 8i, 8j, and 8k and a mobile storage unit 260, are visible. In FIG. 28, workstation is "open" with fully open container 8f and open container 8g visible and mobile table 16 and mobile storage unit 260 also visible and available for use. In FIG. 29, utility threshold 24 is deployed (moved along its track) to provide a docking area 38c for a closed container 8g above mobile storage unit 260. Privacy screen 78 is withdrawn toward vertical post 50 of utility threshold 24 to define a floor space section 118m (shown in phantom lines) within which a worker (not shown) can have at least a limited amount of privacy. According to any preferred embodiment, as shown, the retractable partition can be of any material or construction and is configured to provide for security (e.g. in an unoccupied or closed workstation) and privacy (in an occupied workstation).

FIGS. 30 through 34 show a work environment 2d in the form of a work space shown as project team space 3c configurable to support workers engaged in both individual and group activities by providing work areas suited for the activities. Work environment 2d includes a set of base panel walls 280 each including information display system 6. Each information display system 6 includes a plurality of containers 8d, 8e, 8f, 8g, 8h, 8i, 8j, and 8k and 8m, 8n, 8p, 8q, 8r, 8s, 8t, and 8u (adapted for movement along rails 30) and two pairs of utility thresholds 24a and 24b and 24c and 24d (adapted for movement along rails 31). Work environment 2d includes shelving units 14, as well as a panel wall section 88 ("L"-shaped "panel wrap") and a panel wall section 90 ("T"-shaped "panel wrap"), each configured to provide docking areas 38a and 38b for the containers and the utility thresholds. Also included in work environment 2d are mobile tables 16, mobile storage units 260, and mobile file carts 20.

Figure 30:
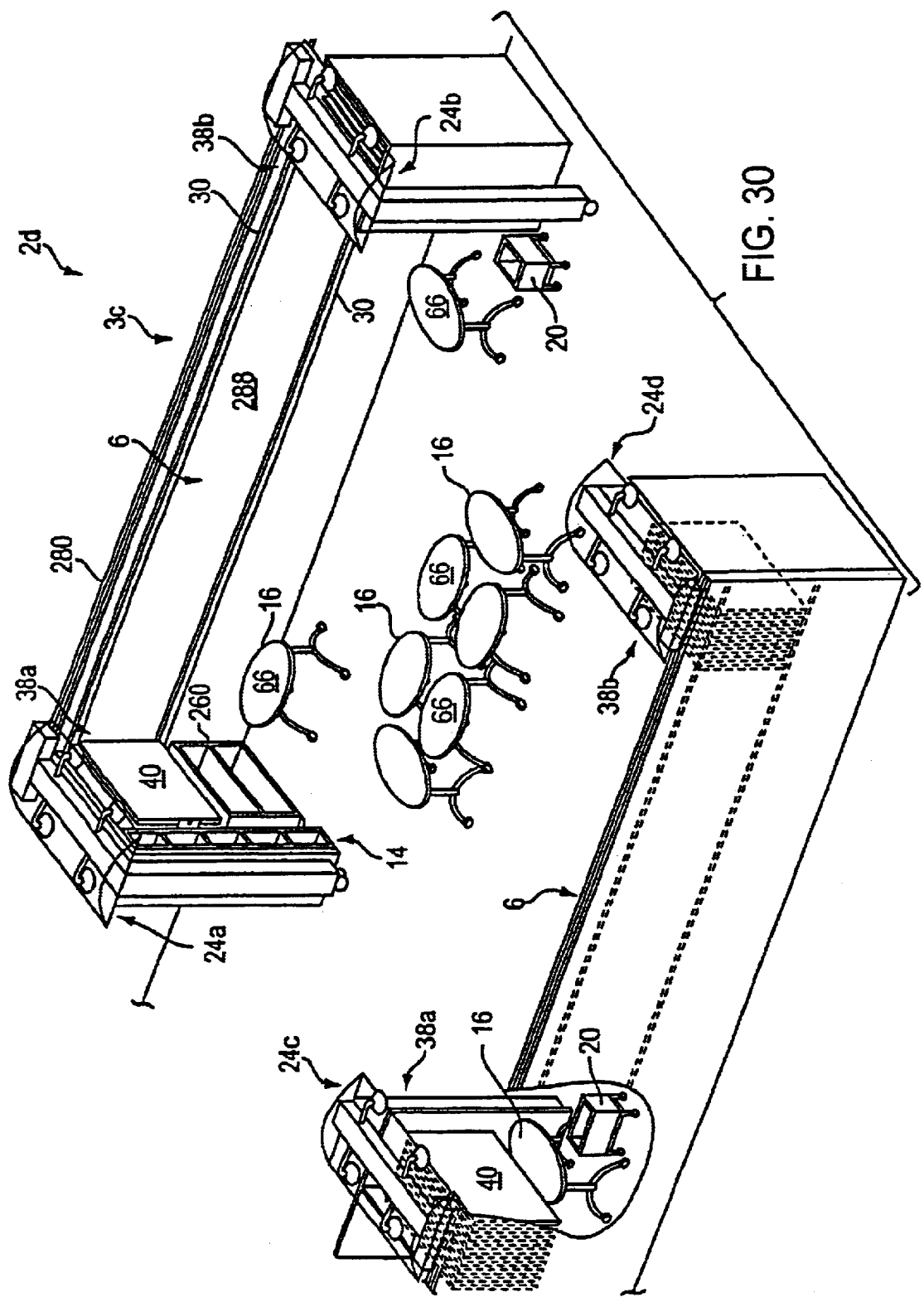
FIG. 30 is a perspective view of a work environment in a stowed and inactive condition.
Figure 31:
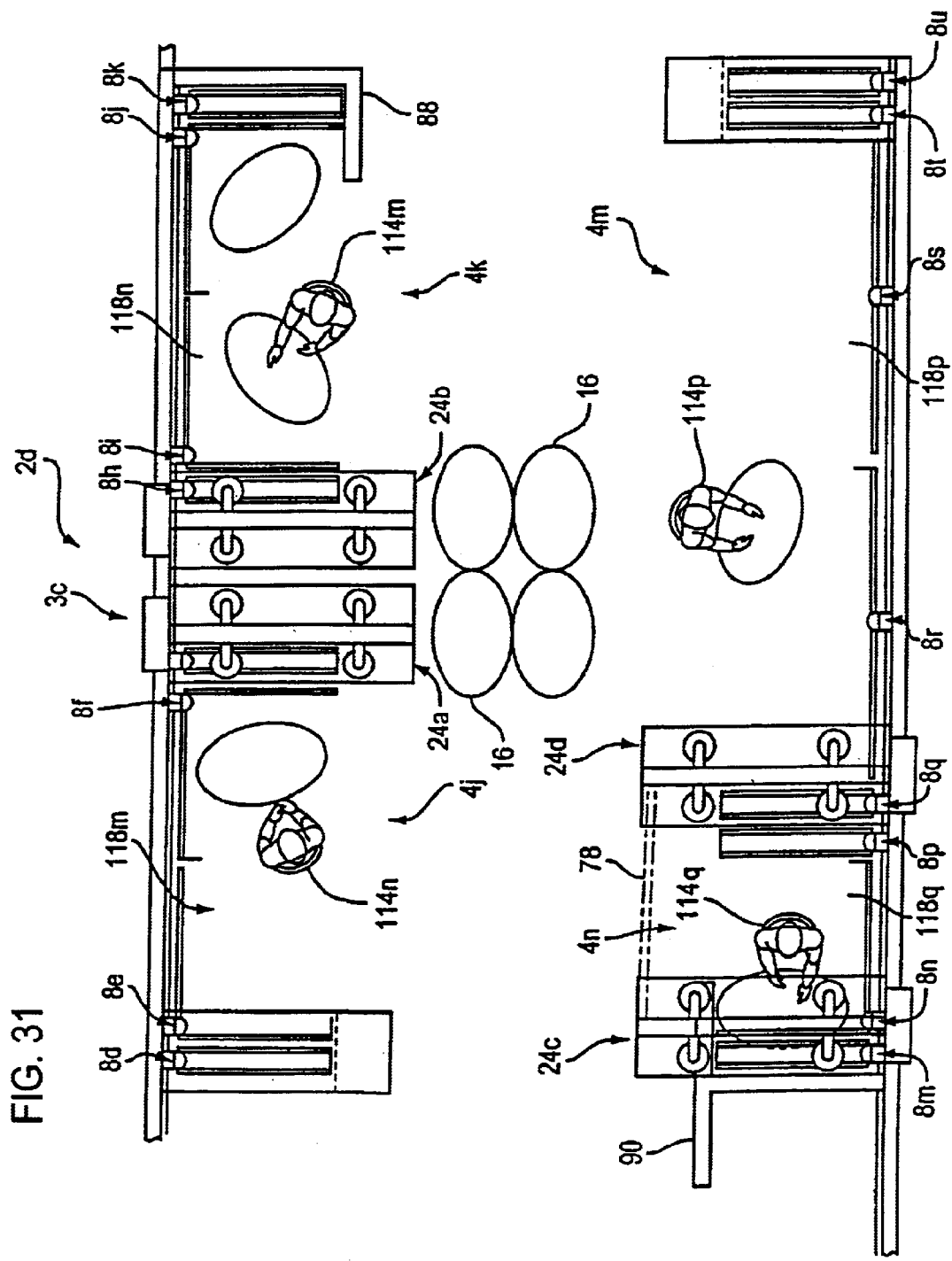
FIG. 31 is a top plan view of the work environment of FIG. 30 in a first active condition.
Figure 32:
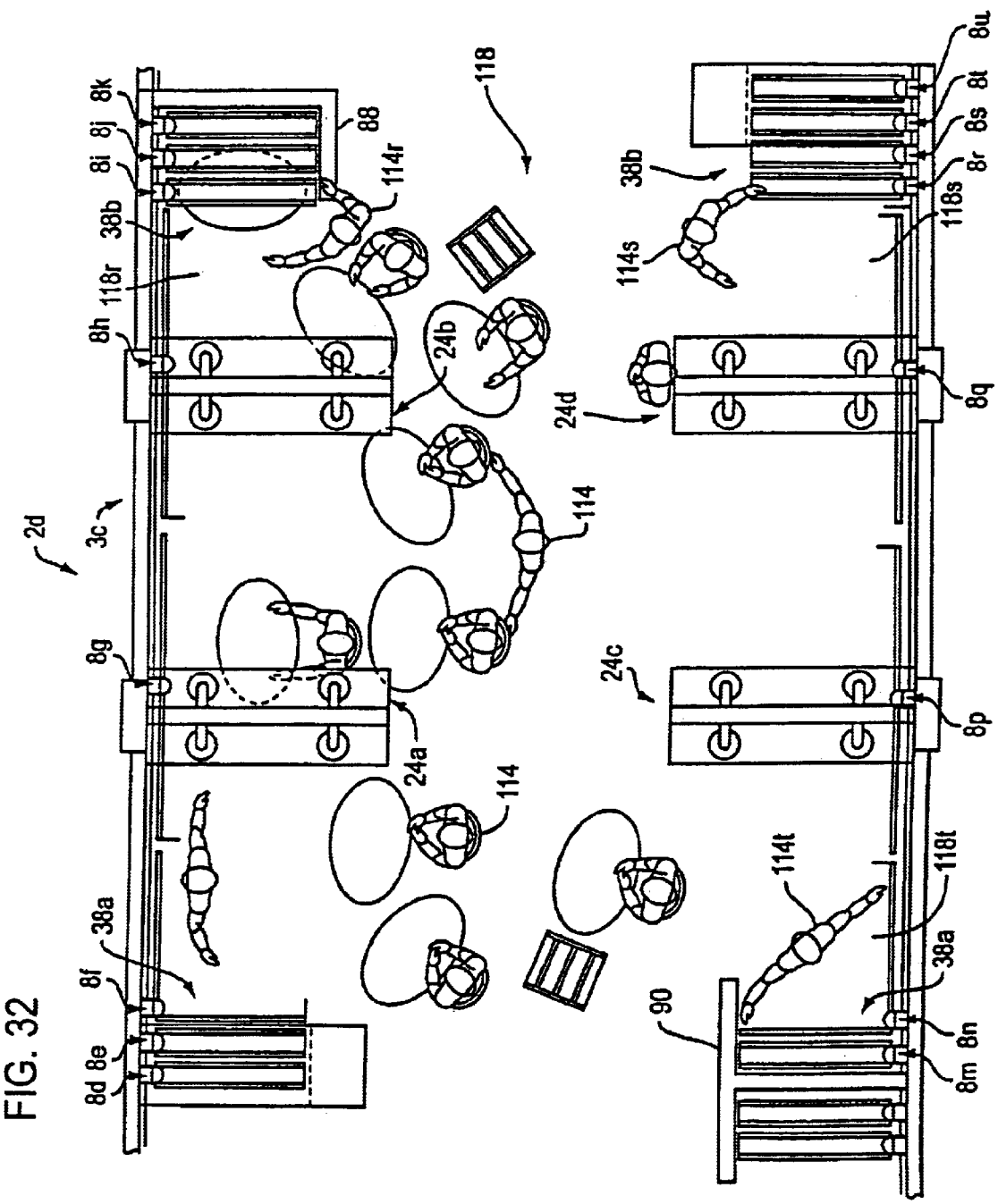
FIG. 32 is a top plan view of the work environment of FIG. 30 in a second active condition.

In FIG. 30, work environment 2d is shown in an inactive condition, for example, as may typically be the case late in the evening or very early in the morning, when no workers are present. All of the containers and each of the utility thresholds are secured and stowed in their respective docking areas. In FIGS. 31 through 34, work environment 2d is shown in various exemplary active conditions. In FIG. 31, four workers 114n, 114m, 114p and 114q have arrived in work environment 2d and are at work independently, for example, as may typically be the case in the morning in preparation for a large meeting. Work space 3c has been divided into floor space sections 118m, 118n, 118p and 118q for independent use by each worker 114n, 114m, 114p and 114q, respectively. Worker 114n is at work in what has been configured as an open and relatively large workstation 4j; workers 114m and 114p are at work in what have been configured as open and intermediately sized workstations 4k and 4m, respectively; worker 114q is at work in a relatively small, but private workstation 4n (using privacy screen 78 (shown in phantom lines)). Each worker has deployed containers and utility thresholds for purposes of using information and establishing the division of fixed floor space within work environment 2d. In FIG. 32, a large group of workers 114 has arrived in work environment 2d, for example, as may typically be the case during a project team (e.g. large group) meeting. Containers 8f through 8h and 8n through 8q are deployed and opened to provide for maximum exposure of information presented on associated display boards (e.g. in the sense of a "theatre display"). A large team meeting space occupying a large central floor space section 118 has been created by the arrangement of the containers and utility thresholds, and most workers are present in the team meeting space. Three workers 114r, 114s, and 114t are each working independently in three separate floor space sections 118r, 118s, and 118t, respectively, near docking stations 38a and 38b (for example, as may be the case if retrieving or preparing a display board for later presentation in the team meeting space).

Figure 33:
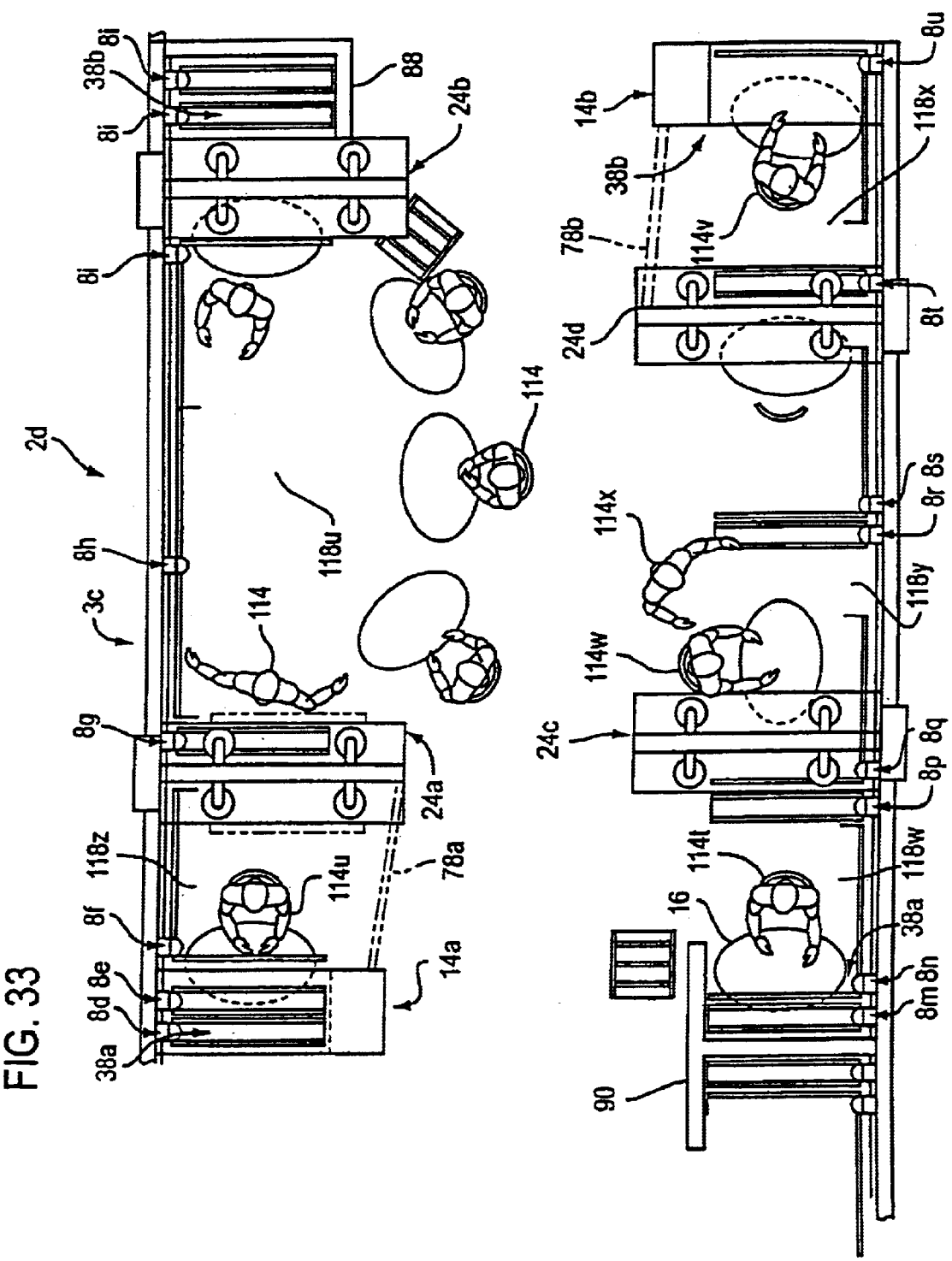
FIG. 33 is a top plan view of the work environment of FIG. 30 in a third active condition.
Figure 34:
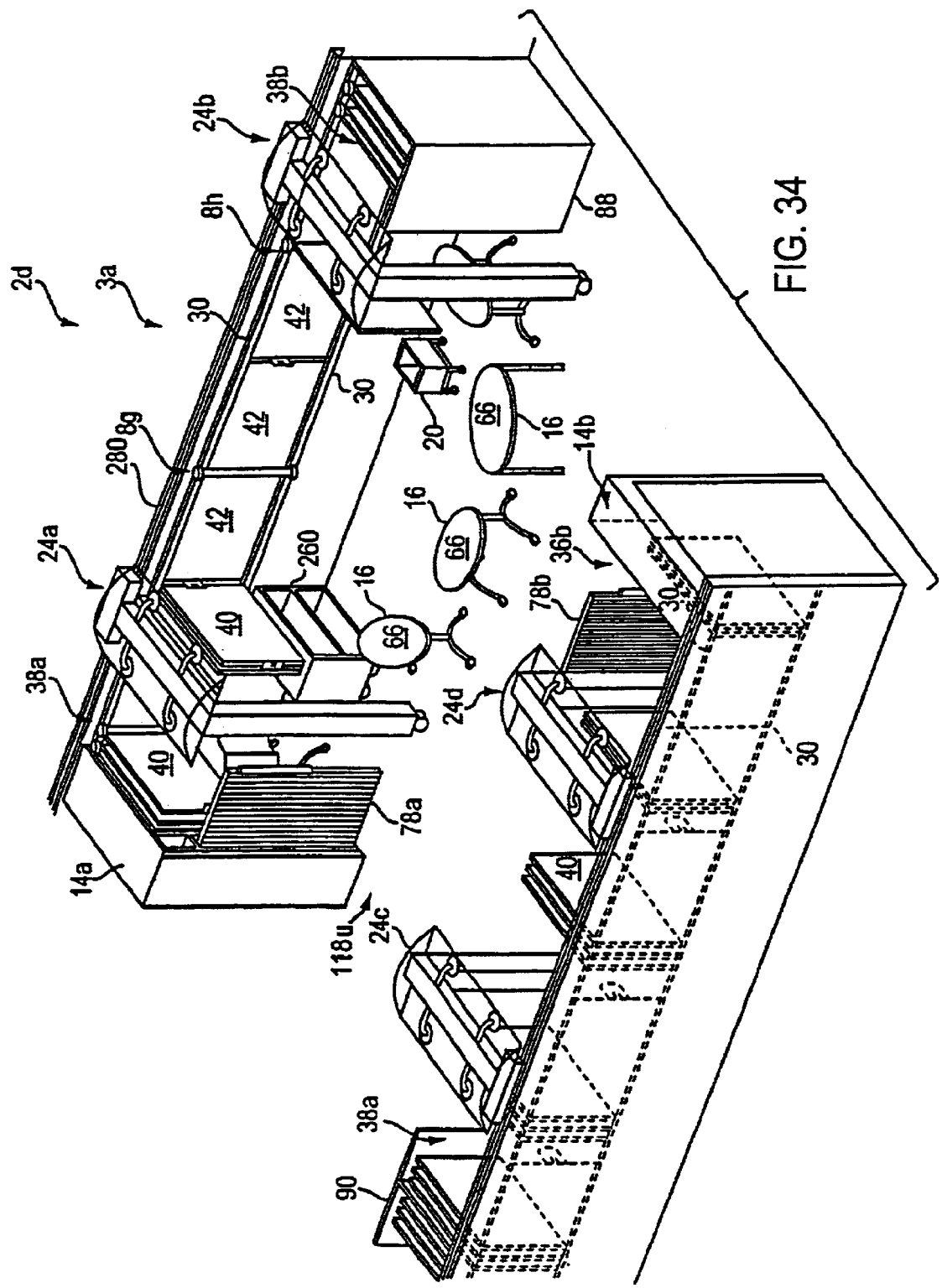
FIG. 34 is a perspective view of the work environment of FIG. 33 (without workers).

In FIG. 33, a smaller group of workers are present in work environment 2d, for example, as may typically be the case for a group conference following a project team meeting. A group conference space occupying a large floor space section 118u (see also FIG. 34) has been provided by (in comparison with FIG. 32) moving utility thresholds 24a and 24b laterally and by deployment of containers 8h and 8i to provide for maximum exposure of information presented on associated display boards (e.g. in the sense of a "theatre display"). Two workers 114u and 114v are shown working independently and privately in separate floor space sections 118z and 118x defined by utility thresholds 24a and 24d, shelving units 14a and 14b (functioning as docking areas 38a and 38b), and closed containers 8g and 8t, respectively. Floor space sections 118z and 118x are made private through the use of a privacy screen 78a and 78b (shown in phantom lines in FIG. 33), respectively. A floor space section 118w is in use by an individual worker 114t seated at mobile table 16 within docking area 38a. A floor space section 118y is in shared use by two workers 114w and 114x working collaboratively. As shown in FIGS. 30 through 34, according to any preferred embodiment, the work environment is readily configured and reconfigured to provide work spaces and workstations for individual workers, small groups and large groups of workers involved in a wide variety of types of project work.

Figure 35:
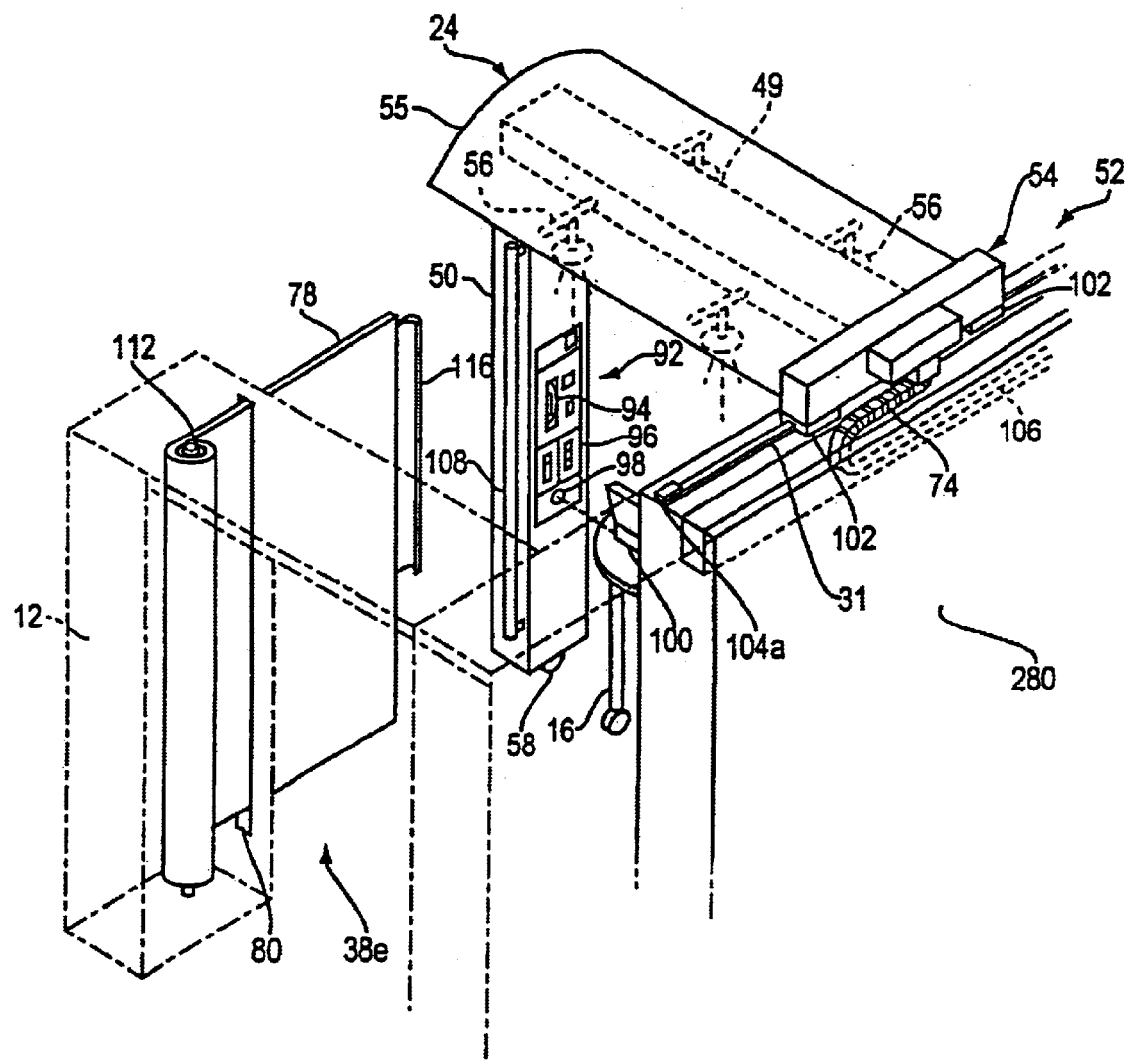
FIG. 35 is a perspective view of a workstation including a utility threshold and docking area according to a preferred embodiment.
Figure 36:
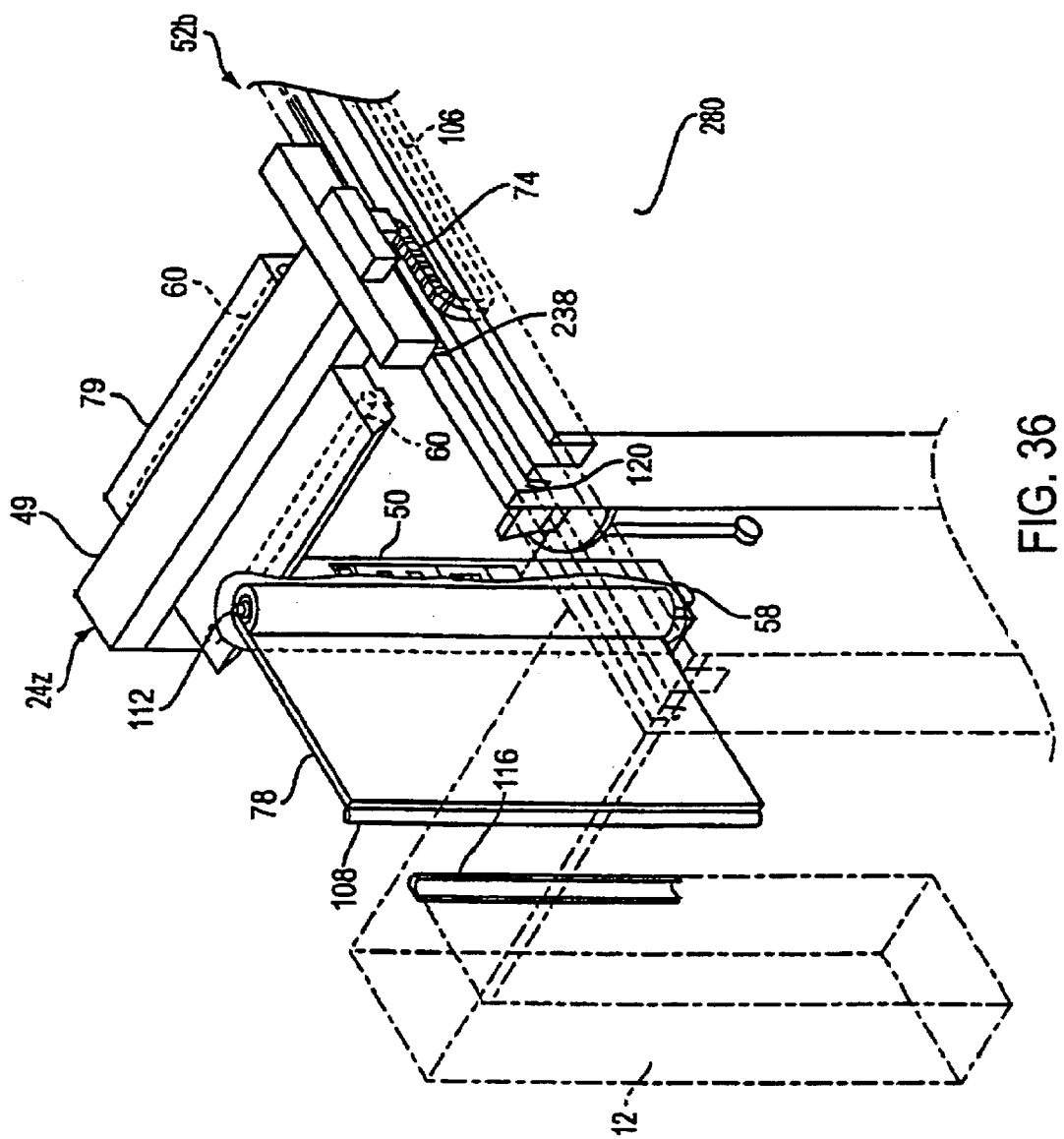
FIG. 36 is a perspective view of a workstation including a utility threshold and docking area according to an alternative embodiment.

Referring to FIGS. 35 and 36, exemplary embodiments of utility thresholds 24 and 24z, respectively, associated with panel wall 280 are shown. In FIG. 35, utility threshold 24 has horizontal beam 49 and vertical post 50. Beam 49 includes lighting fixtures 56 and canopy 55; post 50 includes a utility delivery zone 92 shown as including a telephone 94 and outlets 96 for delivery of voice, power and data signals (e.g. outlets or connections of any conventional type). Utility delivery zone 92 also includes an infrared port 98 shown in communication with a portable computer 100 resting on mobile table 16. Utility threshold 24 includes mounting assembly 52 including glide blocks 102 that interface with rail 31 on top of panel wall 280. (Rail 31 also includes a "stop" shown as block 104a to keep utility threshold 24 from sliding off of rail 31.) A utility infeed shown as flexible conduit 74 is also provided in mounting assembly 52 for communication with utility delivery zone 92 of post 50. Flexible conduit 74 travels along the top of panel wall 280 in a trough or recess 106 (shown in phantom lines) as utility threshold 24 translates (i.e. slides along rail 31). Flexible conduit 74 is coupled to and contains voice, power, data cabling (shown schematically) through panel wall 280. (According to a particularly preferred embodiment, the flexible conduit is of a type available under the name CONDUFLEX available from KabelSchepp Cable Carrier Systems.) Post 50 of utility threshold 24 also includes caster 58 at its base and a handle 108 along its side wall.

Also shown in FIG. 35 is a docking area 38e in the form of a cabinet 12 (shown in phantom lines) containing a retractable partition shown as roll-up privacy screen 78 (that can be retracted under spring tension). Privacy screen 78 is provided on a roller 112 and is of a rigidified fabric material and extends through vertical recess 80 in cabinet 12; privacy screen 78 includes a clasp 116 that engages handle 108 of utility threshold 24 to hold privacy screen 78 in a withdrawn position so as to define a private space within the associated workstation. When clasp 116 is disengaged from handle 108, spring tension will retract privacy screen 78 through vertical recess 80 and onto the roller 112 within cabinet 12.

Utility threshold 24z is shown in FIG. 36, according to an alternative embodiment (similar in certain respects to utility threshold 24 shown in FIG. 35). Mounting assembly 52b of utility threshold 24z includes a set of wheels 238 that travel within a track shown as a groove 120 in the top of panel wall 280 to allow translating (i.e. rolling) motion of utility threshold 24z with respect to panel wall 280. In utility threshold 24z, a retractable partition shown as privacy screen 78 is supplied on roller 112 within post 50 of utility threshold 24z; clasp 116 on cabinet 12 (shown in phantom lines) engages handle 108 of utility threshold 24z to hold privacy screen 78 in a withdrawn position (i.e. against spring tension) so as to define a space within the associated workstation. As also shown according to the alternative embodiment of FIG. 36, beam 49 of utility threshold 24z includes two fluorescent lighting fixtures 60 under a canopy 79.

According to a particularly preferred embodiment, the frame members of the utility threshold (e.g. horizontal beam and vertical post) have a construction similar to the space frame systems disclosed in U.S. Pat. No. 5,511,348 titled "FURNITURE SYSTEM", incorporated by reference herein, and in U.S. Pat. No. 5,899,025 titled "FURNITURE SYSTEM", incorporated by reference herein, and employed in the CONJUNCTION™ Space Frame available from Steelcase Inc. of Grand Rapids, Mich. According to alternative embodiments, the utility threshold and its associated elements (e.g. frame members, mounting assembly, utility delivery zone, lighting fixtures, canopy, privacy screen, etc.) may have any of a wide variety of constructions.

Figure 37:
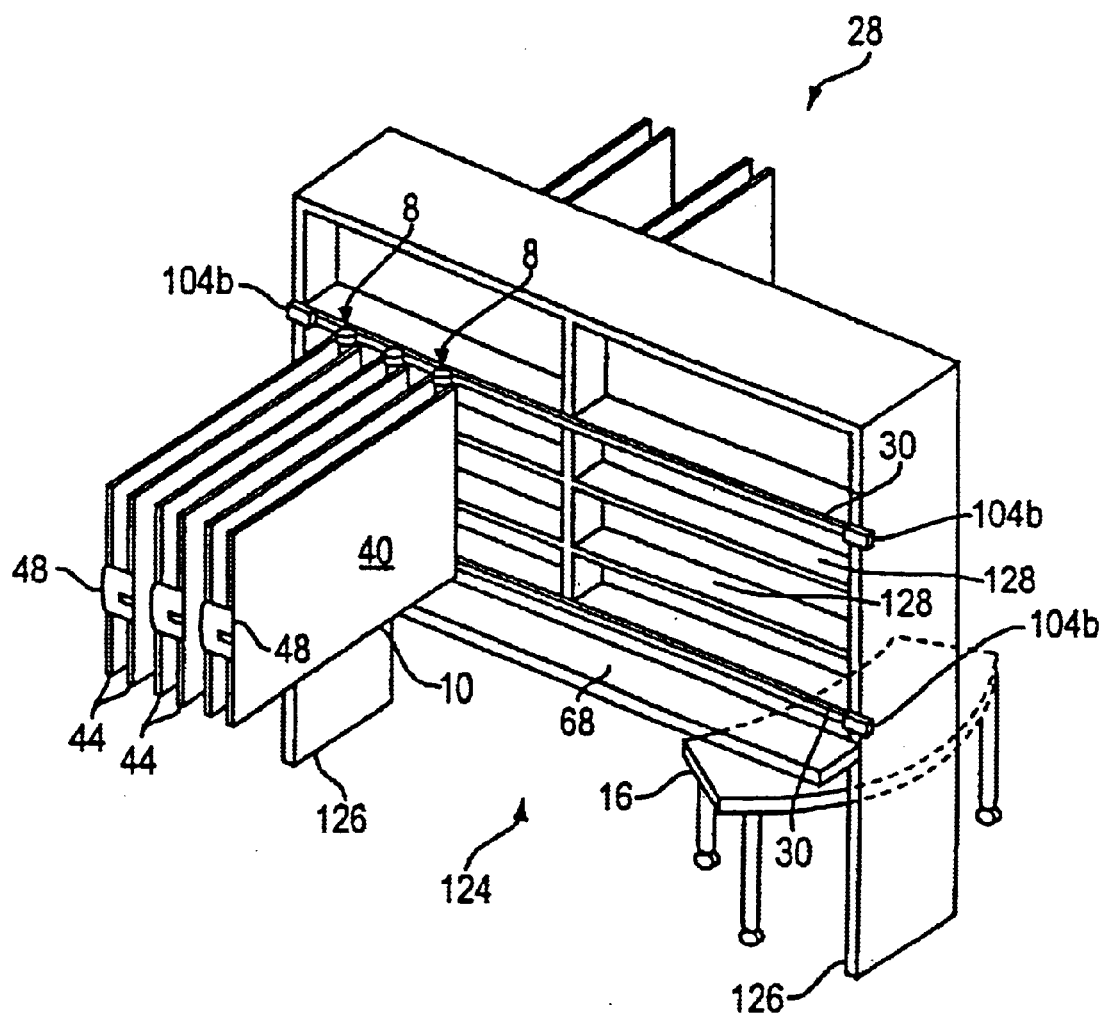
FIG. 37 is a perspective view of an information display system according to an alternative embodiment.

According to alternative embodiments, the mounting structure for the information display system may be any of a wide variety of structures. For example, referring to FIG. 37, a mounting structure shown as shelving unit 28 is provided for information display system 6. Containers 8 of information display system 6 are coupled to set of rails 30 mounted on shelving unit 28 (on the front and back) by mounting assembly 32 (e.g. of a type shown in FIG. 9). Stops shown as blocks 104b are provided at the ends of each rail 30 to stop the travel of containers 8 (i.e. to prevent derailment of containers). Shelving unit 28 also includes an opening 124 in its base between legs 126 configured to allow the pass-through of mobile table 16 (or other like mobile article of furniture) at a level below containers 8. Shelving unit 28 allows access to shelves 128 as well as the display (e.g. reveal and conceal) of information presented on display boards 10 of containers 8. Shelving unit 28 also provides a worksurface 68 (in the form of a shelf 128) just below the bottom of containers 8. According to other alternative embodiments, the mounting structure may be provided by a space frame system of vertical posts and horizontal beams to which the track system can be attached.

Figure 38:
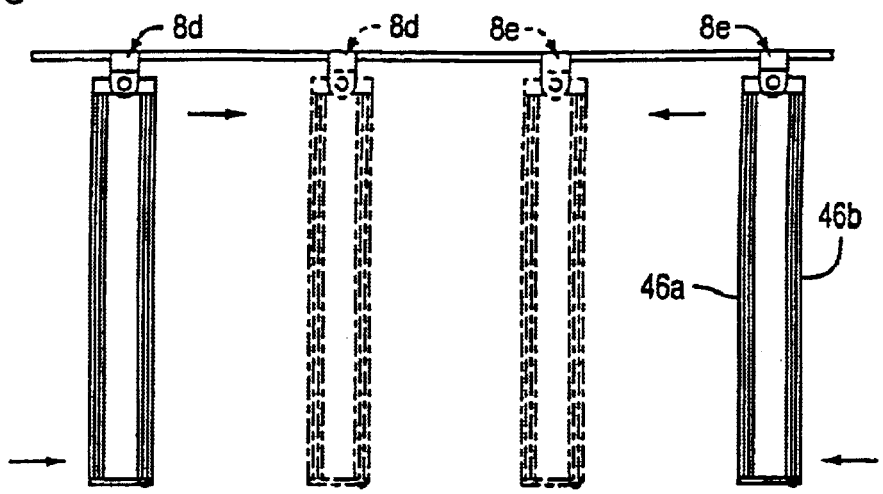
FIG. 38 is a schematic diagram of containers associated with an information display system according to an exemplary embodiment indicating the stop action arrangements for the display boards associated with the containers.
Figure 39:
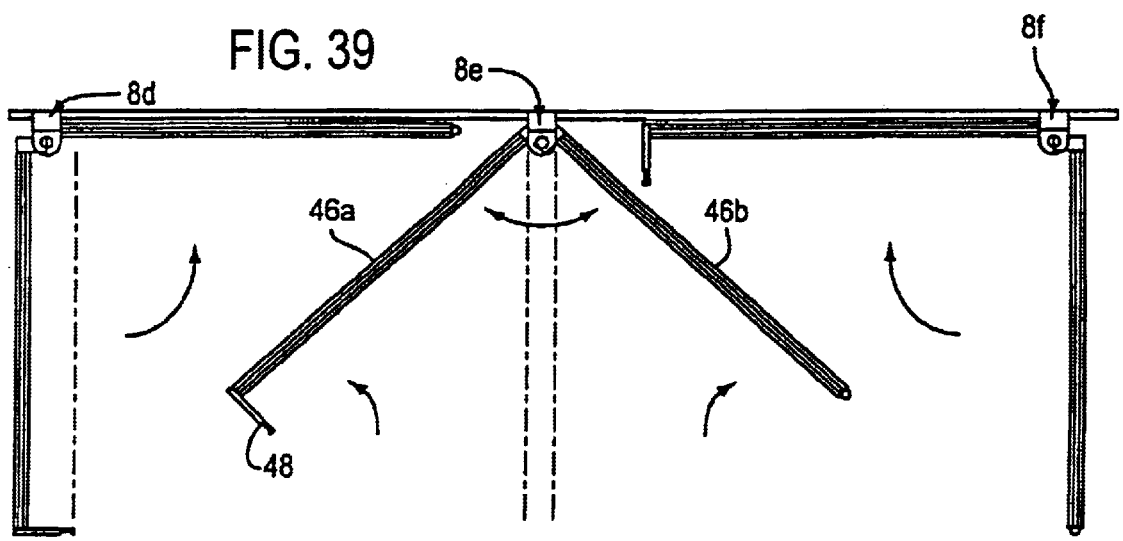
FIG. 39 is a schematic diagram of containers associated with an information display system according to an exemplary embodiment indicating the stop action arrangements for the display boards associated with the containers.
Figure 40:
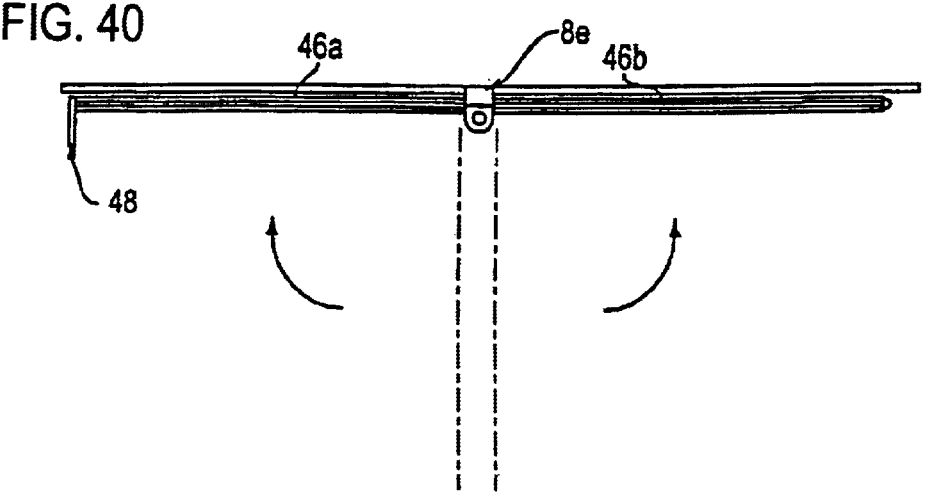
FIG. 40 is a schematic diagram of containers associated with an information display system according to an exemplary embodiment indicating the stop action arrangements for the display boards associated with the containers.

As has been shown in other Figures, according to any preferred embodiment, the display panels associated with the containers of the information display system will be pivotally coupled so that one display panel may be pivoted with respect to the other display panel (within a predetermined path of travel, e.g. 90 degrees). FIGS. 38 through 40 are schematic diagrams intended to illustrate the movement of containers and associated display panels of information display system according to an exemplary embodiment. As shown in FIG. 38, when a container 8d is closed (with both display panels parallel, in a closed condition), a force applied transverse to container 8d will tend to translate or slide container 8d at mounting assembly 32 along track system or rail 30 (but will not open container 8d). As shown in FIG. 39, to open a container 8e (after it is unlocked), a separating force is applied relative to each display panel 46a and 46b. According to a particularly preferred embodiment, the container includes a "stop action" mechanism (e.g. a detent arrangement) providing a tactile indication when a display panel has been pivoted to 45 degrees from the closed condition and upon further application of the separating force providing a positive stop when a display panel has been pivoted to 90 degrees from the closed condition. As shown in FIG. 40, container 8e is in a fully open condition insofar as each display panel 46a and 46b has been pivoted to 90 degrees from the closed position. When the container is in a fully open condition, a force applied transverse to the container at an appropriate position (i.e. at or near the mounting assembly) will tend to translate or slide container along the track or rail. To return the container to the closed condition, a closing force must be applied in the opposite direction of the separating force.

FIGS. 41 through 62 show the construction of a container and arrangement of display panels of the information display system according to a preferred and other exemplary embodiments of the present invention. It is important to note, however, while preferred and exemplary embodiments are shown, according to alternative embodiments, the information display system may include any of a variety of types of information-containing structures (represented schematically by the containers shown in the FIGURES) having of a wide variety of constructions and any of a wide variety of associated mechanisms beyond those shown and described, all of which are intended to fall within the scope of the present invention. Similarly, it is also important to note that the display panels (which have been represented schematically in the FIGURES) may be configured to include display boards or related structures or elements in any of a wide variety of formats beyond those shown and described, all of which also are intended to fall within the scope of the present invention. According to alternative embodiments, any of a wide variety of display board carriers or mounting interfaces can be used within the container.

Figure 41:
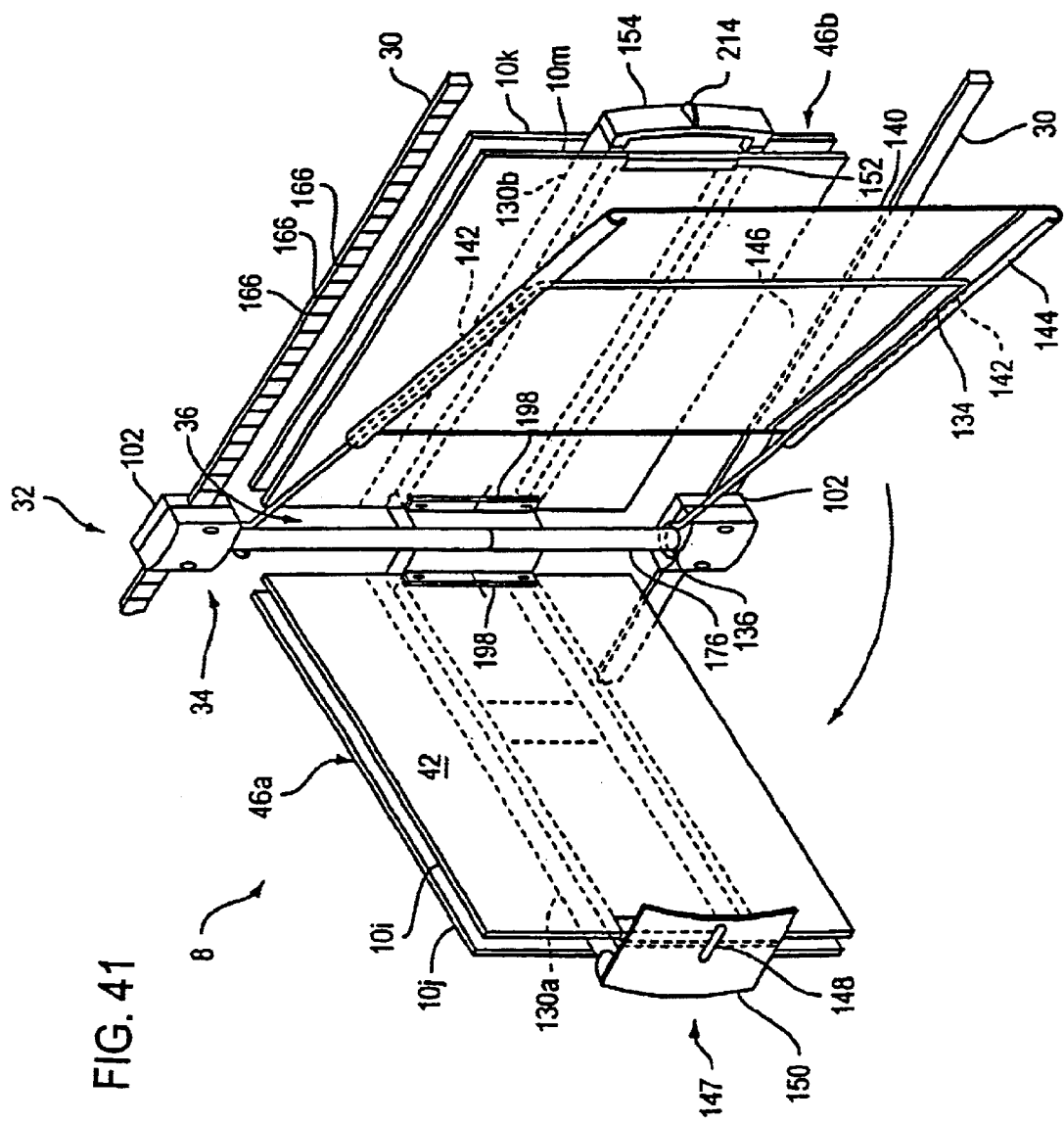
FIG. 41 is perspective view of a container of an information display system according to an exemplary embodiment of the present invention.

According to a particularly preferred embodiment shown in FIG. 41, each container has two display board carriers shown as lateral arm assemblies 130a and 130b (shown in phantom lines in FIG. 41) that provide a structure of the container for each associated lateral display panel. As shown in FIG. 19, display boards 10i and 10j, and 10k and 10m, can be installed on each side of each lateral arm assembly 130a and 130b, respectively, so that a total of four display boards can be installed within the container. The container provides one interior surface 42 and one exterior surface 40 (not visible in FIG. 41) on each side of each lateral arm assemblies 130a and 130b.

Referring to FIG. 41, a wire frame holder 134 may also be installed within the container by hooks 136 that fit around outer tube 176 of pivot mechanism 36 of mounting assembly 32 of the container (a set of coacting wire frame locking members may be included to secure the wire frame holder to outer tube 176 according to alternative embodiments). The container also includes a supplemental display panel shown as a translucent film panel 140 having a frame with a set of upper and lower grooves 144 (shown in phantom lines) that slide onto the upper and lower frame members 142 of wire frame holder 134. Panel 140 provides a phantom overlay 146 (e.g. as may show indicia for use in association with information presented on interior surfaces of the container). As is apparent from FIG. 41, according to alternative embodiments, other accessories such as compartments, pouches, tablets, etc. may be installed within a container onto the wire frame holder.

In the exemplary embodiment of FIG. 41, the container includes a locking mechanism 147 to secure the contents of the container when it is in the closed condition. As shown, locking mechanism 147 includes a slot 148 on a pivotally mounted front cap 150 of display panel 46a of the container that engages a tab 214 projecting from a front piece 154 of display panel 46b of the container. Engagement of the locking elements secures the contents of the container; disengagement allows the container to be opened. According to any preferred and alternative embodiment, any of a wide variety of coacting locking elements or other locking mechanisms known to those of ordinary skill who review this disclosure may be employed.

As shown in FIGS. 42 through 46, according to a preferred embodiment, the mounting assembly includes both a translating or slide mechanism 34 and pivot mechanism 36. Slide mechanism 34 includes a set of glide blocks 102 (e.g. upper and lower) that engage a corresponding set of rails 30 attached to a mounting structure such as a wall. (According to a particularly preferred embodiment, the slide mechanism of mounting assembly and rail includes a linear guide system commercially available under the name AccuGlide from the Linear Motion Systems Division of Thomson Industries, Inc.) As shown, rail 30 may be provided with ball detents 164 that give tactile or audible feedback and a slight holding force when in contact with glide block 102; rail 30 may also be given visual indicia 166 that indicate distances of travel or position of the container along rail 30. According to alternative embodiments, translating motion of containers with respect to mounting structures may be effected with any of a variety of other mechanisms, sliding or rolling, such as rotating wheels traveling in a groove, etc. It should be noted that the mounting assemblies for both the containers of the information display system and for other mobile elements such as utility thresholds may share parts or basic design elements.

Figure 42:
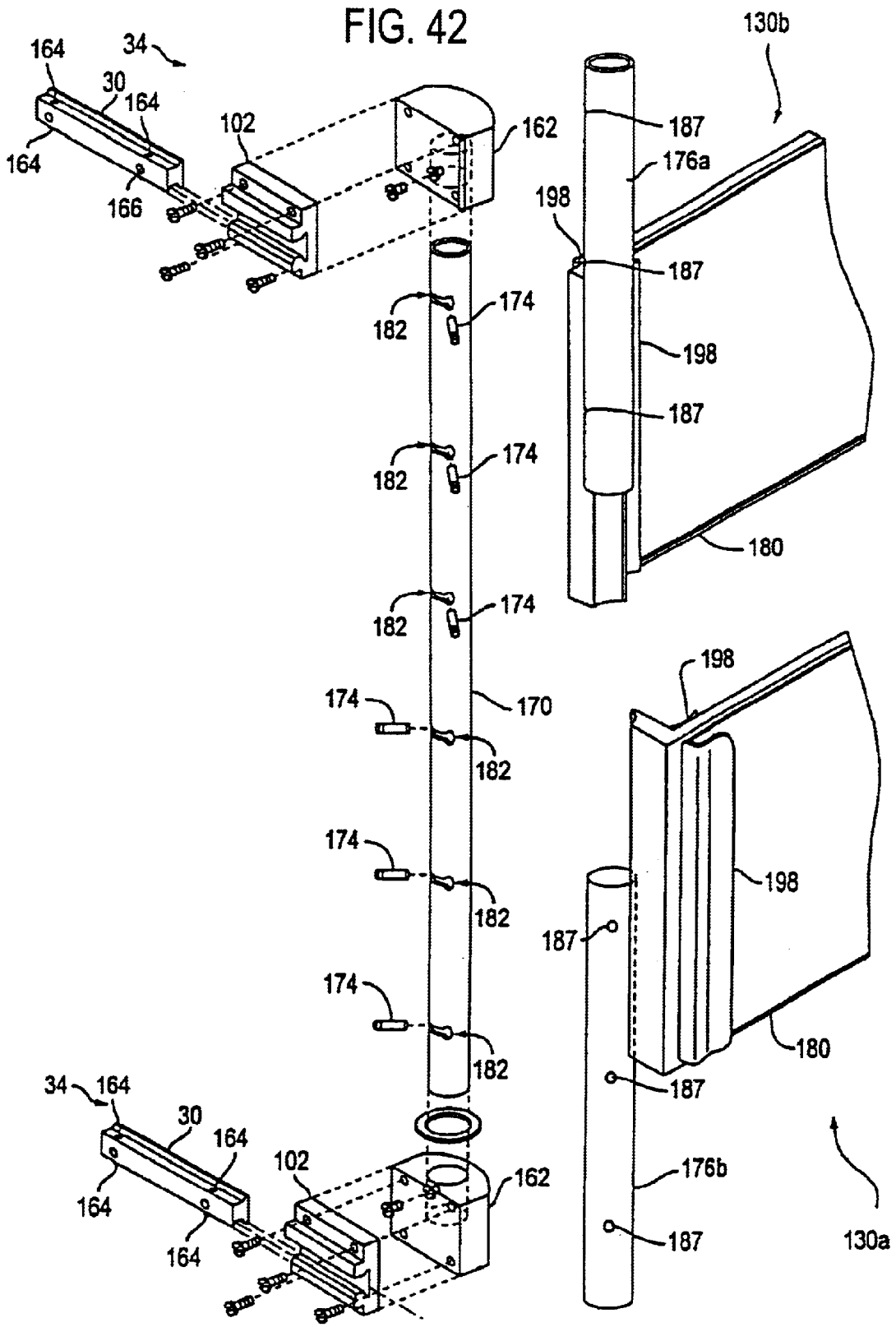
FIG. 42 is a fragmentary exploded perspective view of the mounting assembly of the container of the information display system of FIG. 41.

Referring to FIGS. 42 through 46, each lateral arm assembly 130a and 130b of the container is coupled to pivot mechanism 36 of the mounting assembly so that one lateral arm assembly 130a can be pivoted with respect to the other lateral arm assembly 130b. To each glide block 102 of the mounting assembly is mounted a fixed base hub 162 (e.g. by fasteners shown as screws). As shown in FIG. 42, pivot mechanism 36 includes a fixed inner frame tube 170 installed at each end within base hub 162 (by fasteners shown as screws 174a) and a pair of outer tubes 176a and 176b, each associated with a base frame member 180 of a lateral arm assembly. Each of outer tubes 176a and 176b is mounted (in an offset fashion shown in FIGS. 47 and 48) to base frame 180 of each lateral arm assembly 130a and 130b and fitted over fixed inner tube 170; each of outer tubes 176a and 176b is also independently rotatable with respect to fixed inner tube 170 within a designated range of motion. Outer tubes 176a and 176b have serrations 298 (e.g. small compliant indexing teeth) that gently engage at the interface when installed onto fixed inner tube 170 to provide a slight degree of holding force between each lateral arm assembly 130a and 130b in ordinary operation (but that can be overcome when one display panel is to be selectively pivoted with respect to the other display panel).

Figures 43, 44, 45:
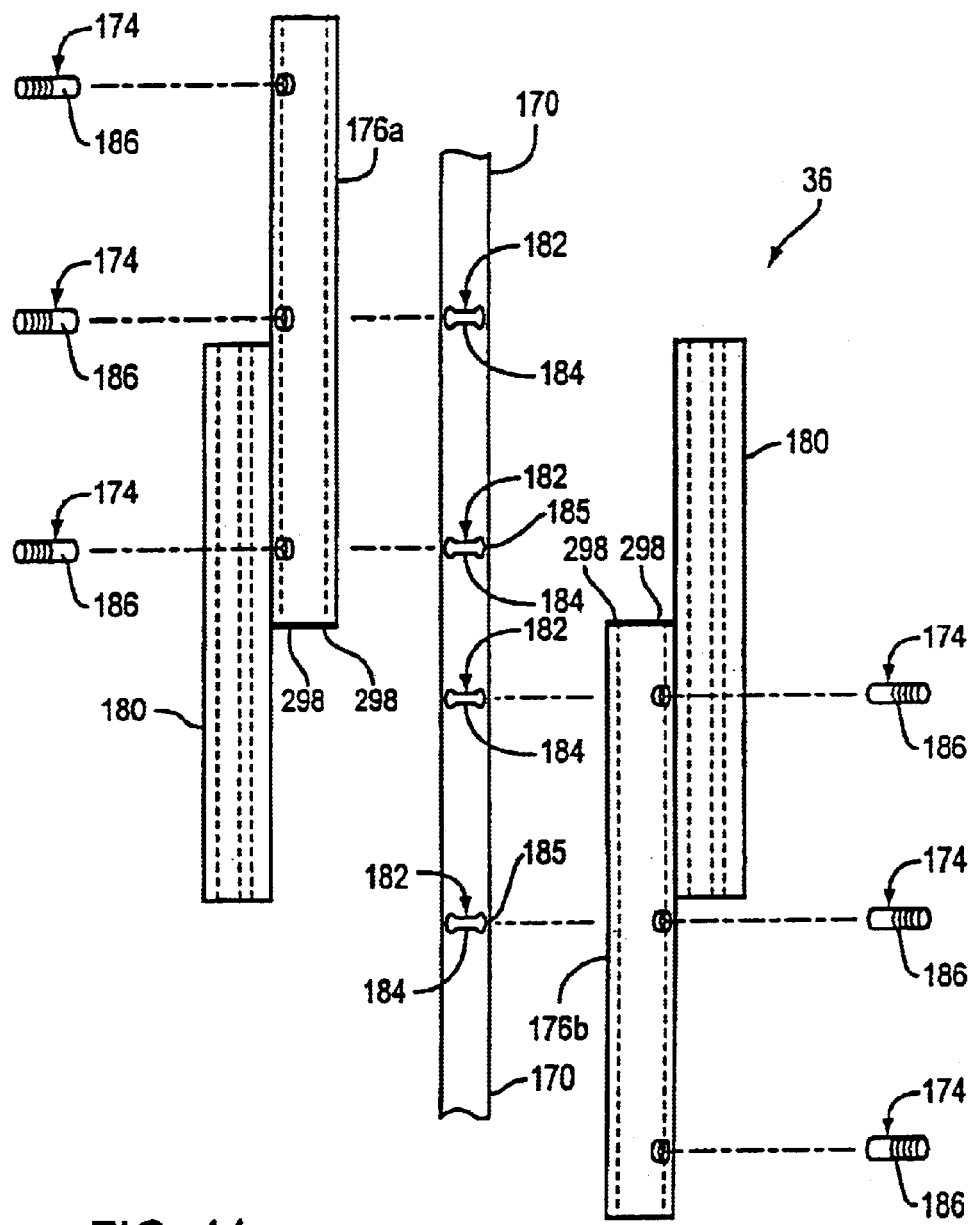
FIG. 43 is a rear fragmentary elevation view of the mounting assembly.
FIG. 44 is a sectional plan view of the mounting assembly.
FIG. 45 is a sectional plan view of the mounting assembly.
Figure 46:
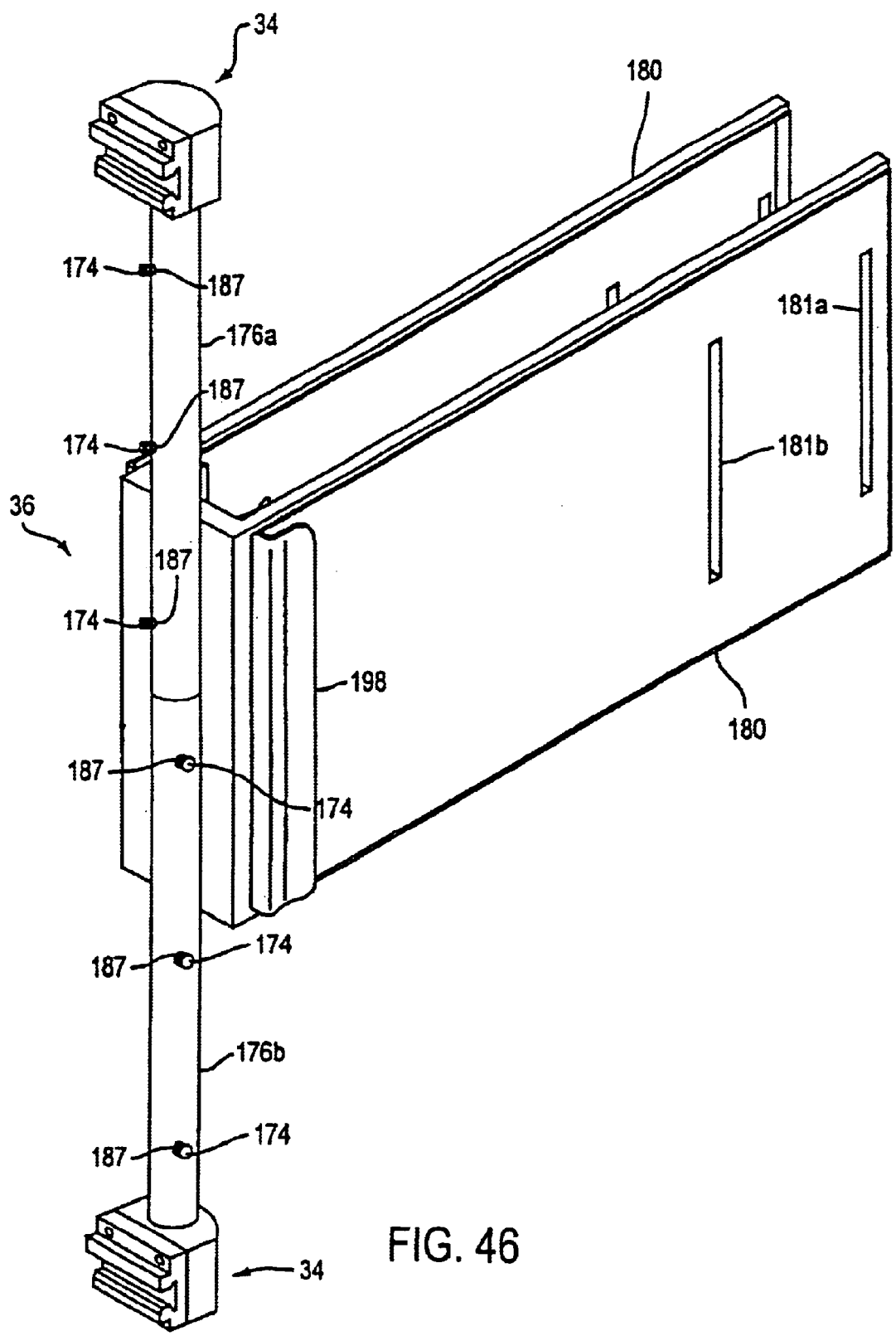
FIG. 46 is a perspective view of the mounting assembly.

Fixed inner tube has a set of slots 182 having a profile shown as detent profile 184 and into which unthreaded ends 186 of guide pins 174 threadably fixed (in holes 187) to outer tubes 176a and 176b are installed into fixed inner tube 170. Detent profile 184 of slots 182 is shaped (as shown) to provide coaction with guide pins 174 and to define the path of travel of each lateral arm assembly of the container. Referring to FIGS. 42, 43 and 46, for example, detent profile 184 has rounded ends 185 connected by a flat center. In FIGS. 44 and 45, showing the coaction of the upper outer tube 176a and lower outer tube 176b with the inner tube 170, the path of travel for each lateral arm assembly ends with a physical stop when each lateral arm assembly has been pivoted to a certain designated positions (e.g. the closed condition and 90 degrees from the closed condition); the detent profile may also be given a shape to provide a tactile "stop" or "pause" (e.g. a slight holding force) and audible feedback when the corresponding lateral arm assembly has been pivoted to other certain designated positions (for example, 45 degrees from the closed condition). According to any preferred embodiment, the central portion of the detent profile includes a compliant material and is slightly smaller in width than the diameter of the unthreaded end of the guide pins, while the rounded ends are substantially the same diameter as the unthreaded end of the guide pins.

Figure 47:
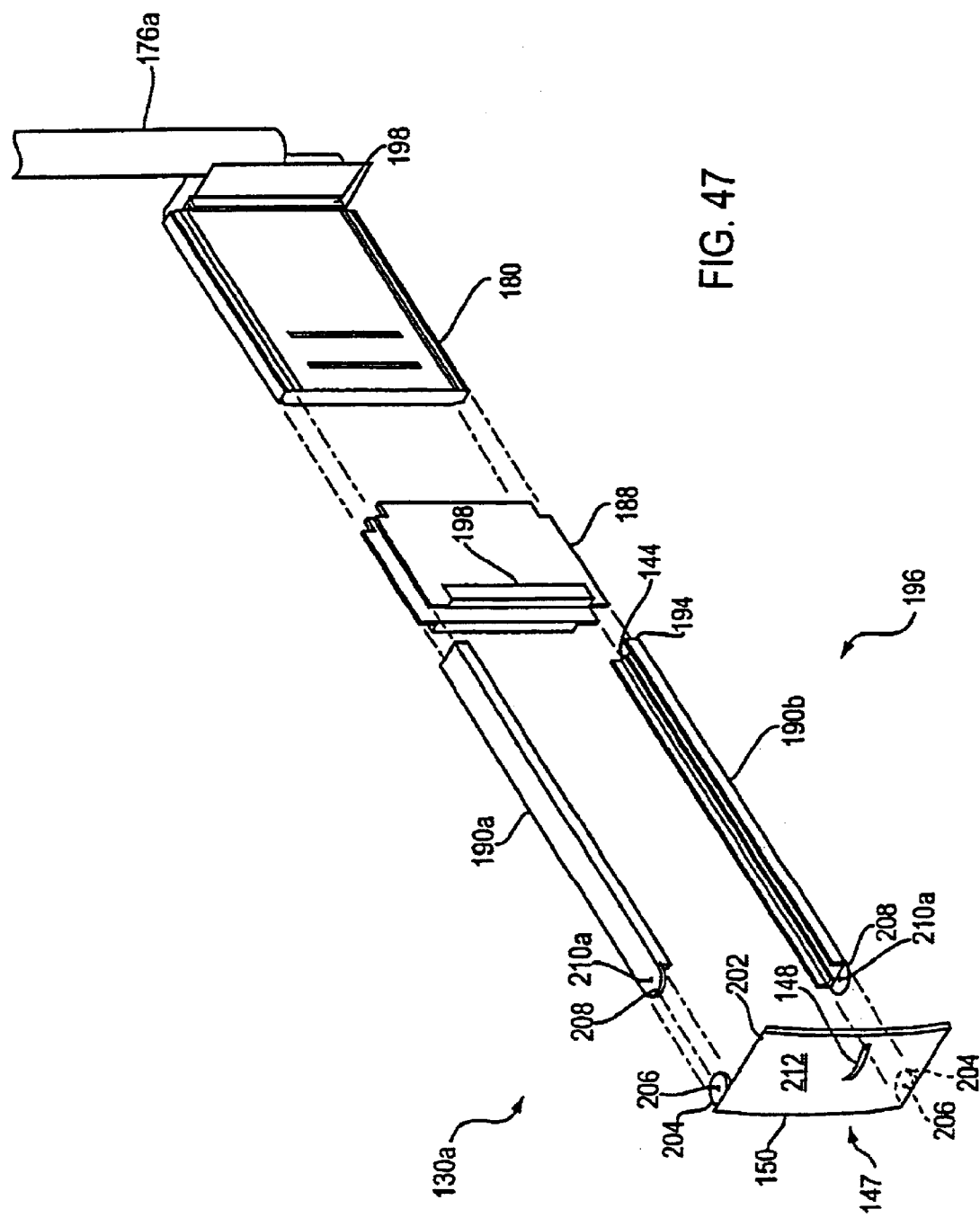
FIG. 47 is a fragmentary exploded perspective view of the container of the information display system of FIG. 41.
Figure 48:
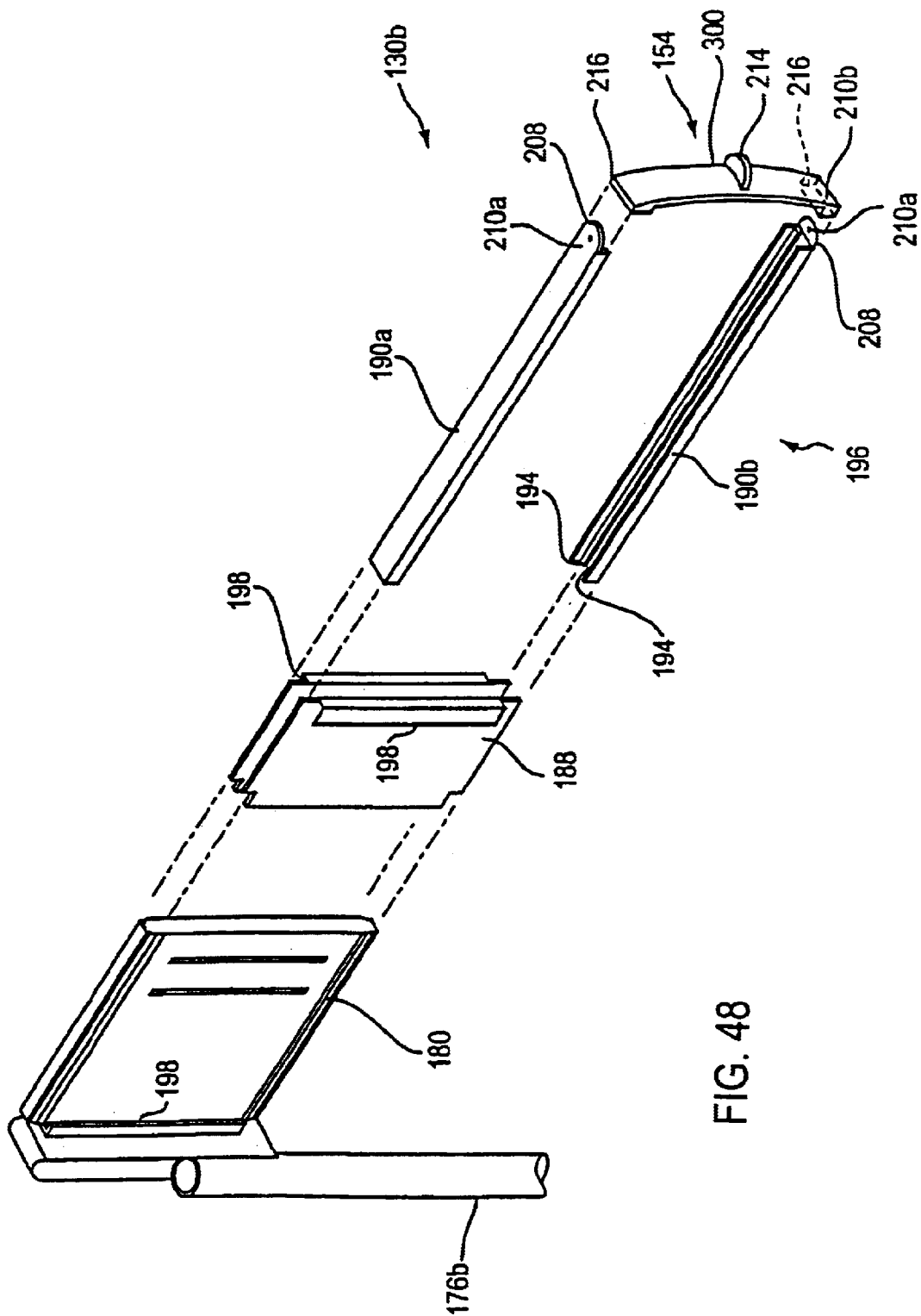
FIG. 48 is a fragmentary exploded perspective view of the container of the information display system of FIG. 41.
Figure 52:
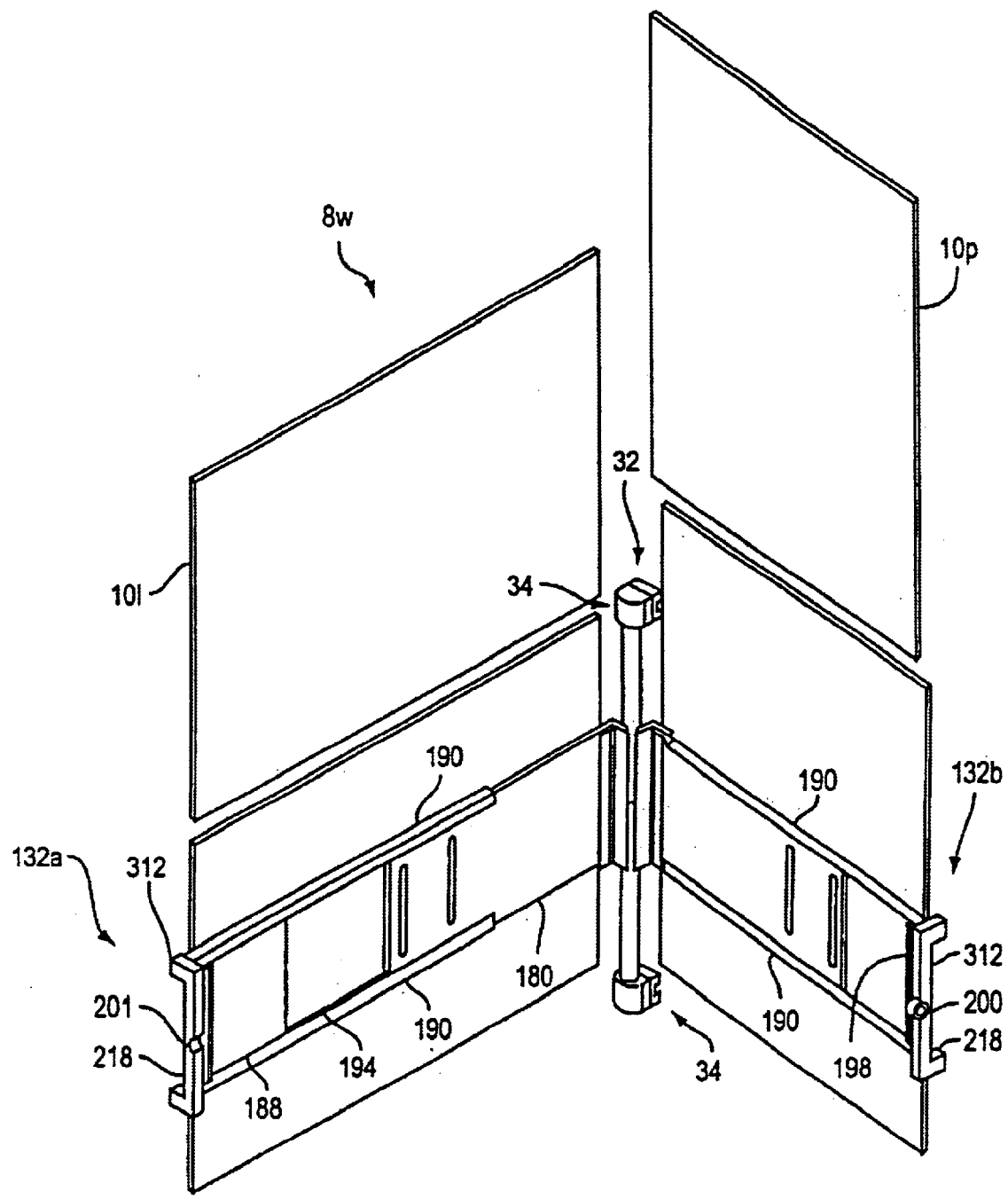
FIG. 52 is a fragmentary exploded perspective view of a container associated with an information display system according to a preferred embodiment of the present invention.

Referring to FIGS. 47 through 49, a lateral arm assemblies 130a and 130b of the container are shown according to an exemplary embodiment. Each of lateral arm assemblies 130a and 130b has a similar construction, including base frame 180 coupled to an outer tube 176a and 176b, an end frame 188, and upper and lower outer frame members 190a and 190b. End frame 188 is mounted at the distal ends of (and between) upper and lower outer frame members 190a and 190b. As shown, upper and lower outer frame members 190a and 190b have a channel shape with retaining slots 194 within which end frame 188 is secured to form an end frame assembly 196 (shown in FIG. 49). End frame assembly 196 is then slid onto base frame 180 (which provides upper and lower tracks that securely and adjustably retain upper and lower frame members 190a and 190b of end frame assembly 196 in a relatively tight frictional/interference-type fit). End frame 188 and base frame 180 each include spring clips 198 (e.g. containing spring elements or compliant material providing a spring effect). As shown in FIG. 49, display board 10i, 10j, 10k, and 10m (shown in phantom lines) are securely but releasably held within container by spring clips 198, which engage include a compliant portion intended to firmly "grip" the edges of each display board when end frame assembly 196 is slid tightly and fully onto base frame 180. By virtue of the adjustable (e.g. slidable adjustment) of the lateral arm assembly, display boards of varying sizes can be installed within the container. (As shown in FIG. 52, display boards can be installed either in landscape or portrait mode.) Moreover, the height or position of display boards within (e.g. carried by) the container can be adjusted in the vertical direction. As shown in FIG. 41, the spring clips may include a visual indicator marking (e.g. in the form of a notch or line) that may correspond with an indexing marking or line on the display board to facilitate an intended placement of the display board within the container.

As shown in FIG. 47, front cap 150 of lateral arm assembly 130a has upper and lower tabs 204 each having a pivot pin 206 to install onto upper and lower tabs 208 at the ends of upper and lower outer frame members 190a and 190b of one end frame assembly 196, each having a corresponding aperture 210a into which a pivot pin (not shown) is snap fit for pivotal movement. Front cap 150 includes a face 212 onto which a label or other designation can be applied. As shown in FIG. 48, front piece 154 provides a handle 300; front piece 154 includes upper and lower tabs 216 each having an aperture 210b installed onto ends 208 of upper and lower tabs 210a at the ends of upper and lower outer frame members 190a and 190b of the other end frame assembly 196. Aperture 210b of front piece 154 may be snap fit or press fit onto tabs 210a.

Figure 50:
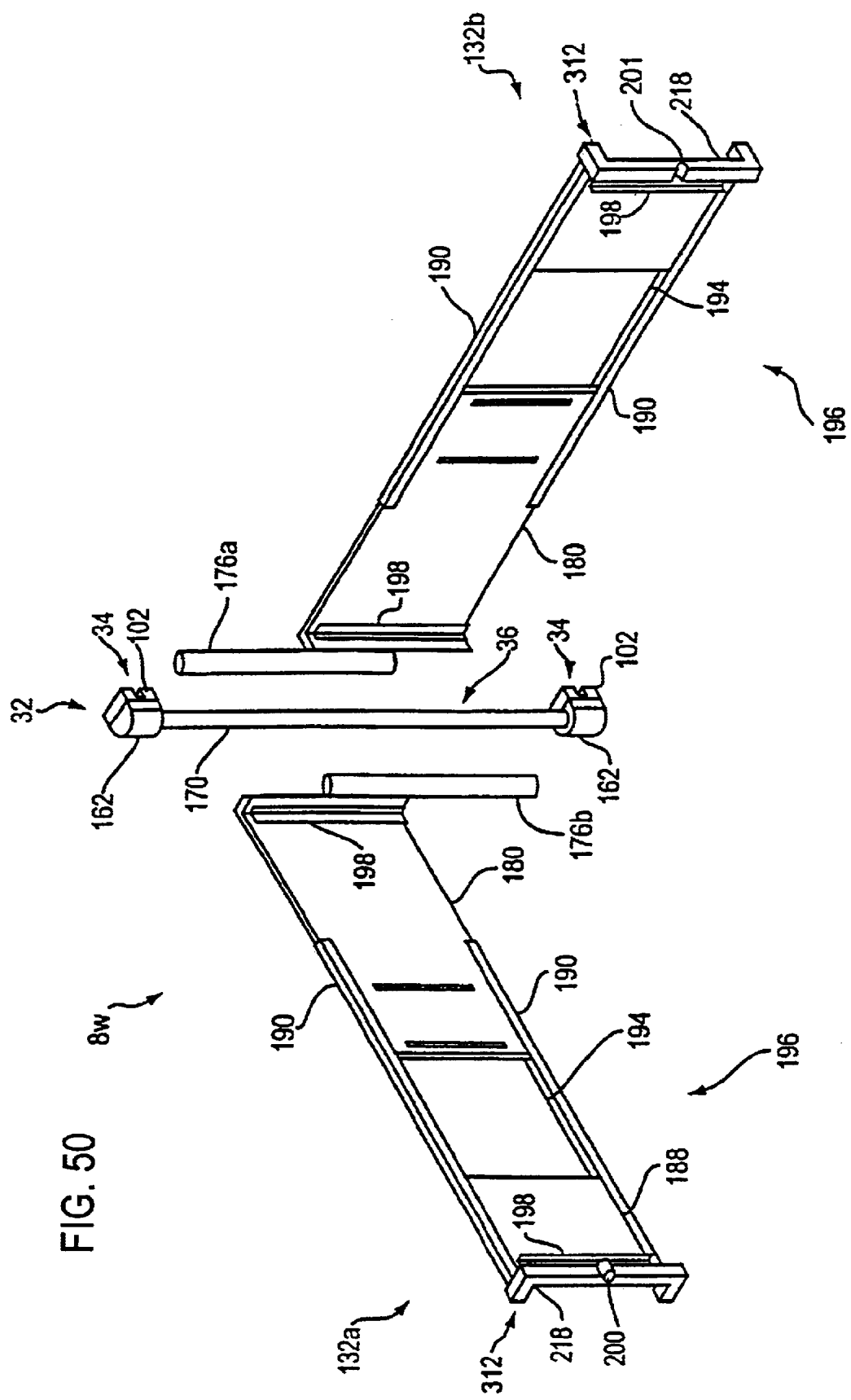
FIG. 50 is a fragmentary exploded perspective view of a container associated with an information display system according to a preferred embodiment of the present invention.
Figure 51:
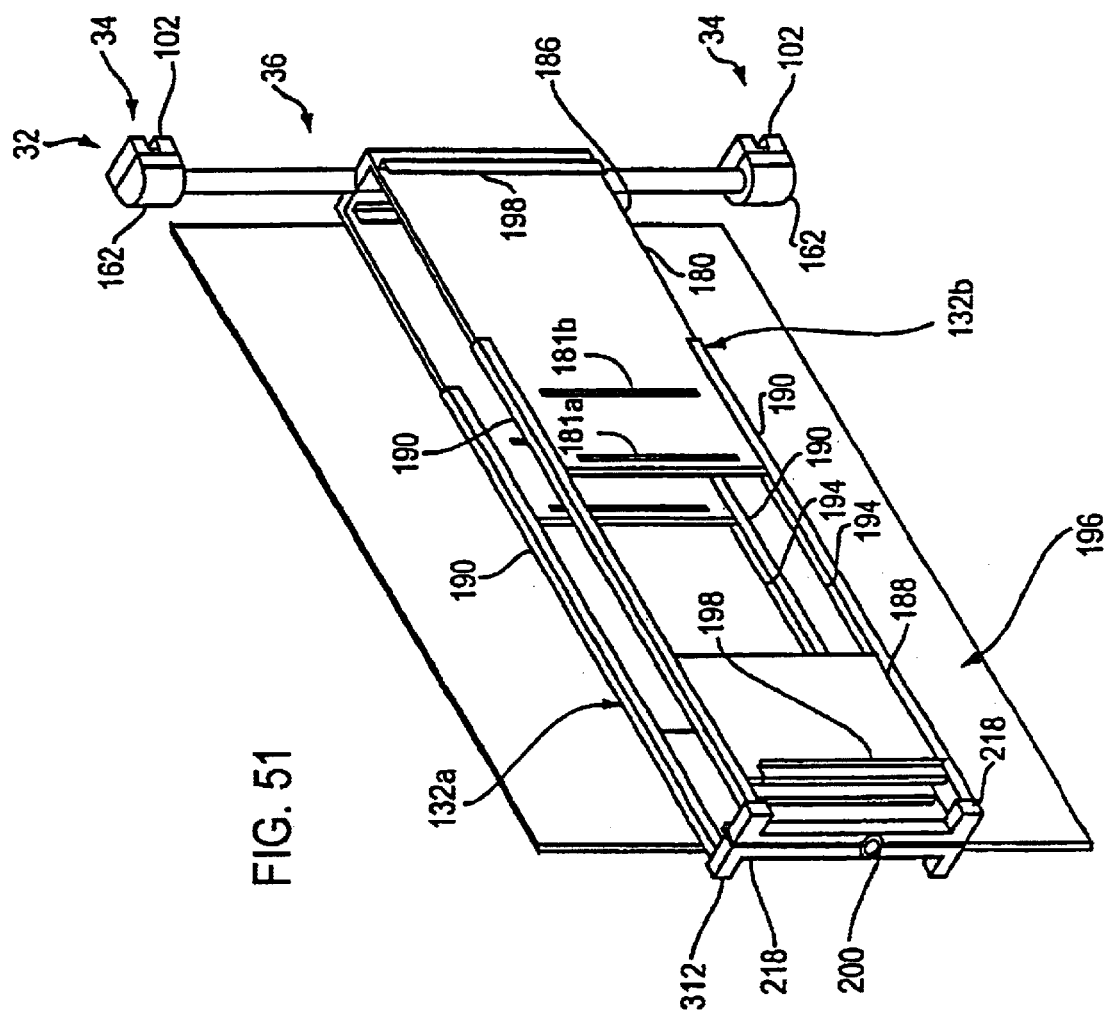
FIG. 51 is a fragmentary exploded perspective view of a container associated with an information display system according to a preferred embodiment of the present invention.

Referring to FIGS. 50 through 51, an alternative embodiment of a container is shown, similar in basic respects to the container shown in FIGS. 47 through 49. Container 8w includes a pair of lateral arm assemblies 132a and 132b each including base frame 180 (as in FIGS. 47 through 49) and end frame assembly 196. End frame assembly 196 includes a vertical front handle 312 (having a "[" shape). Each front handle 312 has a curved recess 201; into one of the front handles of a container, a locking element can be installed, for example a cylinder lock 200 (e.g. tumbler actuated by a key) providing a conventional locking action wherein one front handle is secured to the other front handle. Referring to FIGS. 53 through 54, the container includes a receptacle shown as a "mail slot" receptacle 220 accessible from the front of the container at front handle 312. Receptacle 220 is formed within end frame between upper and lower outer frame members 190 (and is of a size that is capable of containing a sufficient volume of "mail", i.e. paper sheets, envelopes, magazines and other publications, etc.). One receptacle 220 can be provided in association with each lateral arm assembly 132a or 132b of the container.

Figure 55:
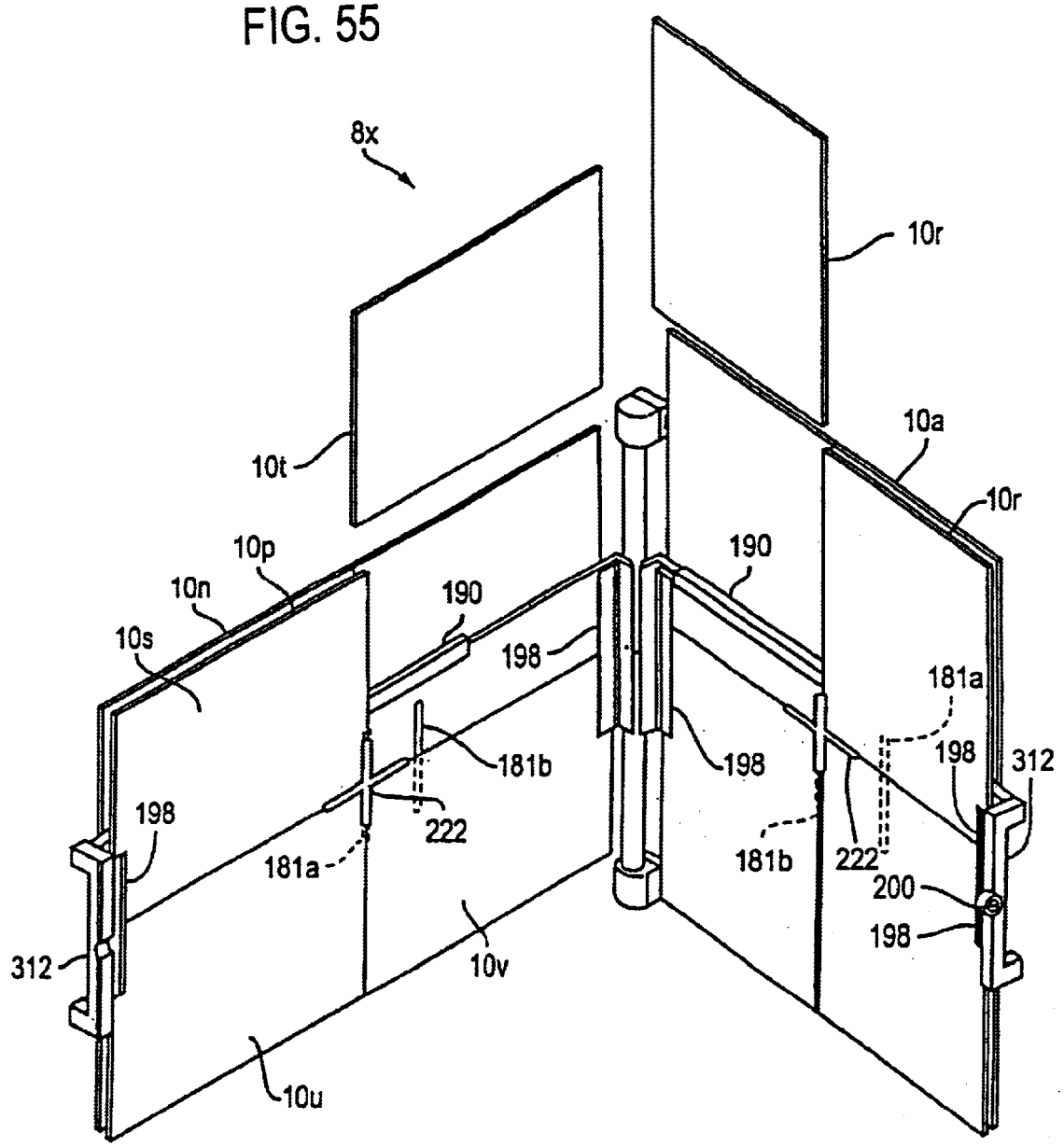
FIG. 55 is a fragmentary exploded perspective view of an information display system according to an alternative embodiment.

Referring to FIG. 55, according to an alternative embodiment, a container of the information display system can include carriers or lateral arm assemblies 132a and 132b configured to employ a display board arrangement including four display boards 10n, 10p, 10q, and 10r (of a smaller size, e.g. one-quarter the size of the regular display boards), for example in either portrait mode or landscape mode. The lateral arm assemblies each include a centrally located spring clip 222 (having a "+" shape) that is capable of engaging and securing "holding" each of four smaller display boards in combination with spring clips 198 of base frame 180 and end frame 196. Clip 222 may be installed (e.g. by a press or "snap" fit) within either of slots 181a or 181b of base frame 180 as needed, depending upon the size and orientation of the display boards (see FIG. 55).

Figure 56:
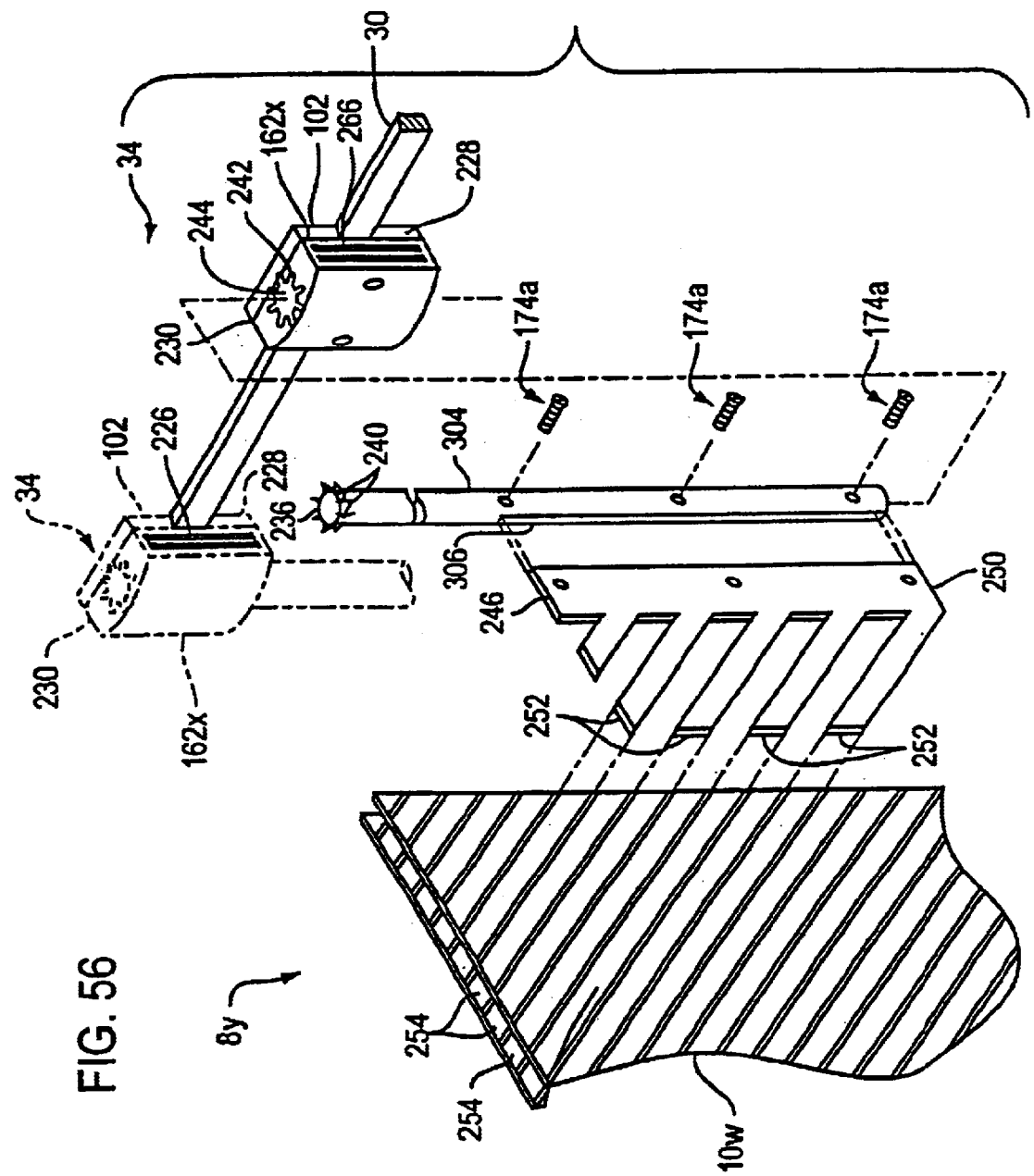
FIG. 56 is a fragmentary exploded perspective view of a container of an information display system according to an alternative embodiment.

FIGS. 56 through 57 show a container 8y according to an alternative embodiment of the information display system. Container 8y is configured to hold a single display board 10w and is coupled to a single rail 30 by a mounting assembly including slide mechanism 34 (of a type similar to as shown in FIG. 42 having guide block 102 and a base hub 162x) and pivot mechanism 36. Base hub 162x of the mounting assembly includes a set of magnets 226 on one lateral surface 228 and a corresponding metal strip (not visible) on the other lateral surface 230, so that one or more adjacent containers can be joined or "ganged" together (see, e.g., FIG. 10). Pivot mechanism 36 includes a frame tube 304 which fits within a central vertical hole 244 in base hub 162x. Frame tube 304 has a cap 236 with a star-shaped upper profile formed by a series of triangular index tabs 240 or projections that engage a corresponding pattern of index slots 242 around the perimeter of hole 244 in base hub 162x when frame tube 170 is installed into hole 244. Frame tube 170 also includes an elongate axial slot 306 into which a lateral arm assembly shown as a frame plate 246 can be installed and secured by a series of threaded fasteners 174a. Frame plate 246 includes a base 250 from which project a series of diagonal fingers 252.

Display board 10w has two flat exterior surfaces with a central core providing a series of diagonal passages 254 (see FIG. 62) that open onto all the edges of the display boards (however, for aesthetic or other reasons, the passages do not need to open onto all edges of the boards). According to a particularly preferred embodiment, the display board will be a rigid polycarbonate structured sheet of a type commercially available from under the name "CO-EX" from CO-EX Corp. of Rocky Hill, Conn. or of another similar construction available from other suppliers. As shown in FIGS. 57 through 59, diagonal fingers 252 of frame plate 246 fit within corresponding diagonal passages 254 to secure display board 10w in container 8y. As shown in FIGS. 57 through 59, the display board can be installed in landscape mode, portrait mode, or at any of a wide variety of orientations and discrete height levels (provided by the passages). According to alternative embodiments, the display board may be provided with a greater or lesser number of passages in any of a variety of sizes, patterns and orientations.

Pivotal adjustment of display board 10w within container 8y is effected by lifting frame tube 170 within hole 244 of base hub 162 to disengage index tabs 240 from index slots 242, then rotating frame tube 170 to another adjustment position where index tabs 240 can engage index slots 244 and lowering frame tube 170 back into hole 234: eight discrete adjustment positions spaced at 45 degree intervals are provided according to the exemplary embodiment (but according to alternative embodiments, other adjustment positions may be provided).

Figure 60:
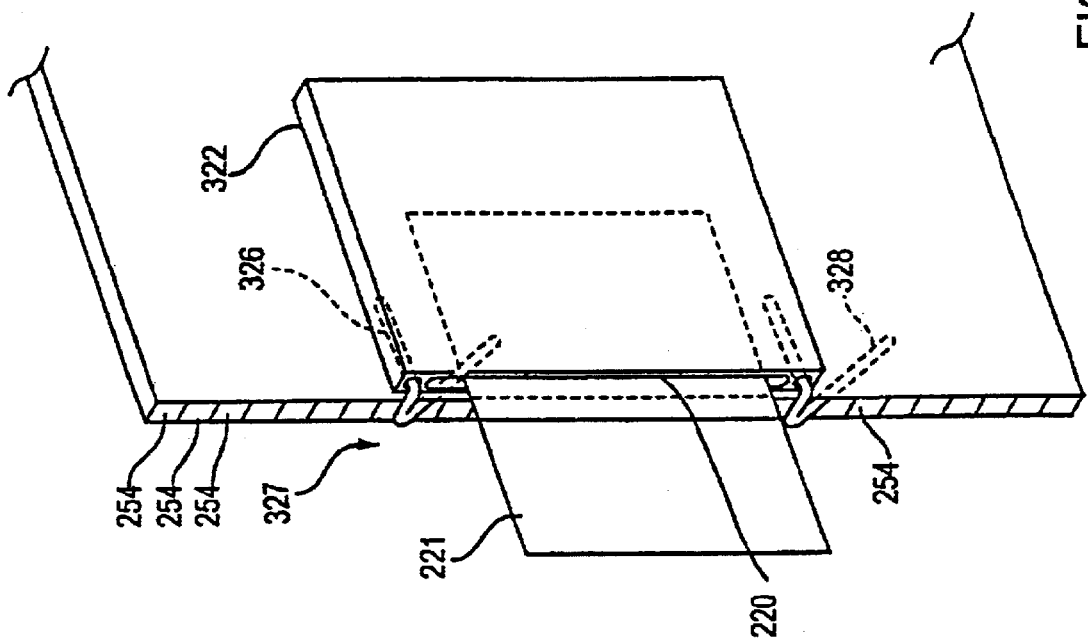
FIG. 60 is a fragmentary perspective view of the container of FIGS. 57 through 59 showing an arrangement for installing a mail slot.
Figure 61:
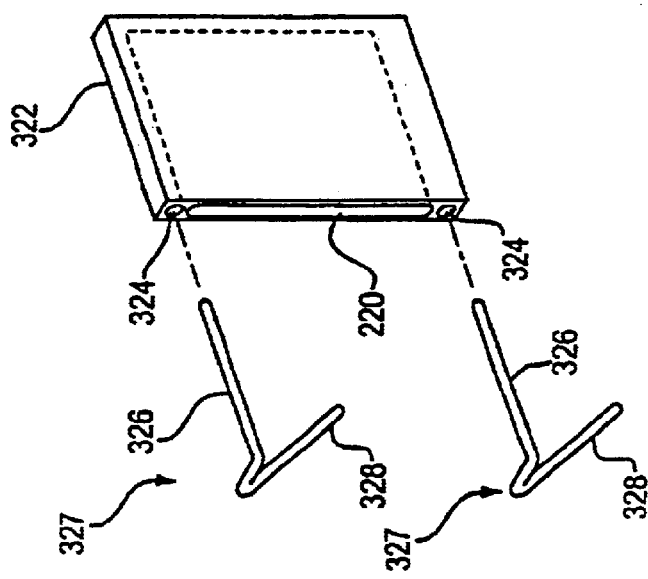
FIG. 61 is a fragmentary perspective view of the container of FIGS. 57 through 59 showing an arrangement for installing a mail slot.

Referring to FIGS. 57 through 61, accessories such as vertical handle 312, a ball handle 314 or a receptacle box 322 (each of which are installed onto display board by fingers or projections 318 are inserted within diagonal passages 254) may be provided for a display board as shown in FIG. 56. FIGS. 60 and 61 show receptacle box 322 which is adapted for attachment to display board 10w. Receptacle box 322 includes a large central slot shown as "mail" slot 220 and upper and lower apertures 324, though which horizontal arms 326 of a holding member 327 are inserted; to mount receptacle box 322 to display board 10w, diagonal arms 328 of holding member 327 are inserted into passages 254 of display board 10w. An object 221 (e.g. a piece of paper) can be inserted into slot 220 and held in receptacle box 322.

Figure 63:
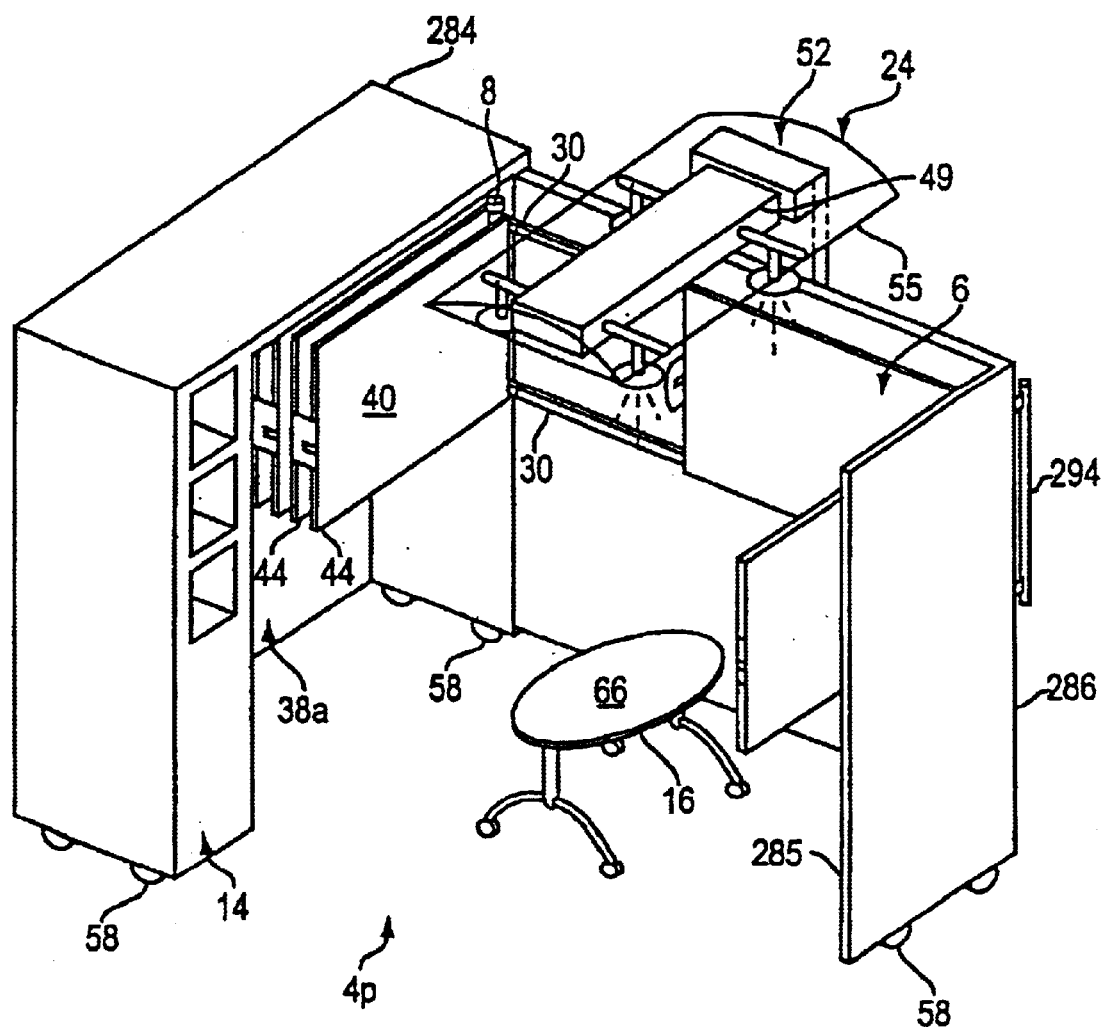
FIG. 63 is a perspective view of a workstation according to an alternative embodiment of the present invention.
Figure 64:
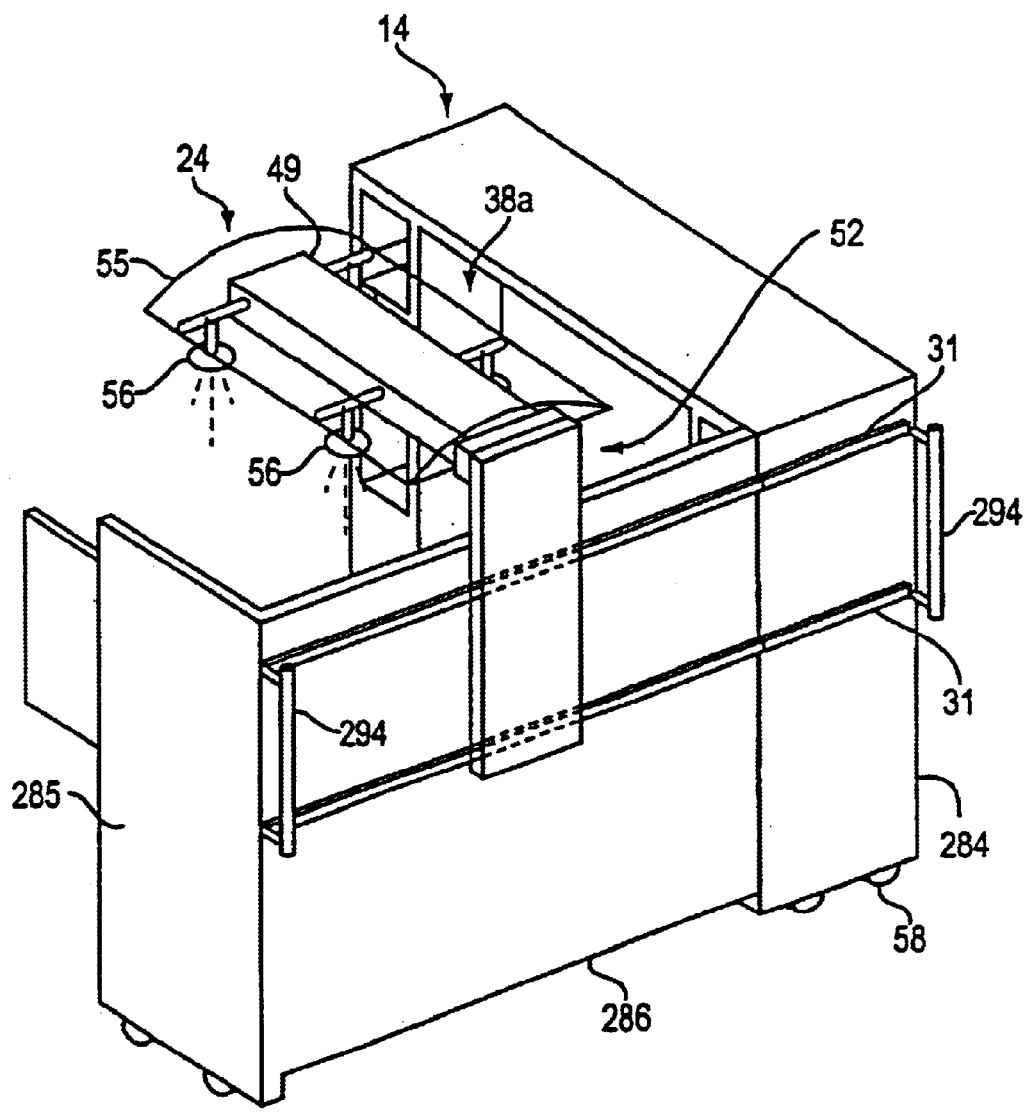
FIG. 64 is a perspective view of a workstation according to an alternative embodiment of the present invention.
Figure 67:
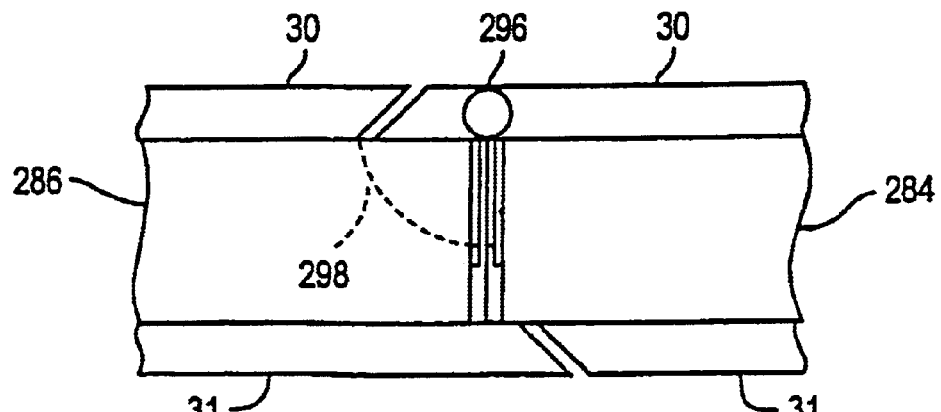
FIG. 67 is a fragmentary plan view of a hinge and rail arrangement for the workstation of FIGS. 63 through 66.
Figure 65:
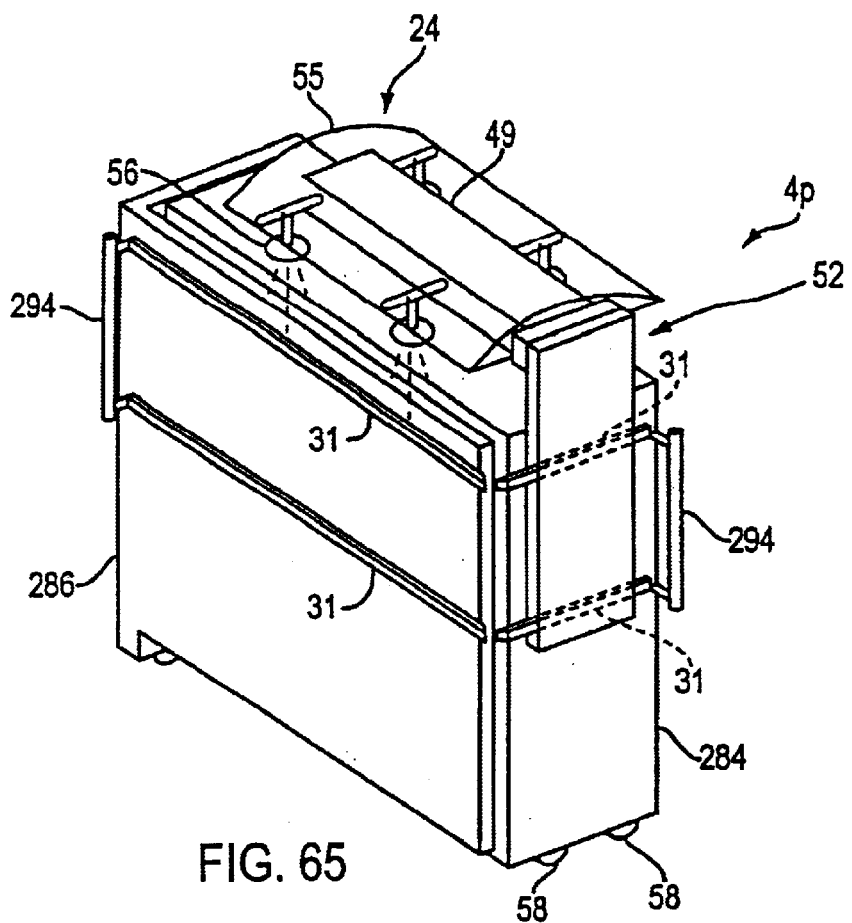
FIG. 65 is a perspective view of a workstation according to an alternative embodiment of the present invention.
Figure 66:
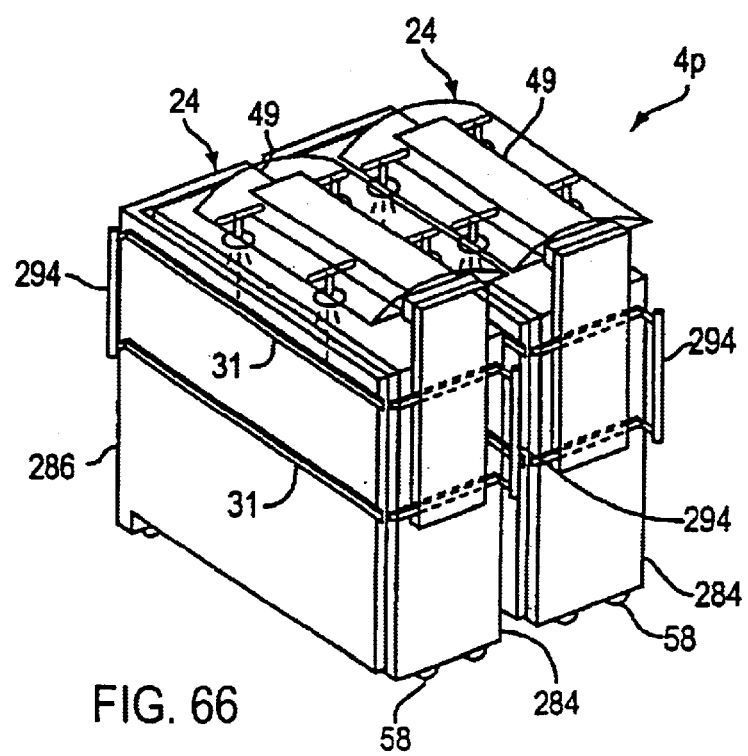
FIG. 66 is a perspective view of a workstation according to an alternative embodiment of the present invention.

FIGS. 63 through 66 show a mobile workstation 4p containing information display system 6 and utility threshold 24 according to an exemplary embodiment of the present invention. Mobile workstation 4p includes shelving unit 14 (on a set of casters 58) providing docking area 38a for containers 8 of information display system 6. Containers 8 are coupled to a set of internal rails 30 mounted on an end wall 284 of shelving unit 14 and a base wall 286 for translating movement within mobile workstation 4p. As shown, base wall 286 (on a set of casters 58) is pivotally coupled to shelving unit 14 by hinges (as shown in FIG. 67). Utility threshold 24 is coupled by mounting assembly 52 (shown as a vertical mounting plate 53 including a glide block) to a track system shown as a set of external rails 31 mounted on vertical surfaces of both end wall 284 of shelving unit 14 and base wall 286 for translating movement within a defined path of travel. End wall 284 (on a set of casters 58) is pivotally coupled to base wall 286 as shown in FIGS. 63 and 66. As shown in FIG. 64, a set of handles 294 provide "stops" at the ends of external rails 31. Utility threshold 24 includes horizontal beam 49 extending into workstation 4p from vertical mounting plate 53; beam 49 provides a mounting structure for canopy 55 and lighting fixtures 56. Shelving unit 14 also serves as docking area 38a for utility threshold 24. Mobile table 16 can be included within workstation 4p.

The hinge and rail detail for mobile workstation 4p according to a particularly preferred embodiment is shown schematically in FIG. 67. Rails 30 for the containers are mounted on the inside of base wall 286 and end wall 284; external rails 31 for utility threshold 24 are mounted on the outside of base wall 286 and end wall 284. Hinges 296 are included within internal rails 30; one portion of internal rail 30 (affixed to base wall 286) extends across the interface of base wall 286 and end wall 284. A clearance aperture 299 allows the portion of rail 30 to have clearance into end wall 284 when pivoted with respect to base wall 286. Diagonally tapered ends of external rails 31, which separate when the mobile workstation is stowed, are arranged to keep utility threshold 24z from sliding out of the docked position. (According to alternative embodiments, other hinge and rail mechanisms may be employed to provide the desired hinge action while facilitating the full use of rails for the containers and utility threshold.)

Referring to FIGS. 65 and 66, mobile workstation 4p can be stowed (closed and compressed) for transport or storage by stowing containers 8 and utility threshold 24 within docking area 38a (which is given sufficient internal capacity) and then folding end wall 284 onto shelving unit 14 at hinges 296 so that base wall 286 and side wall 285 envelop shelving unit 14 (a locking or latching mechanism can be provided to secure the mobile workstation in the stowed condition and/or the open condition). When stowed for transport or storage, mobile workstation 4p can be pulled or pushed using handles 294. FIG. 66 shows that while each mobile workstation is a "stand-alone"unit, groups of mobile workstations may conveniently be associated for purposes of storage.

According to any preferred embodiment, the information display system provides an organizational framework intended to promote and advance the efficient use, display and storage of information and layers of information on display panels (e.g., "information persistence," regardless of the format by which the information is placed on associated display boards) in the work environment. According to any preferred embodiment of the information display system, each display panel will include at least one display board adapted to contain or present information. As will become apparent to those of ordinary skill who review this disclosure, the display boards may be provided in any of a wide variety or formats, or may be adapted to display information in any of a wide variety of formats and/or media; a wide variety of configurations are possible for the information display system, employing variations of size, shape, orientation, arrangement, mounting interfaces and structures, etc., as well as variations in the deployment of display boards. According to any preferred embodiment, the information display system will facilitate the dynamic configurability and reconfigurability of work spaces, workstations and work environments, in territorial appearance and contextual appearance (e.g. as scenery or "sets" can be reconfigured in a theatre play).

According to alternative embodiments, the information display system can be implemented through a wide variety of mounting arrangements that allow for translating movement of the containers and associated display boards with respect to a wide variety of mounting structures, for example, floors, architectural walls, panel walls, systems furniture, space frames, other articles of furniture, etc. The variety of mounting structures that may be used with the information display system illustrates the flexibility and adaptability of the information display system to a wide variety of work environments. Moreover, although in the exemplary embodiments the mounting assembly and track system for the containers of the information display system are preferably arranged for linear movement along the mounting structure, according to alternative embodiments, the track system of the information display system may be configured for wholly or partially curved movement (e.g. as necessary to conform to a curved wall or other mounting structure alone or in combination to facilitate the movement of containers from one orientation or plane to another within a work environment.)

it is important to note that the use of the terms "display panel" or "display board" are not meant as terms of limitation, insofar as any "panel" or "board" or like structure having a decorative or functional use or application is intended to be within the scope of the term. For example, the use of the term "display board" is intended as a convenient reference for any such "board" or structure, which may also be viewed synonymously with the term "work board" or other like terms. According to any preferred embodiment, the display panel or display board is configured in a generally symmetrical basic form so that the designation of a "front surface" and "back surface" is essentially arbitrary and dependent upon the orientation within the information display system. Exemplary display boards may be formed of any of a variety or materials or have any of a variety of sizes and shapes, constructions (with any of a variety of properties, such as weight, strength, rigidity, acoustic properties, flammability, etc. suitable for the intended application) and mounting interfaces. As will be apparent to those who review this disclosure, the outer surfaces of the display boards may be provided with a wide variety of surface treatments (e.g. tackable or repositionable adhesive, clear film overlay or "photo album", clear film "pocket", writable clear film, cork or tack board, peg board, magnetic board, marker board, dry erase or "white" board, paper or paper tablet, projection screen, graphics display, cloth, etc.) in a wide variety of combinations (i.e. with one surface differing in whole or in part from the other surface) that may be suited or adapted to a wide variety of functional and decorative purposes according to the preferred and other alternative exemplary embodiments of the present invention. According to any preferred embodiment, the display boards and associated structures and systems are configured for ease and flexibility of use (e.g. recording, mapping, transformation, capture, etc.), display (e.g. sharing and communicating), and storage—information persistence—as well as of mounting and removal from associated mounting structures (such as the containers).

It is important to note that the term "information" is intended to be a broad term and not a term of limitation. The term "information" may include information of any type or form or combination, and is meant to cover any use of any type of media or any type of representation that can be associated with a display board (or work board). It is also important to note that the terms "worksurface" and "work space" are intended to be given broad scope and are not terms of limitation. It is also important to note that the construction and arrangement of the elements of the system as shown in the preferred and other exemplary embodiments is illustrative only.

Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, protocols, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in the appended claims.

What is claimed is:

1. A system for use in a work space and configured to distribute utilities away from at least one article of furniture having a top section carrying the utilities into the work space, comprising:
    a utility access extension comprising a utility delivery zone;
    a utility beam having a first end coupled for translating movement along the top section of the article of furniture and a second end projecting into the work space and coupled to a top section of the utility access extension;
    wherein the utilities are supplied between the top section of the article of furniture and the top section of the utility access extension to the utility delivery zone at a point away from the article of furniture.

2. The system of claim 1 wherein the system is adapted for movement along a predefined path to selectively deliver utilities to at least one portion of a work area.

3. The system of claim 2 wherein the system can be positioned at either of a first workstation or a second workstation.

4. The system of claim 2 wherein the system is movable between a stowed position and a deployed position.

5. The system of claim 2 wherein the beam is configured for sliding movement along the furniture, and the extension is configured for rolling movement along the floor.

6. The system of claim 5 wherein the beam is movable on a track system.

7. The system of claim 6 wherein the track system includes a horizontal rail mounted on the furniture.

8. The system of claim 7 wherein the beam includes a mounting assembly having a slide mechanism engaging the horizontal rail.

9. The system of claim 5 wherein the extension includes a floor wheel assembly.

10. The system of claim 9 wherein the floor wheel assembly includes a caster.

11. The system of claim 1 wherein the beam and the extension are formed of an "L"-shaped frame.

12. The system of claim 1 further comprising a retractable partition that is adapted to define a private space when in a withdrawn position.

13. The system of claim 1 wherein the extension is positioned at a lateral distance outboard of the furniture.

14. The system of claim 1 wherein the utility access extension projects downward from the overhead beam and the utility delivery zone is provided on the utility access extension.

15. The system of claim 14 wherein the utility delivery zone is provided on an interior of the utility access extension.

16. The system of claim 1 wherein the top section of the article of furniture has a top and wherein the first end of the overhead utility beam is coupled for translating movement along the top of the top section.

17. The system of claim 1 wherein the second end of the utility beam is configured to project into the work space at an overhead position relative to users seated in the work space.

18. The system of claim 1 wherein the utility beam is adapted to be positioned without extending below the top section of the article of furniture and the top section of the utility access extension.

19. A floor supported system for use in a work space and configured to distribute utilities away from at least one article of furniture having a top section carrying the utilities into the work space comprising space comprising:
    an overhead utility beam coupled proximate one end to the article of furniture and configured for translating movement relative to the article of furniture;
    a utility delivery zone positioned vertically below the overhead utility beam at a point away from the article of furniture; and
    a light fixture coupled to the overhead beam;
    wherein the utilities are routed to the overhead utility beam at or above the top section of the article of furniture;
    wherein the utilities are routed from the overhead beam to the utility delivery zone at a point away from the article of furniture.

20. The system of claim 19 further comprising a utility access extension having a canopy located adjacent to the light fixture.

21. The system of claim 19 further comprising a utility infeed to allow utilities to be supplied to the utility delivery zone.

22. The system of claim 21 wherein the utility infeed is a flexible conduit within a recess in the top of the furniture.

23. The system of claim 19 wherein a utility access extension projects downward from the overhead beam and the utility delivery zone is provided on the utility access extension.

24. The system of claim 23 wherein the utility delivery zone is provided on an interior of the utility access extension.

25. The system of claim 19 wherein the utility delivery zone positioned vertically below the overhead utility beam is positioned directly below an end of the overhead beam.

26. A wall supported system for use in a work space and configured to distribute utilities away from at least one article of furniture having a top section carrying the utilities into the work space comprising
    a utility access extension comprising a utility delivery zone;
    an overhead utility beam having a first end coupled for translating movement along the top section of the article of furniture and a second end projecting into the work space and coupled to a top section of the utility access extension, the overhead utility beam configured to supply utilities to the utility delivery zone at a point away from the furniture; and a light fixture coupled to the beam;

wherein the utilities are routed to the overhead utility beam at or above the top section of the article of furniture.

27. The system of claim 26 wherein the beam is positioned at an elevation above the furniture.

28. The system of claim 26 wherein the system is adapted for movement along a predefined path to selectively deliver utilities to at least one portion of a work area.

29. The system of claim 26 wherein the utility access extension projects downward from the overhead beam and the utility delivery zone is provided on the utility access extension.

30. The system of claim 26 wherein the utility beam does not extend below the top section of the article of furniture and the top section of the utility access extension.

* * * * *